United States Patent
Hull et al.

(10) Patent No.: US 7,861,169 B2
(45) Date of Patent: Dec. 28, 2010

(54) MULTIMEDIA PRINT DRIVER DIALOG INTERFACES

(75) Inventors: Jonathan J. Hull, San Carlos, CA (US); Jamey Graham, San Jose, CA (US); Peter E. Hart, Menlo Park, CA (US); Kurt Piersol, Santa Cruz, CA (US)

(73) Assignee: Ricoh Co. Ltd., Tokyo (JP)

( * ) Notice: Subject to any disclaimer, the term of this patent is extended or adjusted under 35 U.S.C. 154(b) by 774 days.

(21) Appl. No.: 10/814,944

(22) Filed: Mar. 30, 2004

(65) Prior Publication Data

US 2004/0181747 A1 Sep. 16, 2004

Related U.S. Application Data

(60) Provisional application No. 60/506,303, filed on Sep. 25, 2003, provisional application No. 60/506,206, filed on Sep. 25, 2003.

(51) Int. Cl.
*G06F 3/00* (2006.01)
(52) U.S. Cl. .................. 715/704; 715/730; 715/727; 715/716; 715/512; 715/719
(58) Field of Classification Search .................. 715/512, 715/704, 730, 727, 723, 716, 719, 720; 707/104.1; 713/193
See application file for complete search history.

(56) References Cited

U.S. PATENT DOCUMENTS 4,133,007 A 1/1979 Wessler et al.

(Continued)

FOREIGN PATENT DOCUMENTS

CA 2386829 11/2002

(Continued)

OTHER PUBLICATIONS

Gropp, W. et al., "Using MPI-Portable Programming with the Message Passing Interface," copyright 1999, pp. 35-42, second edition, MIT Press.

(Continued)

*Primary Examiner*—Weilun Lo
*Assistant Examiner*—Mylinh Tran
(74) *Attorney, Agent, or Firm*—Patent Law Works LLP

(57) ABSTRACT

The system of the present invention includes a media-printing interface that allows users to interact with a multimedia transformation process and format multimedia data to generate a representation of multimedia data. The present invention provides a user interface that permits users to interact with media content analysis and media representation generation. A media analysis software module receives media content analysis instructions from the user through the user interface, and the media analysis software module analyzes and recognizes features of the media content, such as faces, speech, text, etc. The media representation can be generated in a paper-based format, in digital format, and in any other representation formats. The user interface includes a number of fields through which the user can view media content and modify the media representation being generated. The methods of the present invention include interacting with a user interface to control the media data analysis and media representation generation, and analyzing features of media data. The methods also include driving the media data analysis, and driving the media representation generation by receiving instructions and sending instructions regarding media representation parameters. The methods can also include generating a media representation.

45 Claims, 20 Drawing Sheets

U.S. PATENT DOCUMENTS

| | | |
|---|---|---|
| 4,205,780 A | 6/1980 | Burns et al. |
| 4,417,239 A | 11/1983 | Demke et al. |
| 4,437,378 A | 3/1984 | Ishida et al. |
| 4,481,412 A | 11/1984 | Fields |
| 4,619,522 A | 10/1986 | Imai |
| 4,635,132 A | 1/1987 | Nakamura |
| 4,703,366 A | 10/1987 | Kobori et al. |
| 4,734,898 A | 3/1988 | Morinaga |
| 4,754,485 A | 6/1988 | Klatt |
| 4,807,186 A | 2/1989 | Ohnishi et al. |
| 4,823,303 A | 4/1989 | Terasawa |
| 4,831,610 A | 5/1989 | Hoda et al. |
| 4,881,135 A | 11/1989 | Heilweil |
| 4,907,973 A | 3/1990 | Hon |
| 4,987,447 A | 1/1991 | Ojha |
| 4,998,215 A | 3/1991 | Black et al. |
| 5,010,498 A | 4/1991 | Miyata |
| 5,059,126 A | 10/1991 | Kimball |
| 5,060,135 A | 10/1991 | Levine et al. |
| 5,091,948 A | 2/1992 | Kametani |
| 5,093,730 A | 3/1992 | Ishii et al. |
| 5,111,285 A | 5/1992 | Fujita et al. |
| 5,115,967 A | 5/1992 | Wedekind |
| 5,136,563 A | 8/1992 | Takemasa et al. |
| 5,153,831 A | 10/1992 | Yianilos |
| 5,161,037 A | 11/1992 | Saito |
| 5,168,371 A | 12/1992 | Takayanagi |
| 5,170,935 A | 12/1992 | Federspiel et al. |
| 5,220,649 A | 6/1993 | Forcier |
| 5,225,900 A | 7/1993 | Wright |
| 5,231,698 A | 7/1993 | Forcier |
| 5,237,648 A | 8/1993 | Mills et al. |
| 5,243,381 A | 9/1993 | Hube |
| 5,250,787 A | 10/1993 | Arii et al. |
| 5,255,389 A | 10/1993 | Wang |
| 5,258,880 A | 11/1993 | Takahashi |
| 5,267,303 A | 11/1993 | Johnson et al. |
| 5,270,989 A | 12/1993 | Kimura |
| 5,280,609 A | 1/1994 | MacPhail |
| 5,299,123 A | 3/1994 | Wang et al. |
| 5,309,359 A | 5/1994 | Katz et al. |
| 5,343,251 A | 8/1994 | Nafeh |
| 5,349,658 A | 9/1994 | O'Rourke et al. |
| 5,369,508 A | 11/1994 | Lech et al. |
| 5,382,776 A | 1/1995 | Arii et al. |
| 5,384,703 A | 1/1995 | Withgott et al. |
| 5,386,510 A | 1/1995 | Jacobs |
| 5,404,295 A | 4/1995 | Katz et al. |
| 5,418,948 A | 5/1995 | Turtle |
| 5,428,555 A | 6/1995 | Starkey et al. |
| 5,432,532 A | 7/1995 | Mochimaru et al. |
| 5,436,792 A | 7/1995 | Leman et al. |
| 5,438,426 A | 8/1995 | Miake et al. |
| 5,442,795 A | 8/1995 | Levine et al. |
| 5,444,476 A | 8/1995 | Conway |
| 5,448,375 A | 9/1995 | Cooper et al. |
| 5,459,307 A | 10/1995 | Klotz, Jr. |
| 5,467,288 A | 11/1995 | Fasciano et al. |
| 5,468,371 A | 11/1995 | Nelson et al. |
| 5,479,600 A | 12/1995 | Wroblewski et al. |
| 5,480,306 A | 1/1996 | Liu |
| 5,481,666 A | 1/1996 | Nguyen et al. |
| 5,485,554 A * | 1/1996 | Lowitz et al. .............. 358/1.17 |
| 5,493,409 A | 2/1996 | Maeda et al. |
| 5,499,108 A | 3/1996 | Cotte et al. |
| 5,524,085 A | 6/1996 | Bellucco et al. |
| 5,566,271 A | 10/1996 | Tomitsuka et al. |
| 5,568,406 A | 10/1996 | Gerber |
| 5,572,651 A | 11/1996 | Weber et al. |
| 5,576,950 A | 11/1996 | Tonomura et al. |
| 5,581,366 A | 12/1996 | Merchant et al. |
| 5,581,682 A | 12/1996 | Anderson et al. |
| 5,590,257 A | 12/1996 | Forcier |
| 5,596,698 A | 1/1997 | Morgan |
| 5,596,700 A | 1/1997 | Darnell et al. |
| 5,600,775 A | 2/1997 | King et al. |
| 5,617,138 A | 4/1997 | Ito et al. |
| 5,624,265 A | 4/1997 | Redford et al. |
| 5,627,936 A | 5/1997 | Prasad et al. |
| 5,628,684 A | 5/1997 | Bouedec |
| 5,633,723 A | 5/1997 | Sugiyama et al. |
| 5,638,543 A | 6/1997 | Pedersen et al. |
| 5,640,193 A | 6/1997 | Wellner |
| 5,661,506 A | 8/1997 | Lazzouni et al. |
| 5,661,783 A | 8/1997 | Assis |
| 5,675,752 A | 10/1997 | Scott et al. |
| 5,680,223 A | 10/1997 | Cooper et al. |
| 5,680,636 A | 10/1997 | Levine et al. |
| 5,682,330 A | 10/1997 | Seaman et al. |
| 5,682,540 A | 10/1997 | Klotz et al. |
| 5,686,957 A | 11/1997 | Baker |
| 5,690,496 A | 11/1997 | Kennedy |
| 5,694,559 A | 12/1997 | Hobson et al. |
| 5,706,097 A | 1/1998 | Schelling et al. |
| 5,710,874 A | 1/1998 | Bergen |
| 5,715,381 A | 2/1998 | Hamilton |
| 5,717,841 A | 2/1998 | Farrell et al. |
| 5,717,879 A | 2/1998 | Moran et al. |
| 5,721,883 A | 2/1998 | Katsuo et al. |
| 5,721,897 A | 2/1998 | Rubinstein |
| 5,729,665 A | 3/1998 | Gauthier |
| 5,734,752 A | 3/1998 | Knox |
| 5,734,753 A | 3/1998 | Bunce |
| 5,737,599 A | 4/1998 | Rowe et al. |
| 5,745,756 A | 4/1998 | Henley |
| 5,748,805 A | 5/1998 | Withgott et al. |
| 5,749,735 A | 5/1998 | Redford et al. |
| 5,751,283 A | 5/1998 | Smith |
| 5,754,308 A | 5/1998 | Lopresti et al. |
| 5,754,939 A | 5/1998 | Herz et al. |
| 5,757,897 A | 5/1998 | LaBarbera et al. |
| 5,758,037 A | 5/1998 | Schroeder |
| 5,760,767 A | 6/1998 | Shore et al. |
| 5,761,380 A | 6/1998 | Lewis et al. |
| 5,761,655 A | 6/1998 | Hoffman |
| 5,761,686 A | 6/1998 | Bloomberg |
| 5,764,235 A | 6/1998 | Hunt et al. |
| 5,764,368 A | 6/1998 | Shibaki et al. |
| 5,765,176 A | 6/1998 | Bloomberg |
| 5,774,260 A | 6/1998 | Petitto et al. |
| 5,778,397 A | 7/1998 | Kupiec et al. |
| 5,781,785 A | 7/1998 | Rowe et al. |
| 5,784,616 A | 7/1998 | Horvitz |
| 5,790,114 A | 8/1998 | Geaghan et al. |
| 5,793,365 A | 8/1998 | Tang et al. |
| 5,793,869 A | 8/1998 | Claflin, Jr. |
| 5,802,294 A | 9/1998 | Ludwig et al. |
| 5,804,803 A | 9/1998 | Cragun et al. |
| 5,809,318 A | 9/1998 | Rivette et al. |
| 5,812,664 A | 9/1998 | Bernobich et al. |
| 5,819,301 A | 10/1998 | Rowe et al. |
| 5,832,474 A | 11/1998 | Lopresti et al. |
| 5,838,317 A | 11/1998 | Bolnick et al. |
| 5,845,144 A | 12/1998 | Tateyama et al. |
| 5,857,185 A | 1/1999 | Yamaura |
| 5,860,074 A | 1/1999 | Rowe et al. |
| 5,869,819 A | 2/1999 | Knowles et al. |
| 5,870,552 A | 2/1999 | Dozier et al. |
| 5,870,770 A | 2/1999 | Wolfe |
| 5,873,107 A | 2/1999 | Borovoy et al. |
| 5,877,764 A | 3/1999 | Feitelson et al. |
| 5,884,056 A | 3/1999 | Steele |
| 5,892,536 A | 4/1999 | Logan et al. |
| 5,894,333 A | 4/1999 | Kanda et al. |

| | | | | | | |
|---|---|---|---|---|---|---|
| 5,895,476 | A | 4/1999 | Orr et al. | 6,222,532 B1 | 4/2001 | Ceccarelli | |
| 5,898,166 | A | 4/1999 | Fukuda et al. | 6,256,638 B1 | 7/2001 | Dougherty et al. | |
| 5,898,709 | A | 4/1999 | Imade et al. | 6,262,724 B1 | 7/2001 | Crow et al. | |
| 5,903,538 | A | 5/1999 | Fujita et al. | 6,266,053 B1 | 7/2001 | French et al. | |
| 5,933,829 | A | 8/1999 | Durst et al. | 6,296,693 B1 | 10/2001 | McCarthy | |
| 5,933,841 | A | 8/1999 | Schumacher et al. | 6,297,812 B1 | 10/2001 | Ohara et al. | |
| 5,936,542 | A | 8/1999 | Kleinrock et al. | 6,297,851 B1 | 10/2001 | Taubman et al. | |
| 5,938,727 | A | 8/1999 | Ikeda | 6,298,145 B1 | 10/2001 | Zhang et al. | |
| 5,939,699 | A | 8/1999 | Perttunen et al. | 6,301,586 B1 * | 10/2001 | Yang et al. .......................... 1/1 |
| 5,940,776 | A | 8/1999 | Baron et al. | 6,301,660 B1 | 10/2001 | Benson | |
| 5,941,936 | A | 8/1999 | Taylor | 6,302,527 B1 | 10/2001 | Walker | |
| 5,943,679 | A | 8/1999 | Niles et al. | 6,307,956 B1 | 10/2001 | Black | |
| 5,945,998 | A | 8/1999 | Eick | 6,308,887 B1 | 10/2001 | Korman et al. | |
| 5,946,678 | A | 8/1999 | Aalbersberg | 6,330,976 B1 | 12/2001 | Dymetman et al. | |
| 5,949,879 | A | 9/1999 | Berson et al. | 6,332,147 B1 | 12/2001 | Moran et al. | |
| 5,950,187 | A | 9/1999 | Tsuda | 6,340,971 B1 | 1/2002 | Janse et al. | |
| 5,962,839 | A | 10/1999 | Eskildsen | 6,360,057 B1 | 3/2002 | Tsumagari et al. | |
| 5,974,189 | A | 10/1999 | Nicponski | 6,369,811 B1 | 4/2002 | Graham et al. | |
| 5,978,477 | A | 11/1999 | Hull et al. | 6,373,498 B1 | 4/2002 | Abgrall | |
| 5,978,773 | A | 11/1999 | Hudetz et al. | 6,373,585 B1 | 4/2002 | Mastie et al. | |
| 5,982,507 | A | 11/1999 | Weiser et al. | 6,375,298 B2 | 4/2002 | Purcell et al. | |
| 5,986,655 | A | 11/1999 | Chiu et al. | 6,378,070 B1 | 4/2002 | Chan et al. | |
| 5,986,692 | A | 11/1999 | Logan et al. | 6,381,614 B1 | 4/2002 | Barnett et al. | |
| 5,987,226 | A | 11/1999 | Ishikawa et al. | 6,396,594 B1 * | 5/2002 | French et al. ............... 358/1.18 |
| 5,987,454 | A | 11/1999 | Hobbs | 6,400,996 B1 | 6/2002 | Hoffberg et al. | |
| 5,990,934 | A | 11/1999 | Nalwa | 6,409,401 B1 | 6/2002 | Petteruti et al. | |
| 5,999,173 | A | 12/1999 | Ubillos | 6,417,435 B2 | 7/2002 | Chantzis et al. | |
| 6,000,030 | A | 12/1999 | Steinberg et al. | 6,421,067 B1 | 7/2002 | Kamen et al. | |
| 6,005,562 | A | 12/1999 | Shiga et al. | 6,421,738 B1 | 7/2002 | Ratan et al. | |
| 6,006,218 | A | 12/1999 | Breese et al. | 6,430,554 B1 | 8/2002 | Rothschild | |
| 6,006,241 | A | 12/1999 | Purnaveja et al. | 6,434,561 B1 | 8/2002 | Durst, Jr. et al. | |
| 6,009,442 | A | 12/1999 | Chen et al. | 6,439,465 B1 | 8/2002 | Bloomberg | |
| 6,020,916 | A | 2/2000 | Gerszberg et al. | 6,442,336 B1 | 8/2002 | Lemelson | |
| 6,021,403 | A | 2/2000 | Horvitz et al. | 6,452,615 B1 | 9/2002 | Chiu et al. | |
| 6,026,409 | A | 2/2000 | Blumenthal | 6,466,329 B1 | 10/2002 | Mukai | |
| 6,028,601 | A | 2/2000 | Machiraju et al. | 6,466,534 B2 | 10/2002 | Cundiff, Sr. | |
| 6,038,567 | A | 3/2000 | Young | 6,476,793 B1 | 11/2002 | Motoyama et al. | |
| 6,043,904 | A | 3/2000 | Nickerson | 6,476,834 B1 | 11/2002 | Doval et al. | |
| 6,046,718 | A | 4/2000 | Suzuki et al. | 6,502,114 B1 | 12/2002 | Forcier | |
| 6,055,542 | A | 4/2000 | Nielsen et al. | D468,277 S | 1/2003 | Sugiyama | |
| 6,061,758 | A | 5/2000 | Reber et al. | 6,502,756 B1 | 1/2003 | Fåhraeus | |
| 6,076,733 | A | 6/2000 | Wilz, Sr. et al. | 6,504,620 B1 | 1/2003 | Kinjo | |
| 6,076,734 | A | 6/2000 | Dougherty et al. | 6,505,153 B1 | 1/2003 | Van Thong et al. | |
| 6,081,261 | A | 6/2000 | Wolff et al. | 6,515,756 B1 | 2/2003 | Mastie et al. | |
| 6,094,648 | A | 7/2000 | Aalbersberg | 6,518,986 B1 | 2/2003 | Mugura | |
| RE36,801 | E | 8/2000 | Logan et al. | 6,519,360 B1 | 2/2003 | Tanaka | |
| 6,098,082 | A | 8/2000 | Gibbon et al. | 6,529,920 B1 | 3/2003 | Arons et al. | |
| 6,098,106 | A | 8/2000 | Philyaw et al. | 6,535,639 B1 | 3/2003 | Uchihachi et al. | |
| 6,101,503 | A | 8/2000 | Cooper et al. | 6,542,933 B1 | 4/2003 | Durst, Jr. et al. | |
| 6,106,457 | A | 8/2000 | Perkins et al. | 6,544,294 B1 | 4/2003 | Greenfield et al. | |
| 6,108,656 | A | 8/2000 | Durst et al. | 6,546,385 B1 | 4/2003 | Mao et al. | |
| 6,111,567 | A | 8/2000 | Savchenko et al. | 6,552,743 B1 | 4/2003 | Rissman | |
| 6,115,718 | A | 9/2000 | Huberman et al. | 6,556,241 B1 | 4/2003 | Yoshimura et al. | |
| 6,118,888 | A | 9/2000 | Chino et al. | 6,567,980 B1 | 5/2003 | Jain et al. | |
| 6,123,258 | A | 9/2000 | Iida | 6,568,595 B1 | 5/2003 | Russell et al. | |
| 6,125,229 | A | 9/2000 | Dimitrova et al. | 6,581,070 B1 | 6/2003 | Gibbon et al. | |
| 6,138,151 | A | 10/2000 | Reber et al. | 6,587,859 B2 | 7/2003 | Dougherty et al. | |
| 6,141,001 | A | 10/2000 | Baleh | 6,593,860 B2 | 7/2003 | Lai et al. | |
| 6,148,094 | A | 11/2000 | Kinsella | 6,594,377 B1 | 7/2003 | Kim et al. | |
| 6,151,059 | A | 11/2000 | Schein et al. | 6,596,031 B1 | 7/2003 | Parks | |
| 6,152,369 | A | 11/2000 | Wilz, Sr. et al. | 6,608,563 B2 | 8/2003 | Weston et al. | |
| 6,153,667 | A | 11/2000 | Howald | 6,611,276 B1 | 8/2003 | Muratori et al. | |
| 6,160,633 | A | 12/2000 | Mori | 6,611,622 B1 | 8/2003 | Krumm | |
| 6,167,033 | A | 12/2000 | Chang et al. | 6,611,628 B1 | 8/2003 | Sekiguchi et al. | |
| 6,170,007 | B1 | 1/2001 | Venkatraman et al. | 6,623,528 B1 | 9/2003 | Squilla et al. | |
| 6,175,489 | B1 | 1/2001 | Markow et al. | 6,625,334 B1 | 9/2003 | Shiota et al. | |
| 6,182,090 | B1 | 1/2001 | Peairs | 6,636,869 B1 | 10/2003 | Reber et al. | |
| 6,189,009 | B1 | 2/2001 | Stratigos et al. | 6,647,534 B1 | 11/2003 | Graham | |
| 6,193,658 | B1 | 2/2001 | Wendelken et al. | 6,647,535 B1 * | 11/2003 | Bozdagi et al. ............... 715/255 |
| 6,195,068 | B1 | 2/2001 | Suzuki et al. | 6,651,053 B1 | 11/2003 | Rothschild | |
| 6,199,042 | B1 | 3/2001 | Kurzweil | 6,654,887 B2 | 11/2003 | Rhoads | |
| 6,199,048 | B1 | 3/2001 | Hudetz et al. | 6,665,092 B2 | 12/2003 | Reed | |
| 6,211,869 | B1 | 4/2001 | Loveman et al. | 6,674,538 B2 | 1/2004 | Takahashi | |

| Patent No. | Date | Inventor |
|---|---|---|
| 6,675,165 B1 | 1/2004 | Rothschild |
| 6,678,389 B1 | 1/2004 | Sun et al. |
| 6,687,383 B1 | 2/2004 | Kanevsky et al. |
| 6,700,566 B2 | 3/2004 | Shimoosawa et al. |
| 6,701,369 B1 | 3/2004 | Philyaw |
| 6,724,494 B1 | 4/2004 | Danknick |
| 6,728,466 B1 | 4/2004 | Tanaka |
| 6,684,368 B1 | 6/2004 | Philyaw et al. |
| 6,745,234 B1 | 6/2004 | Philyaw et al. |
| 6,750,978 B1 | 6/2004 | Marggraff et al. |
| 6,752,317 B2 | 6/2004 | Dymetman et al. |
| 6,753,883 B2 | 6/2004 | Schena et al. |
| 6,760,541 B1 | 7/2004 | Ohba |
| 6,766,363 B1 | 7/2004 | Rothschild |
| 6,771,283 B2 | 8/2004 | Carro |
| 6,772,947 B2 | 8/2004 | Shaw |
| 6,774,951 B2 | 8/2004 | Narushima |
| 6,775,651 B1 | 8/2004 | Lewis et al. |
| 6,781,609 B1 | 8/2004 | Barker et al. |
| 6,807,303 B1 | 10/2004 | Kim et al. |
| 6,824,044 B1 | 11/2004 | Lapstun et al. |
| 6,845,913 B2 | 1/2005 | Madding et al. |
| 6,853,980 B1 | 2/2005 | Ying et al. |
| 6,856,415 B1 | 2/2005 | Simchik et al. |
| 6,865,608 B2 | 3/2005 | Hunter |
| 6,865,714 B1 | 3/2005 | Liu et al. |
| 6,871,780 B2 | 3/2005 | Nygren et al. |
| 6,877,134 B1 | 4/2005 | Fuller et al. |
| 6,883,162 B2 | 4/2005 | Jackson et al. |
| 6,886,750 B2 | 5/2005 | Rathus et al. |
| 6,892,193 B2 | 5/2005 | Bolle et al. |
| 6,898,709 B1 | 5/2005 | Teppler |
| 6,904,168 B1 | 6/2005 | Steinberg et al. |
| 6,904,451 B1 | 6/2005 | Orfitelli et al. |
| 6,923,721 B2 | 8/2005 | Luciano et al. |
| 6,931,594 B1 | 8/2005 | Jun |
| 6,938,202 B1 | 8/2005 | Matsubayashi et al. |
| 6,946,672 B1 | 9/2005 | Lapstun et al. |
| 6,950,623 B2 | 9/2005 | Brown et al. |
| 6,964,374 B1 | 11/2005 | Djuknic et al. |
| 6,966,495 B2 | 11/2005 | Lynggaard et al. |
| 6,983,482 B2 | 1/2006 | Morita et al. |
| 6,993,573 B2 | 1/2006 | Hunter |
| 7,000,193 B1 | 2/2006 | Impink, Jr. et al. |
| 7,023,459 B2 | 4/2006 | Arndt et al. |
| 7,031,965 B1 | 4/2006 | Moriya et al. |
| 7,073,119 B2 | 7/2006 | Matsubayashi et al. |
| 7,075,676 B2 | 7/2006 | Owen |
| 7,079,278 B2 | 7/2006 | Sato |
| 7,089,420 B1 | 8/2006 | Durst et al. |
| 7,092,568 B2 | 8/2006 | Eaton |
| 7,131,058 B1 | 10/2006 | Lapstun |
| 7,134,016 B1 | 11/2006 | Harris |
| 7,149,957 B2 | 12/2006 | Hull et al. |
| 7,151,613 B1 | 12/2006 | Ito |
| 7,152,206 B1 | 12/2006 | Tsuruta |
| 7,162,690 B2 | 1/2007 | Gupta et al. |
| 7,174,151 B2 | 2/2007 | Lynch et al. |
| 7,181,502 B2 | 2/2007 | Incertis |
| 7,196,808 B2 | 3/2007 | Kofman et al. |
| 7,215,436 B2 | 5/2007 | Hull et al. |
| 7,225,158 B2 | 5/2007 | Toshikage et al. |
| 7,228,492 B1 | 6/2007 | Graham |
| 7,260,828 B2 | 8/2007 | Aratani et al. |
| 7,263,659 B2 | 8/2007 | Hull et al. |
| 7,263,671 B2 | 8/2007 | Hull et al. |
| 7,266,782 B2 | 9/2007 | Hull et al. |
| 7,280,738 B2 | 10/2007 | Kauffman et al. |
| 7,298,512 B2 | 11/2007 | Reese et al. |
| 7,305,620 B1 | 12/2007 | Nakajima et al. |
| 7,313,808 B1 | 12/2007 | Gupta et al. |
| 7,363,580 B2 | 4/2008 | Tabata et al. |
| 7,647,555 B1 | 1/2010 | Wilcox et al. |
| 2001/0003846 A1 | 6/2001 | Rowe et al. |
| 2001/0005203 A1 | 6/2001 | Wiernik |
| 2001/0013041 A1 | 8/2001 | Macleod et al. |
| 2001/0017714 A1 | 8/2001 | Komatsu et al. |
| 2001/0037408 A1 | 11/2001 | Thrift et al. |
| 2001/0043789 A1 | 11/2001 | Nishimura et al. |
| 2001/0044810 A1 | 11/2001 | Timmons |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff Sr, Sr. |
| 2002/0010641 A1 | 1/2002 | Stevens et al. |
| 2002/0011518 A1 | 1/2002 | Goetz et al. |
| 2002/0015066 A1 | 2/2002 | Siwinski et al. |
| 2002/0019982 A1 | 2/2002 | Aratani et al. |
| 2002/0023957 A1 | 2/2002 | Michaelis et al. |
| 2002/0036800 A1 | 3/2002 | Nozaki et al. |
| 2002/0047870 A1 | 4/2002 | Carro |
| 2002/0048224 A1 | 4/2002 | Dygert et al. |
| 2002/0051010 A1 | 5/2002 | Jun et al. |
| 2002/0059342 A1 | 5/2002 | Gupta et al. |
| 2002/0060748 A1 | 5/2002 | Aratani et al. |
| 2002/0066782 A1 | 6/2002 | Swaminathan et al. |
| 2002/0067503 A1 | 6/2002 | Hiatt |
| 2002/0070982 A1 | 6/2002 | Hill et al. |
| 2002/0078149 A1 | 6/2002 | Chang et al. |
| 2002/0085759 A1 | 7/2002 | Davies et al. |
| 2002/0087530 A1 | 7/2002 | Smith et al. |
| 2002/0087598 A1 | 7/2002 | Carro |
| 2002/0095460 A1 | 7/2002 | Benson |
| 2002/0095501 A1 | 7/2002 | Chiloyan et al. |
| 2002/0097426 A1 | 7/2002 | Gusmano et al. |
| 2002/0099452 A1 | 7/2002 | Kawai |
| 2002/0099534 A1 | 7/2002 | Hegarty |
| 2002/0101343 A1 | 8/2002 | Patton |
| 2002/0101513 A1 | 8/2002 | Halverson |
| 2002/0116575 A1 | 8/2002 | Toyomura et al. |
| 2002/0131071 A1 | 9/2002 | Parry |
| 2002/0131078 A1 | 9/2002 | Tsukinokizawa |
| 2002/0134699 A1 | 9/2002 | Bradfield et al. |
| 2002/0135800 A1 | 9/2002 | Dutta |
| 2002/0135808 A1 | 9/2002 | Parry |
| 2002/0137544 A1 | 9/2002 | Myojo |
| 2002/0140993 A1 | 10/2002 | Silverbrook |
| 2002/0159637 A1 | 10/2002 | Echigo et al. |
| 2002/0163653 A1 | 11/2002 | Struble et al. |
| 2002/0165769 A1 | 11/2002 | Ogaki et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0002068 A1 | 1/2003 | Constantin et al. |
| 2003/0007776 A1* | 1/2003 | Kameyama et al. .......... 386/46 |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0038971 A1 | 2/2003 | Renda |
| 2003/0046241 A1 | 3/2003 | Toshikage et al. |
| 2003/0051214 A1 | 3/2003 | Graham et al. |
| 2003/0052897 A1 | 3/2003 | Lin |
| 2003/0065665 A1 | 4/2003 | Kinjo |
| 2003/0065925 A1 | 4/2003 | Shindo et al. |
| 2003/0076521 A1 | 4/2003 | Li et al. |
| 2003/0084462 A1 | 5/2003 | Kubota et al. |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0128877 A1 | 7/2003 | Nicponski |
| 2003/0130952 A1 | 7/2003 | Bell et al. |
| 2003/0146927 A1 | 8/2003 | Crow et al. |
| 2003/0156589 A1 | 8/2003 | Suetsugu |

| | | |
|---|---|---|
| 2003/0160898 A1 | 8/2003 | Baek et al. |
| 2003/0163552 A1 | 8/2003 | Savitzky et al. |
| 2003/0164898 A1 | 9/2003 | Imai |
| 2003/0177240 A1 | 9/2003 | Gulko et al. |
| 2003/0184598 A1 | 10/2003 | Graham |
| 2003/0187642 A1 | 10/2003 | Ponceleon et al. |
| 2003/0218597 A1 | 11/2003 | Hodzic |
| 2003/0220988 A1 | 11/2003 | Hymel |
| 2003/0231198 A1 | 12/2003 | Janevski |
| 2004/0006577 A1 | 1/2004 | Rix |
| 2004/0008209 A1 | 1/2004 | Adams et al. |
| 2004/0015524 A1 | 1/2004 | Chalstrom et al. |
| 2004/0024643 A1 | 2/2004 | Pollock et al. |
| 2004/0036842 A1 | 2/2004 | Tsai et al. |
| 2004/0037540 A1 | 2/2004 | Frohlich et al. |
| 2004/0039723 A1 | 2/2004 | Lee et al. |
| 2004/0044894 A1 | 3/2004 | Lofgren et al. |
| 2004/0049681 A1 | 3/2004 | Diehl et al. |
| 2004/0064207 A1 | 4/2004 | Zacks et al. |
| 2004/0064338 A1 | 4/2004 | Shiota et al. |
| 2004/0064339 A1 | 4/2004 | Shiota et al. |
| 2004/0071441 A1 | 4/2004 | Foreman et al. |
| 2004/0090462 A1 | 5/2004 | Graham |
| 2004/0100506 A1 | 5/2004 | Shiota et al. |
| 2004/0118908 A1 | 6/2004 | Ando et al. |
| 2004/0125402 A1 | 7/2004 | Kanai et al. |
| 2004/0128514 A1 | 7/2004 | Rhoads |
| 2004/0128613 A1 | 7/2004 | Sinisi |
| 2004/0143459 A1 | 7/2004 | Engleson et al. |
| 2004/0143602 A1* | 7/2004 | Ruiz et al. ............... 707/104.1 |
| 2004/0150627 A1 | 8/2004 | Luman et al. |
| 2004/0156616 A1 | 8/2004 | Strub et al. |
| 2004/0167895 A1 | 8/2004 | Carro |
| 2004/0181747 A1 | 9/2004 | Hull et al. |
| 2004/0181815 A1 | 9/2004 | Hull et al. |
| 2004/0184064 A1 | 9/2004 | TaKeda et al. |
| 2004/0207876 A1 | 10/2004 | Aschenbrenner et al. |
| 2004/0215470 A1 | 10/2004 | Bodin |
| 2004/0229195 A1 | 11/2004 | Marggraff et al. |
| 2004/0240541 A1 | 12/2004 | Chadwick et al. |
| 2004/0240562 A1 | 12/2004 | Bargeron et al. |
| 2004/0247298 A1 | 12/2004 | Ohba |
| 2004/0249650 A1* | 12/2004 | Freedman et al. ............... 705/1 |
| 2005/0038794 A1 | 2/2005 | Piersol |
| 2005/0064935 A1* | 3/2005 | Blanco ............... 463/35 |
| 2005/0068569 A1 | 3/2005 | Hull et al. |
| 2005/0068581 A1 | 3/2005 | Hull et al. |
| 2005/0083413 A1 | 4/2005 | Reed et al. |
| 2005/0125717 A1 | 6/2005 | Segal et al. |
| 2005/0149849 A1 | 7/2005 | Graham et al. |
| 2005/0213153 A1 | 9/2005 | Hull et al. |
| 2005/0216838 A1 | 9/2005 | Graham |
| 2005/0216852 A1 | 9/2005 | Hull et al. |
| 2005/0223322 A1 | 10/2005 | Graham et al. |
| 2005/0225781 A1 | 10/2005 | Koizumi |
| 2005/0262437 A1* | 11/2005 | Patterson et al. ............ 715/517 |
| 2006/0013478 A1 | 1/2006 | Ito et al. |
| 2006/0043193 A1 | 3/2006 | Brock |
| 2006/0092450 A1 | 5/2006 | Kanazawa et al. |
| 2006/0136343 A1 | 6/2006 | Coley et al. |
| 2006/0171559 A1 | 8/2006 | Rhoads |
| 2006/0250585 A1 | 11/2006 | Anderson et al. |
| 2007/0033419 A1* | 2/2007 | Kocher et al. ............... 713/193 |
| 2007/0065094 A1 | 3/2007 | Chien et al. |
| 2007/0109397 A1 | 5/2007 | Yuan et al. |
| 2007/0162858 A1 | 7/2007 | Hurley et al. |
| 2007/0168426 A1 | 7/2007 | Ludwig et al. |
| 2007/0234196 A1 | 10/2007 | Nicol et al. |
| 2007/0268164 A1 | 11/2007 | Lai et al. |
| 2008/0037043 A1 | 2/2008 | Hull et al. |
| 2008/0246757 A1 | 10/2008 | Ito |

FOREIGN PATENT DOCUMENTS

| | | |
|---|---|---|
| CN | 1352765 A | 6/2002 |
| CN | 1097394 C | 12/2002 |
| EP | 248 403 B1 | 12/1987 |
| EP | 378 848 A2 | 7/1990 |
| EP | 459 174 A2 | 12/1991 |
| EP | 0651556 | 5/1995 |
| EP | 737 927 B1 | 10/1996 |
| EP | 459 174 B1 | 11/1996 |
| EP | 0743613 | 11/1996 |
| EP | 762 297 A2 | 3/1997 |
| EP | 802 492 A1 | 10/1997 |
| EP | 1 001 605 A3 | 5/2000 |
| EP | 1079313 A2 | 2/2001 |
| EP | 1133170 A2 | 9/2001 |
| EP | 788 064 B1 | 1/2003 |
| EP | 788 063 B1 | 10/2005 |
| GB | 2 137 788 A | 10/1984 |
| GB | 2 156 118 A | 10/1985 |
| GB | 2 234 609 A | 6/1991 |
| GB | 2 290 898 A | 1/1996 |
| GB | 2 331 378 A | 5/1999 |
| JP | 60-046653 | 3/1985 |
| JP | 04-225670 | 8/1992 |
| JP | 05-101484 | 4/1993 |
| JP | 06-124502 | 5/1994 |
| JP | H07-284033 | 10/1995 |
| JP | 08-69419 | 3/1996 |
| JP | 8-297677 A2 | 11/1996 |
| JP | H09-037180 | 2/1997 |
| JP | H10-049761 | 2/1998 |
| JP | 10-126723 | 5/1998 |
| JP | H11-341423 | 12/1999 |
| JP | 2000-516006 | 11/2000 |
| JP | 2001-176246 | 6/2001 |
| JP | 2003-87458 | 3/2003 |
| JP | 2003-513564 | 4/2003 |
| JP | 2003-514318 | 4/2003 |
| WO | WO9806098 | 2/1998 |
| WO | WO 99/18523 | 4/1999 |
| WO | WO0073875 | 12/2000 |
| WO | WO 02/082316 A1 | 10/2002 |

OTHER PUBLICATIONS

ASCII 24.com, [online] (date unknown), Retrieved from the Internet<URL: http://216.239.37.104/search?q=cache:z-G9 M1EpvSUJ:ascii24.com/news/i/hard/article/1998/10/01/612952-000.html+%E3%82%B9%E3%...>.

Configuring a Printer (NT), Oxford Computer Support [online] [Retrieved on Nov. 13, 2003] Retrieved from the Internet<URL: http://www.nox.ac.uk/cehoxford/ccs/facilities/printers/confignt.htm>.

"DocumentMail Secure Document Management" [online] [Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper,"

Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved form the Internet: <URL http://www.kofax.com/products/ascent/capture>.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

PostScript Language Document Structuring Conventions Specification, Version 3.0 (Sep. 25, 1992), Adobe Systems Incorporated.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Gopal, S. et al., "Load Balancing In a Heterogeneous Computing Environment," Proceedings of the Thirty-First Hawaii International Conference on System Sciences, Jan. 6-9, 1998.

Gropp, W. et al., "Using MPI—Portable Programming with the Message-Passing Interface," copyright 1999, pp. 35-42, second edition, MIT Press.

"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.

"Tasty FotoArt" [online], date unknown, Tague Technologies, Inc., [retrieved on Mar. 8, 3005]. Retrieved from the Internet: <URL: http//www.tastyfotoart.com>.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

Shahraray, B. et al., "Pictorial Transcripts: Multimedia Processing Applied to Digital Library Creation," IEEE, 1997, pp. 581-586.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.

European Search Report, EP 04255837, Sep. 5, 2006, 3 pages.

European Search Report, EP 04255839, Sep. 4, 2006, 3 pages.

European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Juy-Sep. 1998, pp. 17-25.

Shahraray, B. et al, "Automated Authoring of Hypermedia Documents of Video Programs," ACM Multimedia '95 Electronic Proceedings, San Francisco, CA, Nov. 5-9, 1995, pp. 1-12.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

R200 ScanTalk [online] (date unknown). Retrieved from the Internet<URL: http://homepage2.nifty.com/vasolza/ScanTalk.htm>.

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.

Communication Pursuant to Article 96(2) EPC, European Application No. 04255836.1, Jun. 11, 2007, 10 pages.

"About Telus Investors Glossary," downloaded from http://about/telus.com/investors/glossary.html, downloaded Apr. 14, 2005, pp. 1-7.

Acrobat Reader Version 2.0 (software application), Adobe Systems Incorporated, screenshots Figures 1-10, 1994.

Adobe Premiere (Video Editing Software) from http://www.adobe.com, 2002.

Adobe Acrobat Reader 3.0 Screen Dumps (Fig. 1-3), 1996.

Adobe Systems, Inc., "Adobe Photoshop 4.0 User Guide for Macintosh and Windows," pp. 30-31, 1996.

The Army's Virtual World, pp. 1-6 downloaded from http://www.g4tv.com/screensavers/features/492/The_Armys_Virtual_World.html on Mar. 16, 2005.

Apple Macintosh System 7 Reference Manual, pp. 30-31, 1991.

Ball et al., "Software Visualization in the Large," IEEE Computer, 1996, pp. 33-43, vol. 29.

Becker, D., "Strategy: Outside the Box," CNET News.com, Dec. 10, 2003, pp. 1-7, downloaded Mar. 15, 2005.

Becker, D., "Players: Clash of the Titans," CNET News.com, Dec. 10, 2003, pp. 1-6, downloaded Mar. 15, 2005.

Begole et al., "Flexible Collaboration Transparency," doc. ID: ncstrl.vatech.su b.—cs/TR-98-11, Virginia Polytechnic Institute and State University, 1998.

Begole et al. "Flexible Collaboration Transparency: Supporting Worker Independence In Replicated Application-Sharing Sytstems," ACM Transactions On Computer-Human Interaction, Jun. 1999, pp. 95-132, vol. 6, No. 2.

Begole et al., "Supporting Worker Independence in Collaboration Transparency," doc. ID: ncstrl.vatech.subn.—cs/TR-98-12, Virginia Polytechnic Institute and State University, 1998.

Begole et al., "Supporting Worker Independence In Collaboration Transparency," technical report from the Computer Science Department of Virginia Tech, doc. ID: ncstrl.vatech_cs/TR-98-12.

Bobick et al., "A State Based Approach to the Representation and Recognition of Gesture," IEEE Trans. on Pattern Analysis and Machine Intelligence, 1997, pp. 1325-1337.

Boguraev et al., "Salience-Based Content Characterization of Text Documents," Proceedings of the ACL/EACL Workshop on Intelligent[Sic] Scalable Text Summarization, 1997, Topic Identification, Discourse-Based Summarization, 1997, pp. 1-12.

Boguraev et al., "Salience/based Content Characterization of Text Documents," in Proceedings of Workshop on Intelligent Scalable Text Summarization at the ACL/EACL Conference, Madrid, Spain, 12 pages, Jul. 7-12, 1997.

Boreczky, J. et al., "An Interactive Comic Book Presentation for Exploring Video," Conference on Human Factors in Computing Systems (CHI 2000), ACM Press, 2000, pp. 185-192.

Borland, J., "A New Prime Time," CNET News.com, pp. 1-7, downloaded Mar. 15, 2005.

Boykin et al., "Improving Broadcast News Segmentation Processing," IEEE Multimedia '99, 1999.

Boykin et al., "Machine Learning of Event Segmentation for News on Demand," Communications of the ACM, 2000, pp. 35-41, No. 43.

Brandow et al., "Automatic Condensation of Electronic Publication by Sentence Selection," Information Processing and Management; 1995, pp. 675-685, vol. 31, No. 5.

Brown et al., "Automatic Content-Based Retrieval of Broadcast News," ACM Multimedia 5, San Francisco, CA, 1995.

Byrd, D., "A Scrollbar-Based Visualization for Document Navigation," doc. ID: xxx.cs.IR/9902028, Computer Research Repository: Information Retrieval, 1999.

Chen et al., "Emotion Recognition from Audiovisual Information," Proc. IEEE Workshop on Multimedia Signal Processing, Los Angeles, CA, USA, 1998, pp. 83-88.

Chen et al., "ViBE: A Video Indexing and Browsing Environment," Proceedings of the SPIE Conference on Multimedia Storage and Archiving Systems, Sep. 20-22, 1999, Boston, 1999, pp. 148-164, vol. 3846.

Chiu et al., "NoteLook: Taking Notes in Meetings with Digital Video and Ink," ACM Multimedia 99, Orlando, 1999.

Chiu et al., "Automatically Linking Multimedia Meeting Documents by Image Matching," Proceedings of Hypertext '00, ACM, New York, 2000, pp. 244-245.

Choi, Y-I., "An Integrated Data Model and a Query Language for Content-Based Retrieval of Video," MIS''99, LCNS 1508, Sep. 1998, pp. 192-198.

Christel et al., "Evolving Video Skims into Useful Multimedia Abstractions," Proceedings of the CHI'98 Conference on Human Factors in Computing Systems, Los Angeles, CA, Apr. 1998, pp. 171-178.

Christel et al., "Information Visualization Within a Digital Video Library," Journal of Intelligent Information Systems, 1998, pp. 35-257, vol. 11.

"Computer Terms," downloaded from http://www.park-meadow.org/computer.sub.—terms.htm, downloaded Apr. 14, 2005, pp. 1-8.

Dellaert et al., "Recognizing Emotion in Speech," Proceedings ICSLP 96, Fourth International Conference on Spoken Language Processing, New York, (Cat. No. 96$^{th}$8206), IEEE, 1996, vol. 1970-1973.

Dimitrova et al., "Video Keyframe Extraction and Filtering: A Keyframe is not a Keyframe to Everyone," CIKM 1997, 1997, pp. 113-120.

Doermann et al., "Applying Algebraic and Differential Invariants for Logo Recognition," Machine Vision and Applications, 1996, pp. 73-86, Vol. 9.

Donato et al., "Classifying Facial Actions," IEEE Trans. on Pattern Analysis and Machine Intelligence, 1999, pp. 974-989, Vo. I. 21.

Drucker et al., "SmartSkip Consumer Level Browsing and Skipping of Digital Video Content," Paper: Technology to Help People Find Information, Minneapolis, Minnesota, USA, Apr. 20-25, 2002, pp. 219-226, vol. No. 4, Issue No. 1.

Essa et al., "Coding Analysis Interpretation and Recognition of Facial Expressions," IEEE Trans. on Pattern Analysis and Machine Intelligence, 1997, pp. 757-763, vol. 19.

Face Recognition Techniques described at web site http://www.visionics.com, 2002.

"Flexible JAMM Screenshots," downloaded from Internet site http://simon.cs.ct.edu/-jamm, May 4, 2000.

Foote, J. et al., "An Intelligent Media Browser Using Automatic Multimodal Analysis," ACM Multimedia 8, Bristol, UK, 1998.

"Fujitsu Markets Facsimile Connection System for Computer I/O," Comline Telecommunications, Nov. 1989, p. 5.

Furui et al., "Japanese Broadcast news Transcription and Information Extraction," Communications of the ACM, Feb. 2000, pp. 71-73, vol. 43, No. 2.

Gaudiosi, J., "TV Execs Go Gaga Over Gaming," Wired News, pp. 1-3, downloaded Mar. 15, 2005.

Gauvain et al., "Transcribing Broadcast News for Audio and Video Indexing," Communications of the ACM, 2000, pp. 64-70, vol. 43.

Gibbon, D.C., "Generating Hypermedia Documents from Transcriptions of Television Programs Using Parallel Text Alignment," Handbook of Internet and Multimedia Systems and Applications, CRC Press, 1998.

"Glossary for Computer Hardware and Micro Scoope," downloaded from http://www.mumbaicyber.com/glossary.sub.—com.sub.—hardware.sub.—m-icro.asp, downloaded on Apr. 14, 2005, pp. 1-11.

"Glossary: What Does It Mean?" downloaded from http://www.fairfield.k12.ct.us/fairfieldhs/cfairfieldhs03/glossary.htm, downloaded Apr. 14, 2005, pp. 1-3.

Gliedman, "Virtual Office Managers," Computer Shopper, 1998, p. 290, vol. 18.

Gordon, "Using Annotated Video as an Information Retrieval Interface," ACM Proceedings of the 5$^{th}$ International Conference on Intelligent User Interfaces, New Orleans, 2000, pp. 133-140.

Greenberg et al., "Sharing Fisheye Views in Relaxed-WYSIWIS Groupware Applications," Proceedings of the Graphics Interface, Toronto, Canada, May 22-24, 1995, Distributed by Morgan-Kaufmann, pp. 28-38, http://www.cpsc.ucalgary.ca/grouplab/papers/1996/96-Fisheye.GI/gi96 fisheye.html.

Grunin, L., "Action!" PC Magazine, Sep. 1993, p. 240-243, vol. 12, No. 15.

"Hang On-Blue Sky's WinHelp is on the Way," PC Week, Jul. 1995, p. 59.

Hauptmann et al., "Story Segmentation and Detection of Commercials in Broadcast News Video," Advances in Digital Libraries Conference, Santa Barbara, CA, Apr. 22-23, 1998.

Hauptmann et al., "Text Speech and Vision for Video Segmentation: the Information Project," Proc. AAAI Fall Symp. Computational Models for Integrating Language and Vision, Boston, MA, Nov. 10-12, 1995.

He et al., "Comparing Presentation Summaries: Slides vs. Reading vs. Listening," Conference on Human Factors in Computing Systems (CHI 2000), Apr. 1-6, 2000.

Hearst et al., "TileBars: Visualization of Term Distribution Information in Full Text Information Access," Proceedings of the ACM SIGCHI Conference on Human Factors in Computing Systems (CHI), Denver, CO, May 1995, pp. 1-8, http://www.acm.org/sigchi/chi95/Electronic/documnts/papers/mah bdy htm.

Hecht, "Embedded Data Glyph Technology for Hardcopy Digital Documents," Proc. SPIE, 1994, pp. 341-352, vol. 2171.

Hecht, "Printed Embedded Data Graphical User Interfaces," IEEE Computer, Mar. 2001.

Hill et al., "Edit Wear and Read Wear," ACM, May 3-7, 1992, pp. 3-9.

Hu et al., "Multimedia Description Framework (MDF) for Content Descriptions of Audio/Video Documents," Fourth ACM Conference on Digital Libraries (DL '99), Aug. 11-14, 1999.

"IBM, Partners Team on Web-Based Image Search, Printing Sep. 29, 1995," Newsbytes News Network.

IBM Technical Disclosure Bulletin, "Quick Selection of Window Environment Coordinates," 1992, pp. 57-60, vol. 35, Iss. #4B.

Identitech Unisys: Unisis Wins Florida Housing Finance Agency Contract; Identitech Provides Workflow Software Solution, Business Editors/Computer Writers, Jun. 1995.

Identitech: Identitech Announces FYI 2.5.2 Release with NT Object Server, SmartForm and ODBC, Business Editors, Jul. 1996.

Ioffe et al., "Finding People by Sampling," Proc. International Conference on Computer Vision, 1999. pp. 1092-1097.

"IT&T Talk," downloaded from http://www.iib.qld.gov.au/itcareers/talk.asp, downloaded Apr. 14, 2005, pp. 1-4.

Jin et al., "Topic Tracking for Radio, TV Broadcast, and Newswire," Proceedings of the DARPA Broadcast News Workshop, Feb. 28-Mar. 3, 1999, Herndon, VA.

Komlodi et al., "Key Frame Preview Techniques for Video Browsing," Proceedings of the 3$^{rd}$ ACM International Conference on Digital Libraries, Jun. 23-26, 1998, Pittsburgh, 1998, pp. 118-125.

Lam et al., Automatic Document Classification Based on Probabilistic Reasoning: Model and Performance Analysis, IEEE, 1997, pp. 2719-2723, vol. 3.

Langley, "An Analysis of Bayesian Classifiers," Proceedings of the Tenth National Conference on Artificial Intelligence, 1992, pp. 223-228.

Langley, "Induction of Selective Bayesian Classifiers," Proceedings of the Tenth International Conference on Uncertainty in Artificial Intelligence, 1994, pp. 400-406.

Li et al., "Automatic Text Detection and Tracking in Digital Video," IEEE Transactions on Image Processing—Special Issue on Image and Video Processing for Digital Libraries, 2000, pp. 147-156, vol. 9.

Li et al., "Text Extraction and Recognition in Digital Video," Proceedings of the Third IAPR Workshop on Document Analysis Systems, 1998, pp. 119-128.

Li et al., "Text Extraction, Enhancement and OCR in Digital Video," DAS '98, LNCS 1655, pp. 363-377, Springer-Verlag Berlin Heidelberg 1999.

Li et al., "Vision: A Digital Video Library," Proceedings of the 1$^{st}$ ACM International Conference on Digital Libraries, 1996, pp. 19-27.

Liang et al., "Practical Video Indexing and Retrieval Systems," SPIE, 1988, pp. 294-303, vol. 3240.

Lienhart et al., On the Detection and Recognition of Television Commercials,: Proc. IEEE Conf. on Multimedia Computing and Systems, Ottawa, Canada, Jun. 1997, pp. 509-516.

Lison, H. et al., "Sight and Sound," Unix Review, Oct. 1989, pp. 76-86, vol. 7, No. 10.

Ma et al., "An Indexing and Browsing System for Home Video," Invited Paper, EUSIPCO '2000, 10the European Signal Processing Conference, Sep. 5-8, 2000, Tampere, Finland.

Manber, "The Use of Customized Emphasis in Text Visualization," Proceedings of 1997 IEEE Conf. on Information Visualization, 1997, pp. 132-138.

Maybury, "News on Demand," Communications of the ACM, 2000, pp. 33-34, vol. 43.

Maybury et al., "Multimedia Summaries of Broadcast News," International Conference on Intelligent Information Systems, Dec. 8-10, 1997, pp. 447-449.

Maybury et al., "Segmentation, Content Extraction and Visualization of Broadcast News Video Using Multistream Analysis," AAAI Paper, 1997.

Merialdo et al., "Automatic Construction of Personalized TV News Programs," Seventh ACM International Multimedia Conference, Orlando, Nov. 1999.

Merlino et al., "Broadcast News Processing Techniques," MITRE Technical Report, MTR 99B0000031, Apr. 1999.

Merlino et al., "Broadcast News Navigation Using Story Segmentation," Advanced Information Systems Center, The MITRE Corporation, 1997.

Mohan, "Text-Based Search of TV News Stories," Proc. SPIE, 1996, pp. 2-13, vol. 2916.

"Multimedia" downloaded from http://en.wikipedia.org/wiki/Multimedia, downloaded Apr. 1, 2005, pp. 1-2.

Myers et al., "Multi-View Intelligent Editor for Digital Video Libraries," First ACM and IEEE Joint Conference on Digital Libraries, Jun. 24-28, 2001, Roanoke, VA, pp. 106-115.

Oh et al., "Efficient and Cost-Effective Techniques for Browsing and Indexing Large Video Databases," SIGMOD Conference 2000, pp. 415-426.

Ohmori, Y. et al., "Enhanced MultiMedia Recorder (EMMR): A Tool for Programmable Access to Organized Multimedia Data," John Shori Gakkai Kenkyu Hokoku, 1998, pp. 39-44, vol. 98, No. 35(HI-78).

Okada, H. et al., "Development of Application Programs for Distributed Processing Equipment," Review of the Electrical Communication Laboratories, Jul. 1986, pp. 465-471, vol. 34, No. 4.

Phillips, R.L., "MediaView: A General Multimedia Digital Publication System," Communications of the ACM, Jul. 1991, pp. 75-83, vol. 34, No. 7.

Photina et al., Improving Acoustic Models with Captioned Multimedia Speech, Proceedings IEEE International Conference on Multimedia Computing and Systems, 1999, pp. 767-771, vol. 2.

Roschelle, J. et al., "VideoNoter: A Productivity Tool for Video Data Analysis," Institute for Research on Learning, California, Psychonomic Society, Inc., Behavior Research Methods, Instruments & Computers, 1991, pp. 219-224, vol. 23, No. 2.

Rowley et al., "Neural Network-Based Face Detection," IEEE Transactions on Pattern Analysis and Machine Intelligence, 1998, pp. 23-28, vol. 20.

Saur, D.D., "Automated Analysis and Annotation of Basketball Vide," Feb. 1997, SPIE, pp. 176-187, vol. 3122.

Schweighofer et al., "The Automatic Generation of Hypertext Links in Legal Documents," Lecture Notes in Computer Science, Wagner et al., eds., from 7$^{th}$ Intl. Conf. DEXA 96', held Sep. 1996 in Zurich, Switzerland, vol. 1134.

Shahraray et al., "Automatic Generation of Pictorial Transcripts of Video Programs," Proceedings of the SPIE-Int. Soc. Opt. Eng., 1995, pp. 512-518, vol. 2417.

Product Brochure, Shutterfly, downloaded from http://www.shutterfly.com, downloaded Mar. 15, 2005, 10 pages.

Smith et al., "Video Skimming and Characterization Through the Combination of Image and Language Understanding," Computer Vision and Pattern Recognition IEEE, 1997.

Sodergard et al., "Integrated Multimedia Publishing—Combining TV and Newspaper Content on Personal Channels," downloaded from http://www8.org/w8-papers/1b-multimedia/integrated/integrated.html, downloaded Apr. 4, 2002, pp. 1-22.

Sonmez et al., "Multiple Speaker Tracking and Detection: Handset Normalization and Duration Scoring," Digital Signal Processing, 2000, pp. 133-143, vol. 10.

"Spry Inc.'s Internet Front End Picked for PSI Cable Internet Service," Apr. 1994, Information & Interactive Services Report, vol. 15, No. 7.

Strattner, A., "HP Pioneers I-TV Peripheral Market," Computer Shopper, Feb. 1994, p. 71, vol. 14, No. 2.

Suda et al., "Logo and Word Matching Using a General Approach to Signal Registration," Fourth International Conference on Document Analysis and Recognition, Ulm, Germany, Aug. 18-20, 1997, p. 61-65.

Sumita et al., Document Structure Extraction for Interactive Document Retrieval Systems, Proceedings of SIGDOC 93, 1993, pp. 301-310.

Taghva et al., "An Evaluation of an Automatic Markup System," SPIE Proceedings, Feb. 6-7 1995, pp. 317-327, vol. 2422.

Taghva et al., "Evaluation of an Automatic Markup System," Proceedings SPIE vol. 2422, Document Recognition II, p. 317-327, Mar. 1995.

Takahashi, D., "Some Gamers Scoring Amid Sales Slump, Sales of Video Games Hardware, Software and Peripherals Fall in 2003," San Jose Mercury News, Jan. 22, 2004.

Taxt, "Segmentation of Document Images," IEEE, 1989, pp. 1322-1329, vol. 11.

Tennenhouse et al., "A Software-Oriented Approach to the design of Media Processing Environments," Proceedings of the IEEE International Conference on Multimedia Computing and Systems, 1994, pp. 435-444.

Tonomura et al., "VideoMAP and VideoSpaceIcon: Tools for Anatomizing Video Content," Proc. INTERCHI '93 ACM, 1993, pp. 131-136.

Uchihashi et al., "Summarizing Video Using a Shot Importance Measure and a Frame-Packing Algorithm," Proceedings of the International Conference on Acoustics, Speech, and Signal Processing (Phoenix, AZ), 1999, pp. 3041-3044, vol. 6.

Uchihashi et al., "Video Manga; Generating Semantically Meaningful Video Summaries," ACM Multimedia 99, Orlando, Florida, Oct. 30-Nov. 5, 1999.

"The Unofficial Half Life MOD FAQ Version 2.6," pp. 1-12 downloaded from http://www.planethalflife.com/botman/MOD_FAQ.shtml on Mar. 15, 2005.

Van-Horn-Christopher, D.A., "Have You Talked to Your Computer Today!" Business Forum, 1994, pp. 10-11, vol. 19, No. 3, 4.

Video Content and Management and Publishing Software from Virage, http://www.virage.com, 2002.

"Video Mail Retrieval Using Voice" Cambridge University Engineering Department Computer Laboratory and Olivetti Research Laboratory Summary of Research Found at http://svr-www.eng.com.ac.uk/research/projects/vmr/, 1997.

"VNR Firm Offers Storyboards," PR News, Dec. 4, 1995, downloaded from http://proquest.umi.com/pqdlink?index=20&did=000000001 0830394&SrchMode=3&s-id.degree.1&F, downloaded Aug. 9, 2004.

"W3C Issues First Public Draft of Synchronized Multimedia Integration Language (SMIL)," Information Today, Feb. 1998, p. 27, 30, vol. 15, No. 2.

Wactlar et al., "Complementary Video and Audio Analysis for Broadcast News Archives," Communications of the ACM, 2000, pp. 42-27, vol. 43.

Wactlar et al., "Intelligent Access to Digital Video: Informedia Project," Computer, 1996, pp. 46-52, vol. 29.

Web pages from PaperClick.com printed from http://www.paperclick.com on Jun. 14, 2006.

Weiss et al., "Composition and Search with a Video Algebra," IEEE Multimedia, 1995, pp. 12-25, vol. 2.

Wittenburg et al., Browsing with Dynamic Key Frame Collages in Web-Based Entertainment Video Services, in Proceedings of the IEEE International Conference on Multimedia Computing and Sytems, Jun. 7-11, 1999, Florence, Italy, 1999, pp. 913-918, vol. 2.

"Study: Women Over 40 Biggest Online Gamers," CNN Technology, Feb. 11, 2004, pp. 1-2 downloaded from http://www.cnn.com/2004/TECH/fun.games/02/11/video.games.women.reut/ on Mar. 15, 2005.

"C:\... \9149920c.wpd—unmodified" Screen Shots of Document Created in Corel WordPerfect, Apr. 30, 2002, 4 pages.

Product Brochure, YesVideo, downloaded from http://www.yesvideo.com/code, downloaded Mar. 15, 2005, 20 pages.

Zhang et al., "Detection of Text Captions in Compressed Domain Video," International Multimedia Conference Proceedings of the 2000 ACM Workshops on Multimedia 2000, Los Angeles, California, United States, pp. 201-204.

Chinese Application No. 2004100849823 Office Action, Jun. 1, 2007, 24 pages.

Chinese Application No. 2004100897988 Office Action, Apr. 6, 2007, 8 pages.

Stifelman, L. et al., "The Audio Notebook," SIGCHI 2001, Mar. 31-Apr. 5, 2001, pp. 182-189, vol. 3, No. 1, Seattle, WA.

Arai, T. et al., "PaperLink: A Technique for Hyperlinking from Real Paper to Electronic Content," CHI 97, Atlanta, GA, Mar. 22-27, 1997, pp. 327-334.

Dorai, C. et al., "End-to-End VideoText Recognition for Multimedia Content Analysis," IEEE, International Conference on Multimedia and Expo, Aug. 2001, pp. 601-604.

Hecht, D.L., "Printed Embedded Data Graphical User Interfaces," Computer, Mar. 2001, pp. 47-55, vol. 34, Issue 3.

Klemmer, S.R. et al., "Books with Voices: Paper Transcripts as a Tangible Interface to Oral Histories," CHI 2003, Fort Lauderdale, FL, Apr. 5-10, 2003, pp. 89-96.

Japanese Office Action, Japanese Application No. 2003-158077, Jun. 10, 2008, 4 pages.

Abdel-Mottaleb, M. et al., "Face Detection in Complex Environments from Color Images," IEEE ICIP 622-626, 1999.

Adobe Acrobat Reader 3.0 screen dumps (fig. 1-3), 1996.

Brown et al., "A Diary Study of Information Capture in Working Life," Proceedings of ACM CHI 2000 Conference on Human Factors in Computing Systems, 2000, pp. 438-445, vol. 1.

"c:\...\9149920c.wpd—unmodified" Screen Shots of document created in Corel WordPerfect, 4 pages (Apr. 30, 2002).

Damiani, E. et al. "A Fine-Grained Access Control System for XML Documents," ACM Transactions on Information and System Security, May 2002, pp. 169-202, vol. 5, No. 2.

U.S. Appl. No. 10/660,867, filed Sep. 12, 2003, Erol et al.

Erol, Berna et al., "Linking Multimedia Presentations With Their Symbolic Source Documents: Algorithm and Applications," ACM Multimedia '03, Nov. 2-8, 2003, pp. 498-507, Berkeley, CA.

Erol, B. et al., "Local Motion Descriptors," IEEE Workshop on Multimedia Signal Processing, 467-472, 2001.

Erol, Berna et al., "Prescient Paper: Multimedia Document Creation With Document Image Matching," 17th International Conference on Pattern Recognition, Aug. 2004, 4 pp., Cambridge, U.K.

Erol, Berna et al, "Retrieval of Presentation Recordings With Digital Camera Images," IEE Conference on Computer Vision and Pattern Recognition (CVPR), Jun. 27-Jul. 2, 2004, 2 pages, Washington, D.C.

European Search Report, EP 05008745, Jun. 6, 2005, 4 pages.

Foote, J. et al., "Finding Presentations in Recorded Meeting Using Audio and Video Features." ICASPP, 3029-3032, 1999.

Foote, J. et al., "FlyCam: Practical Panoramic Video and Automatic Camera Control," Proceedings of International Conference on Multimedia & Expo, 3:1419-1422, 2000.

Glance, Natalie et al., "Knowledge Pump: Community-Centered Collaborative Filtering," Xerox Research Centre Europe, Grenoble Laboratory, Oct. 27, 1997, pp. 1-5.

Grasso, A. et al., "Augmenting Recommender Systems by Embedding Interfaces Into Practices," Proceedings of the 33rd Hawaii International Conference on System Sciences 2000 IEEE, pp. 1-9.

Greenberg, Saul, "A Fisheye Text Editor for Relaxed-WYSIWIS Groupware," ACM SIGCHI'96 Conference on Human Factors in Computing System, Companion Proceedings, 1996, pp. 212-213.

Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.

Hoadley, C., "A Very Short Introduction to UNIX," The Metropolitan State College of Denver/Information Technology Center for Technology Services, Apr. 30, 2002, pp. 1-18.

Hsu, R.L. et al., "Face Detection in Color Images," Proc. International Conference on Image Processing, 1046-1049, 2001.

Jang, et al., "Improving Acoustic Models With Captioned Multimedia Speech," IEEE, 1999, pp. 767 771.

Johnson, S.E., "Who Spoke When?—Automatic Segmentation and Clustering for Determining Speaker Turns," Proc. Of Eurospeech, 679-682, 1999.

Kapralos, B. et al., "Eyes 'n Ear Face Detection," 2001 International Conference on Image Processing, 1:65-69, 2001.

Karasik, D. "Image Processing in Perl Graphic Applications," Google, Apr. 2, 2003, pp. 1-12.

Khare, R., "Anatomy of a URL (and other Internet-Scale Namespaces, Part 1)," IEEE Internet Computing, Sep.-Oct. 1999, pp. 78-81.

Kimber, D. et al., "Acoustic Segmentation for Audio Browsers," Proc. Interface Conference, Sydney, Australia, 10 pages, 1996.

Lauesen, S., "User Interface Design: A Software Engineering Perspective," 2005, 28 pages.

Lee, D. et al., "Segmenting People in Meeting Videos Using Mixture Background and Object Models," Proc. of Pacific Rim Conference on Multimedia, Taiwan, Dec. 16-18, pages, 2002.

Lienhart, Rainer et al., "Localizing and Segmenting Text in Images and Videos," IEEE Transactions on Circuits and Systems for Video Technology, Apr. 2002, pp. 256-268, vol. 12, No. 4.

Lutz, Raymond, "BrowseFax Initiative," MPFA Information Site, downloaded from Internet, http://www.mtpa.org/pub/browsefax_wp.htm on May 14, 2004.

Maybury, M. et al., "Segmentation, Content Extraction and Visualization of Broadcast News Video Using Multistream Analysis," AAAI Paper, 1997.

Meyers et al., "Facsimile with Encrypted Hard Copy," IBM Technical Disclosure Bulletin, TDB 04-78, Apr. 1, 1978, pp. 4994-4995, [online] [Retrieved on Apr. 7, 2006] Retrieved from the Internet <URL:http://www.ip.com/pubview/IPCOM0000694470>.

"Microsoft Powerpoint—Wikipedia, the free encyclopedia," Wikimedia Foundation, Inc., [online] [Retrieved on Nov. 7, 2006] Retrieved from the internet <URL:http://en.wikipedia.org/wiki/Microsoft_PowerPoint>.

Otsu, N., "A Threshold Selection method From Gray-Level Histograms," IEEE Transactions on Systems, Man and Cybernetics, Jan. 1979, pp. 62-66, vol. SMC-9, No. 1.

Pfau, T. et al., "Multispeaker Speech Activity Detection for the ICSI Meeting Recorder," Proc. IEEE Automatic Speech Recognition and Understanding Workshop, 4 pages, 2001.

Pingali, G. et al., "Multimedia Retrieval Through Spatio-Temporal Activity Maps," ACM Multimedia 129-136, 2001.

Rist, T. et al. "Adding Animated Presentation Agents to the Interface," ACM International Conference on Intelligent User Interfaces, pp. 79-86, 1997.

Rui, Y. et al., "Viewing Meetings Captured by an Omni-Directional Camera," ACM SIGCHI '01, vol. 3, No. 1, pp. 450-457, Seattle, Mar. 31-Apr. 4, 2001.

Shen, H. et al. "Access Control for Collaborative Environments," CSCW 92 Proceedings, Nov. 1992, pp. 51-58.

Sloman, M., "Policy Driven Management for Distributed Systems," To be published in Journal of Network and Systems Management, Plenum Press, 1994, vol. 2, No. 4.

Snowdon, Dave et al., "Diffusing Information in Organizational Settings: Learning from Experience," CHI 2002, vol. No. 4, Issue No. 1, Apr. 20-25, Minneapolis, Minnesota, pp. 331-338.

Srihari, S.N. et al., "Name and Address Block Reader System for Tax Form Processing," IEEE, 1995, pp. 5-10.

Sun, X. et al., "A Motion Activity Descriptor and its Extraction in Compressed Domain," Proc. IEEE Pacific-Rim Conference on Multimedia (PCM '01), 4 pages, 2001.

Sun, X. et al., "Panoramic Video Capturing and Compressed Domain Virtual Camera Control," ACM Multimedia, pp. 329-338, 2001.

Tritschler, A. et al., "Improved Speaker Segmentation and Segments Clustering Using the Bayesian Information Criterion," Proc. Of Eurospeech, pp. 679-682, 1999.

U.S. Appl. No. 09/714,785, filed Nov. 15, 2000 (not enclosed).

VideoLogger, Automate Video Acquisition and Production, Virage, Inc., [online] [Retrieved on Apr. 26, 2002] Retrieved from the Internet <URL:http://www.virage.com/products/details.cfm?productID=5&categoryID=1>.

Waibel, A. et al., "Advances in Automatic Meeting Record Creation and Access," Proceedings of the International Conference on Acoustics, Speech, and Signal Processing, pp. 597-600, 2001.

Wilcox, L. et al., "Annotation and Segmentation for Multimedia Indexing and Retrieval," Proceedings of the Thirty-First annual Hawaii International Conference on System Sciences (Wailea, Hawaii), vol. II, pp. 259-267, Jan. 1998.

Xerox, "Flowport™ Xerox Image Routing Software FlowPort Overview," Xerox Corporation, 2003, 4 pages.

Yang, J. et al., "Multimodal People ID for a Multimedia Meeting Browser," Proceedings of ACM Multimedia, pp. 159-168, 1999.

Yang, M.H. et al., "Detecting Faces in Image: A Survey," IEEE Transactions on Pattern Analysis and Machine Intelligence, 24(1):34-58, 2002.

Zdnet, "Captured! Three document capture systems tested," Zdnet, Technology & Business, Nov. 28, 2002, [visited on Apr. 29, 2003] <http://www.zdnet.com/au/printfriendly?AT=2000023555-20270277-4>, 8 pages.

Boreczky, J. et al., "An Interactive Comic Book Presentation for Exploring Video," CHI Letters, Apr. 1-6, 2000, pp. 185-192, vol. 2, Issue 1.

Buchanan, M.C. et al., "Multimedia Documents as User Interfaces," INTERCHI '93, Amsterdam, The Netherlands, Apr. 24-29, 1993, pp. 527-528.

Harada, K. et al., "Anecdote: A Multimedia Storyboarding System with Seamless Authoring Support," ACM Multimedia '96, Boston, MA, 1996, pp. 341-351.

Mackay, W. et al., "Augmenting Reality: Adding Computational Dimensions to Paper," Communications of the ACM, Jul. 1993, pp. 96-97, vol. 36, No. 7.

Mackay, W. et al., "Video Mosaic: Laying Out Time in a Physical Space," Multimedia '94, San Francisco, CA, Oct. 1994, pp. 165-172.

Makedon, F. et al., "Multimedia Authoring, Development Environments and Digital Video Editing," Dartmouth College Technical Report, PCS-TR94-231, 2001, pp. 1-24.

Nelson, L. et al, "Palette: A Paper Interface for Giving Presentations," CHI '99, May 1999, pp. 1-8.

Roschelle, J. et al., "VideoNoter: A Productivity Tool for Video Data Analysis," Behavior Research Methods, Instruments & Computers, 1991, pp. 219-224, vol. 23, No. 2.

Tonomura, Y. et al., "VideMAP and VideoSpaceIcon," INTERCHI '93, Amsterdam, The Netherlands, Apr. 24-29, 1993, pp. 131-136 and 544.

Wellner, P., "Interacting with Paper on the DigitalDesk," Communications of the ACM, Jul. 1993, pp. 87-96, vol. 36, No. 7.

Groot, M., "Multimedia Projectors: A Key Component in the Classroom of the Future," T.H.E. Journal Online, Jun. 2002, pp. 1-4, [Online] [Retrieved on Jul. 1, 2002] Retrieved from the Internet<URL:http://www.thejournal.com/magazine/vault/A4056.cfm>.

Shelbourn, M., et al., "Multimedia in Construction Education: New Dimensions," Automation in Construction, 2001, pp. 265-274, vol. 10, Elsevier.

Machine Translation of JP 10049761 by Mori et al., 9 pages.

Mulhern, P. et al., "Pivot Vector Space Approach for Audio-Video Mixing," IEEE Multimedia, Apr.-Jun. 2003, pp. 28-40, vol. 10, Issue 2.

Srinivasan, U. et al., "Multi-Modal Feature-Map: An Approach to Represent Digital Video Sequences," VISUAL '99, LNCS 1614, 1999, pp. 299-306, Springer-Verlag, Berlin, Germany.

United States Office Action, U.S. Appl. No. 10/814,844, Sep. 11, 2009, 23 pages.

Ueno, M. et al., "Multimedia Information EPG and its Use: A Proposal of Multimedia EPG", Proceedings of the Institute of Electronics, Information and Communication Engineers (IEICE) General Conference, Basic/Boundary, Mar. 6, 1998, pp. 357 (7 pages including translation).

Japanese Office Action, Japanese Application No. 2004-278346, Feb. 16, 2010, 2 pages.

Japanese Office Action, Japanese Application No. 2004-278349, Feb. 2, 2010, 2 pages.

Tonomura, Y. et al., "Structured Video Computing," IEEE Multimedia, Sep. 1994, pp. 34-43, vol. 1, Issue 3.

European Search Report, Application No. EP 04255847.8-1247/1526442, 4 pages, Jun. 5, 2010.

United States Office Action, U.S. Appl. No. 11/094,887, Jul. 21, 2010, 44 pages.

* cited by examiner

MULTIMEDIA PRINT DRIVER DIALOG INTERFACES

CROSS-REFERENCES TO RELATED APPLICATIONS

This application claims the benefit of the following provisional patent applications, each of which is incorporated by reference in its entirety: U.S. Provisional patent application entitled "Printer Including One or More Specialized Hardware Devices" filed on Sep. 25, 2003, having Ser. No. 60/506,303, and U.S. Provisional patent application entitled "Printer Driver, Interface and Method for Selecting and Printing Representations of Audio, Video or Processed Information" filed on Sep. 25, 2003, having Ser. No. 60/506,206

This application is related to the following co-pending U.S Patent Applications (hereinafter referred to as the "Video Paper Applications"), each of which is hereby incorporated by reference in its entirety: U.S. patent application Ser. No. 10/001,895, "Paper-based Interface for Multimedia Information," filed Nov. 19, 2001; U.S. patent application Ser. No. 10/001,849, "Techniques for Annotating Multimedia Information," filed Nov. 19, 2001; U.S. patent application Ser. No. 10/001,893, "Techniques for Generating a Coversheet for a paper-based Interface for Multimedia Information," filed Nov. 19, 2001; U.S. patent application Ser. No. 10/001,894, "Techniques for Retrieving Multimedia Information Using a Paper-Based Interface," filed Nov. 19, 2001; U.S. patent application Ser. No. 10/001,891, "Paper-based Interface for Multimedia Information Stored by Multiple Multimedia Documents," filed Nov. 19, 2001; U.S. patent application Ser. No. 10/175,540, "Device for Generating a Multimedia Paper Document," filed Jun. 18, 2002; and U.S. patent application Ser. No. 10/645,821, "Paper-Based Interface for Specifying Ranges," filed Aug. 20, 2003.

This application is related to the following co-pending U.S Patent Applications, each of which is hereby incorporated by reference in its entirety: U.S. patent application Ser. No. 10/081,129, to Graham, entitled "Multimedia Visualization and Integration Environment," filed on Feb. 21, 2002; U.S. patent application Ser. No. 10/701,966, to Graham, entitled "Multimedia Visualization and Integration Environment," filed on Nov. 4, 2003; U.S. patent application Ser. No. 10/465,027, to Graham, et. al., entitled "Interface For Printing Multimedia Information," filed on Jun. 18, 2003; U.S. patent application Ser. No. 10/465,022 entitled "Techniques For Displaying Information Stored In Multiple Multimedia Documents," to Graham, et. al., filed on Jun. 18, 2003; U.S. patent application Ser. No. 10/174,522, to Graham, entitled "Television-Based Visualization and Navigation Interface, filed on Jun. 17, 2002; and U.S. patent application Ser. No. 10/795,031 to Graham, entitled "Multimedia Visualization and Integration Environment," filed Mar. 3, 2004.

This application is also related to the following co-pending patent applications, each of which is hereby incorporated by reference in its entirety: U.S. patent application entitled, "Printer Having Embedded Functionality for Printing Time-Based Media," to Hart et al., filed Mar. 30, 2004, U.S. patent application entitled, "Printer With Hardware and Software Interfaces for Peripheral Devices," to Hart et al., filed Mar. 30, 2004, U.S. patent application entitled, "Printer User Interface," to Hart et al., filed Mar. 30, 2004, U.S. patent application entitled, "User Interface for Networked Printer," to Hart et al., filed Mar. 30, 2004, and U.S. patent application entitled, "Stand Alone Multimedia Printer With User Interface for Allocating Processing," to Hart et al., filed Mar. 30, 2004, U.S. Patent Application entitled "Networked Printing System Having Embedded Functionality for Printing Time-Based Media," to Hart, et al., filed Mar. 30, 2004, U.S. Patent Application entitled "Printable Representations for Time-Based Media," to Hull, et. al., filed on Mar. 30, 2004,and U.S. Patent Application entitled "Printing System with Embedded Audio/Video Content Recognition and Processing," to Hull et. al., filed on Mar. 30, 2004.

BACKGROUND OF THE INVENTION

1. Field of the Invention

The present invention relates to systems and methods for providing a multimedia printing interface. In particular, the present invention relates to systems and methods for providing a print driver dialog interface that allows users to format multimedia data to generate a representation of multimedia data.

2. Description of the Background Art

Printers in modern systems today are not designed to generate multimedia documents. Currently, there is not any effective method for generating an easily readable representation of multimedia content in either paper or digital format. Several different techniques and tools are available for accessing and navigating multimedia information (e.g., existing multimedia players). However, none of these provide the user with the option of creating a multimedia document that the user can easily review and through which a user can gain access to multimedia content.

Printers in modern systems today are also not designed to facilitate interaction with multimedia content or with print content, in general. Standard printer dialog boxes provide users with some general formatting options in a print job, such as number of pages to print, number of copies to be made, and the like. However, printer drivers in modern operating systems are not designed to facilitate interactive information gathering. Since the print job can be redirected to another printer, or the printing protocol does not allow such interactive sessions, the operating system does not encourage interaction with the user.

Due to these limitations in printer interaction, the user cannot define more detailed printing preferences in standard printing. Additionally, the user cannot define any printing preferences at all regarding multimedia content, since such printing capabilities are not currently available. Thus, a user cannot use current print dialog boxes to select segments of multimedia content that are of interest for printing. Current print dialog boxes also do not permit a user to preview any multimedia content. Additionally, there is not any way for a user to search through a lengthy multimedia segment for particular features of interest. For example, a user cannot currently search through a news segment for content covering a particular topic, nor can a user search for specific faces or events in a news segment. Moreover, there is no way to define a printing format for selected segments of multimedia content, and there is no way to preview or modify printing formats directly through a print dialog box.

Therefore, what is needed is a system and methods for permitting user interaction with and control over generation of a multimedia representation that overcomes the limitations found in the prior art.

SUMMARY OF THE INVENTION

The present invention overcomes the deficiencies and limitations of the prior art with a system and method providing a user interface that permits users to interact with media content analysis processes and media representation generation processes. The system of the present invention includes a user interface for allowing a user to control the media content analysis and media representation generation. A media analysis software module analyzes and recognizes features of the media content. In addition, the system can include an output device driver module that receives instructions from the user and drives the media content analysis and the media representation generation. For example, the media software analysis module recognizes features, such as faces, speech, text, etc. The system can also include an augmented output device for generating a media representation. Processing logic manages the display of a user interface that allows the user to control generation of a multimedia representation. Processing logic also controls the generation of a printable multimedia representation. The representation can be generated in a paper-based format, in digital format, or in any other representation format. The user interface includes a number of fields through which the user can view media content and modify the media representation being generated.

The methods of the present invention include interacting with a user interface to control the media data analysis and media representation generation. The methods further include analyzing features of media data for media representation generation, driving the media data analysis, and driving the media representation generation by receiving instructions and sending instructions regarding media representation parameters. Additionally, the methods can include generating a media representation.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION OF THE PREFERRED EMBODIMENTS

Figure 1:
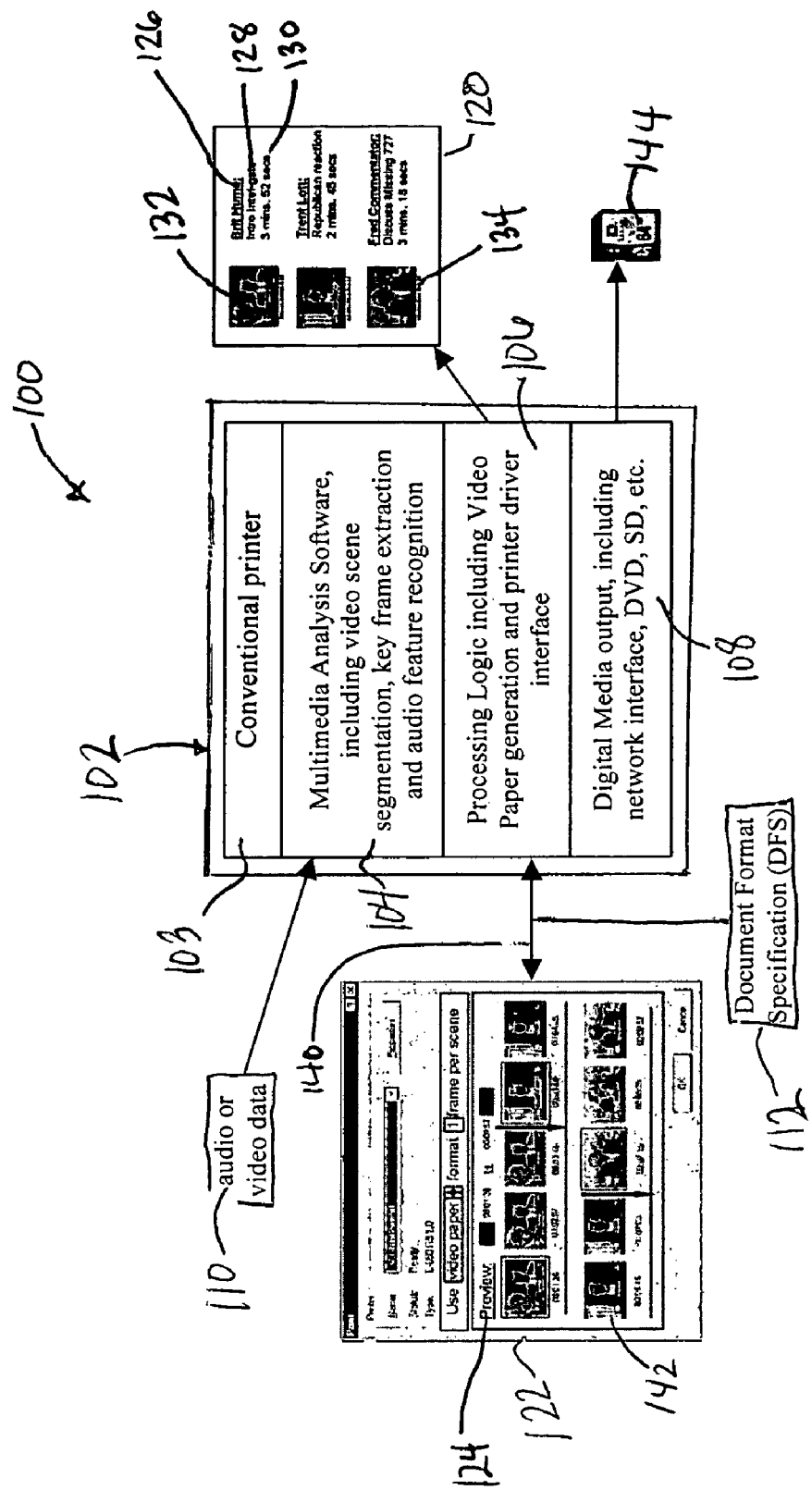
FIG. 1 is a block diagram of a system for providing a print driver dialog interface that allows users to format multimedia data before generating a representation of the multimedia data.

A system and method for providing a graphical user interface or print driver dialog interface that allows users to interact with a process of multimedia representation generation is described. According to an embodiment of the present invention, a graphical user interface is provided that displays multimedia information that may be stored in a multimedia document. According to the teachings of the present invention, the interface enables a user to navigate through multimedia information stored in a multimedia document.

For the purposes of this invention, the terms "media," "multimedia," "multimedia content," "multimedia data," or "multimedia information" refer to any one of or a combination of text information, graphics information, animation information, sound (audio) information, video information, slides information, whiteboard images information, and other types of information. For example, a video recording of a television broadcast may comprise video information and audio information. In certain instances the video recording may also comprise close-captioned (CC) text information, which comprises material related to the video information, and in many cases, is an exact representation of the speech contained in the audio portions of the video recording. Multimedia information is also used to refer to information comprising one or more objects wherein the objects include information of different types. For example, multimedia objects included in multimedia information may comprise text information, graphics information, animation information, sound (audio) information, video information, slides information, whiteboard images information, and other types of information.

For the purposes of this invention, the terms "print" or "printing," when referring to printing onto some type of medium, are intended to include printing, writing, drawing, imprinting, embossing, generating in digital format, and other types of generation of a data representation. Also for purposes of this invention, the output generated by the system will be referred to as a "media representation," a "multimedia document," a "multimedia representation," a "document," a "paper document," or either "video paper" or "audio paper." While the words "document" and "paper" are referred to in these terms, output of the system in the present invention is not limited to such a physical medium, like a paper medium. Instead, the above terms can refer to any output that is fixed in a tangible medium. In some embodiments, the output of the system of the present invention can be a representation of multimedia content printed on a physical paper document. In paper format, the multimedia document takes advantage of the high resolution and portability of paper and provides a readable representation of the multimedia information. According to the teachings of the present invention, a multimedia document may also be used to select, retrieve, and access the multimedia information. In other embodiments, the output of the system can exist in digital format or some other tangible medium. In addition, the output of the present invention can refer to any storage unit (e.g., a file) that stores multimedia information in digital format. Various different formats may be used to store the multimedia information. These formats include various MPEG formats (e.g., MPEG 1, MPEG 2, MPEG 4, MPEG 7, etc.), MP3 format, SMIL format, HTML+TIME format, WMF (Windows Media Format), RM (Real Media) format, Quicktime format, Shockwave format, various streaming media formats, formats being developed by the engineering community, proprietary and customary formats, and others.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, certain features of the present invention are described primarily with reference to video content. However, the features of the present invention apply to any type of media content, including audio content, even if the description discusses the features only in reference to video information.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now to FIG. 1, an exemplary system 100 for providing a graphical user interface that allows users to format multimedia data for generating a multimedia representation is shown. In this embodiment, there is shown an augmented output device or a printer 102 for generating multimedia representations. The printer 102 displays multimedia data, such as audio or video data, which the user can manage and edit through the user interface or print driver dialog interface (PDDI) 122. While the term "print driver dialog interface" or "PDDI" will be used to refer to the graphical user interface, the graphical user interface is not limited to printers and may be any graphical user interface that provides the functionality described below. The multimedia information that is displayed in the PDDI 122 may be stored in a multimedia document that is accessible to system 100. The multimedia information may be stored directly on system 100, or it may be information stored on an external storage device or a server (not shown) from which multimedia information may be accessed by system 100 via connection 140.

In other embodiments, instead of accessing a multimedia document, the system 100 may receive a stream of multimedia information (e.g., a streaming media signal, a cable signal, etc.) from a multimedia information source. According to an embodiment of the present invention, system 100 stores the multimedia information signals in a multimedia document and then generates the interface 122 that displays the multimedia information. Examples of sources that can provide multimedia information to system 100 include a television, a television broadcast receiver, a cable receiver, a video recorder, a digital video recorder, a personal digital assistant (PDA), or the like. For example, the source of multimedia information may be embodied as a television that is configured to receive multimedia broadcast signals and to transmit the signals to system 100. In this example, the information source may be a television receiver/antenna providing live television feed information to system 100. The information source may also be a device such as a video recorder/player, a DVD player, a CD player, etc. providing recorded video and/or audio stream to system 100. In alternative embodiments, the source of information may be a presentation or meeting recorder device that is capable of providing a stream of the captured presentation or meeting information to system 100. Additionally, the source of multimedia information may be a receiver (e.g., a satellite dish or a cable receiver) that is configured to capture or receive (e.g., via a wireless link) multimedia information from an external source and then provide the captured multimedia information to system 100 for further processing. Multimedia content can originate from a proprietary or customized multimedia player, such as Real-Player™, Microsoft Windows Media Player, and the like.

In alternative embodiments, system 100 may be configured to intercept multimedia information signals received by a multimedia information source. System 100 may receive the multimedia information directly from a multimedia information source or may alternatively receive the information via a communication network.

The augmented output device or printer 102 comprises a number of components that including a conventional printer 103, a media analysis software module 104, processing logic 106, and digital media output 108. The conventional printer 103 component of the printer 102 can include all or some of the capabilities of a standard or conventional printing device, such as an inkjet printer, a laser printer, or other printing device. Thus, conventional printer 103 has the functionality to print paper documents, and may also have the capabilities of a fax machine, a copy machine, and other devices for generating physical documents. More information about printing systems is provided in the U.S. Patent Application entitled "Networked Printing System Having Embedded Functionality for Printing Time-Based Media," to Hart, et al., filed Mar. 30, 2004, and which was incorporated by reference previously.

The media analysis software module 104 includes audio and video content recognition and processing software. The media analysis software module 104 can be located on the printer 102 or can be located remotely, such as on a personal computer (PC). Some examples of such multimedia analysis software include, but are not limited to, video event detection, video foreground/background segmentation, face detection, face image matching, face recognition, face cataloging, video text localization, video optical character recognition (OCR), language translation, frame classification, clip classification, image stitching, audio reformatter, speech recognition, audio event detection, audio waveform matching, audio-caption alignment, video OCR and caption alignment. Once a user selects "print" within system 100, the system 100 can analyze multimedia content using one or more of these techniques, and can provide the user with analysis results from which the user can generate a document.

In the embodiment shown in FIG. 1, the printer 102 additionally comprises processing logic 106 that controls the PDDI 122 and manages the printer's 102 generation of a multimedia document 120 or media representation. For example, the processing logic 106 manages the display of the PDDI 122 that allows the user control certain printer actions, such as the processing of the multimedia content or the format in which the multimedia content will be displayed in a multimedia representation. Alternatively, the functionality of the PDDI 122 can be provided by a web interface, allowing the user to manage printer actions, such as formatting issues, through this web interface.

In the example shown in FIG. 1, the PDDI 122 displays a user's selections which include the printing of a multimedia document 120 that displays video content. In this example, the user has selected to have the multimedia content printed in video paper format, and the video paper will display one frame per scene. Additionally, the interface 122 includes a preview field 124 that displays a preview of the multimedia representation that the user is creating. In the FIG. 1 example, the PDDI 122 shows thumbnail pictures 142 of the video frames.

Additionally, the PDDI 122 can allow the user to set formatting preferences with regard to the multimedia document 120 produced. In some embodiments, the user can set preferences as to document format and layout, font type and size, information displayed in each line, information displayed in a header, size and location of schedule columns, font colors, line spacing, number of words per line, bolding and capitalization techniques, language in which the document is printed, paper size, paper type, and the like. For example, the user might choose to have a multimedia document that includes a header in large, bold font showing the name of the multimedia content being displayed (e.g., CNN News segment), and the user can choose the arrangement of video frames to be displayed per page.

As shown in the embodiment of FIG. 1, a data structure called a Document Format Specification (DFS) 112 is generated by print driver software. The DFS 112 represents the transformation(s) of the multimedia data. The DFS 112 is used to populate the PDDI 122 and is modified by the system 100. The DFS 112 determines the feature extraction options presented to the user, which can be applied to the multimedia data. The DFS 112 also determines the format guidelines used to produce the output document. The DFS 112 can be supplied by an external application, such as a print driver on a PC, or it can be determined internally, within the printer 102.

The DFS 112 can include meta data information about a multimedia file, such as information about the title of the multimedia content, the producer/publisher of the multimedia content, and the like. The DFS 112 can also include other information, such as beginning and ending times of a multimedia segment (e.g., beginning and ending times of an audio recording), and a specification for a graphical representation of the multimedia data that can be displayed along a time line (e.g., a waveform showing the amplitude of an audio signal over time). The DFS 112 can further include a specification for time stamp markers and meta-data for each time stamp (e.g., textual tags or bar codes) that could be displayed along the timeline, and layout parameters that determine the appearance of the physical multimedia document 120. More information about the DFS 112 and examples are provided in the U.S. Utility Application entitled "Printable Representations for Time-Based Media," to Hull, et. al., filed on Mar. 30, 2004, which is incorporated by reference herein, in its entirety.

The multimedia document 120 generated by the printer 102 can comprise various formats. For example, the multimedia document 120 can comprise a paper document, such as video paper of the form shown in FIG. 1. The multimedia document 120 produced by the printer 102 can be also stored on digital media 144. As shown in FIG. 1, this embodiment of the printer 102 includes digital media output device or interface 108. The digital media writing hardware can include, for example, a network interface card, a digital video disc (DVD) writer, a secure digital (SD) writer, a compact disc (CD) writer, and the like. The multimedia content can be stored on digital media 144, such as flash media, a DVD, a CD, and the like.

The multimedia document 120 can have a number of different types of layouts and can display various types of information. FIG. 1 provides an example of a video paper document displaying video frames from one or more news segments. In the FIG. 1 example, the video paper document includes thumbnail images or frames 132 extracted from video information and displaying video content that the user can preview. In this embodiment, the user can designate formatting preferences for the video paper document through the PDDI 122. The layout and format information may specify the sampling rate for extracting the multimedia frames 132, the number of frames 132 that are to be extracted from the video information, the order and placement of the frames 132 on the medium, and other like information. For video information, the printer 102 can extract frames 132 that capture salient features of the video (or frames that are informative) for a particular segment of the multimedia information. Additionally, as discussed previously, the printer 102 may include feature recognition capabilities (e.g., face recognition, face detection, OCR, and the like), allowing the user to search within a video segment for items of interest, such as particular face images, particular words displayed as text, and the like. For example, the printer 102 can use face recognition techniques to extract frames displaying images of the faces of particular persons for which the user has an interest in viewing.

In another embodiment of the present invention, user-selectable identifiers 134 (e.g., a barcode) are associated with each frame 132. In the FIG. 1 example, the user selectable identifiers 134 are displayed under each frame 132, but these can alternatively be displayed anywhere on the page. The user-selectable identifiers 134 act as an interface to permit users to access or retrieve the multimedia content displayed on the multimedia document 120. A user selects the user-selectable identifier 134 by scanning the appropriate barcode on the printed paper document using any type of device that has a barcode scanner incorporated into it, such as a cell phone or a PDA. For example, by scanning the barcode of FIG. 1, the user can cause the video clip to be displayed on a display device (e.g., a television, a PC monitor, a cell phone screen, a PDA, and the like) and the user can view the content. As another example, the paper multimedia document 120 can also or alternatively include numerical identifiers included near each frame 132, and the user can type these numerals into a keypad or touchpad associated with a device to direct the system 100 to display a video clip on the display device. Alternatively, if the video paper document shown in FIG. 1 were in digital format, the system 100 could be configured so that a user could select the frame 132 (i.e., by clicking on the frame with a mouse or other selection device) causing the video content to be displayed on a display device.

The printer 102 is capable of retrieving multimedia information corresponding to the user-selectable identifiers 134. The signal communicated to the printer 102 from the selection device (i.e., device with barcode scanner or keypad for entering in numerical identifiers) may identify the multimedia content frame 132 selected by the user, the location of the multimedia content to be displayed, the multimedia paper documents from which the segments are to be selected, information related to preferences and/or one or more multimedia display devices (e.g., a television set) selected by the user, and other like information to facilitate retrieval of the requested multimedia information. For example, the system 100 can access a video file stored on a PC, and the system can play this video content on the user's command.

The example of FIG. 1 further shows text information next to each frame 132 in the multimedia document 120. The text information includes the speaker name field 126 or a field displaying the name (e.g., Brit Hume) of the person shown in the frame 132 of the video. The text information further includes the subject field 128 that displays information about the video segment subject (e.g., Intro Intel-gate). Additionally, the text information includes the time field 130, which displays the length of time of the video segment (e.g., 3 mins, 52 secs.).

The user might also choose to have included in the multimedia document 120 some of the audio information for a frame 132, which is displayed as text. For example, the user may choose to have a portion of the transcript of a multimedia segment (i.e., a transcript of a news program segment) displayed next to the multimedia frame 132. As another example, the user might opt to include in the printed document a text description or summary of the content of each frame 132, such as a brief summary of a particular television segment or program. The user can use the print driver dialog interface 122 to identify techniques to be used for converting the audio information to text information (i.e., techniques for generating a text transcript for the audio information), the format and styles for printing the audio transcript (which may be the same as for printing text information), formats and styles for printing summary text about multimedia content, and the like. Additionally, information about retrieving multimedia information and annotating multimedia information is provided in the Video Paper Applications, referenced previously.

Figure 2:
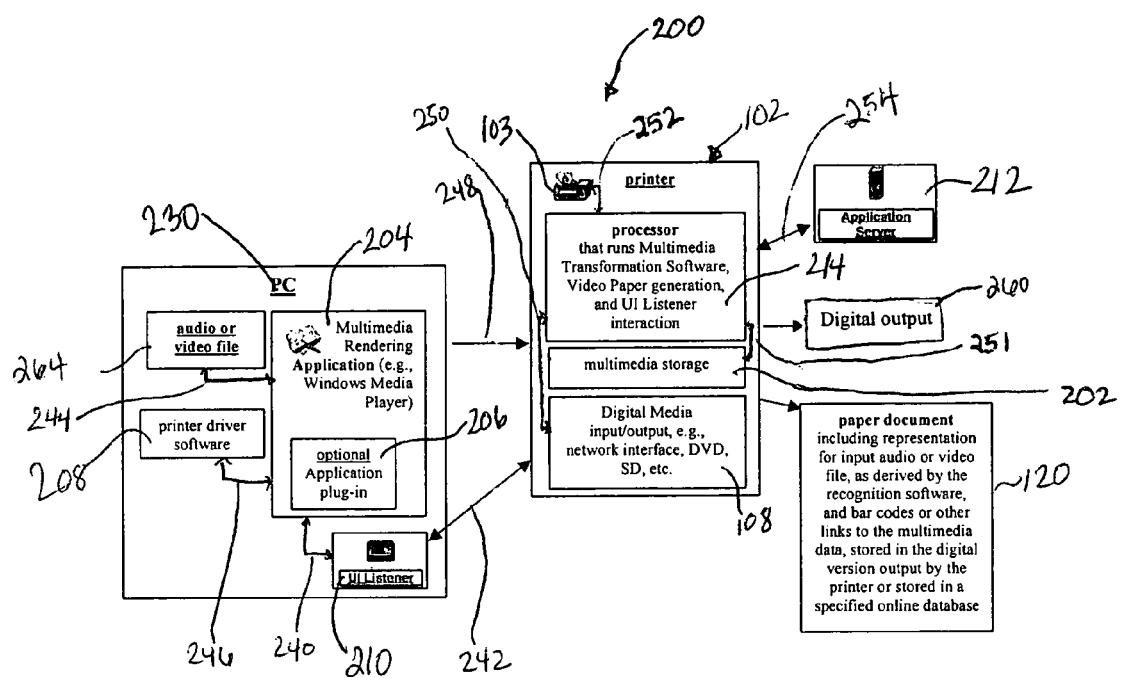
FIG. 2 is a block diagram of an exemplary architecture for one embodiment of the system of FIG. 1.

Referring now to FIG. 2, there is shown the architecture of an embodiment of the present invention. In this embodiment, the system 200 includes a printer 102 that is coupled to a data processing system, which is a PC 230 in the embodiment of FIG. 2, but could also be a portable computer, a workstation, a computer terminal, a network computer, a mainframe, a kiosk, a standard remote control, a PDA, a game controller, a communication device such as a cell phone, or any other data system. The printer 102 can also optionally be coupled to an application server 212 in a network environment.

In the example of FIG. 2, the printer 102 comprises the following components: a conventional printer 103, a processor 214, a multimedia storage 202, and the digital media input/output 108. The conventional printer 103 includes the standard printing capabilities that a conventional printer generally has, as discussed previously.

The processor 214 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Main memory (not shown) may store instructions and/or data that may be executed by processor 214, including the software and other components of system 200. The instructions and/or data may comprise code for performing any and/or all of the techniques described herein. Main memory (not shown) may be a dynamic random access memory (DRAM) device, a static random access memory (SRAM) device, or some other memory device known in the art.

As described previously, the printer 102 accesses or receives multimedia information, such as an audio or video file, from some source. In one embodiment, the multimedia file is stored on a data processing system, such as PC 230, which is coupled to the printer 102 by signal line 248. In the embodiment of FIG. 2, the multimedia file can be stored in the multimedia file storage 264 on PC 230. The multimedia file may also be accessible from some remote source (not shown). As another example, the multimedia file might be stored on the printer 102, itself, in the printer multimedia storage 202, and the file is accessed from this storage 202.

A user can view multimedia content on a display device (not shown) to select particular content for printing with printer 102, as described above. The display device (not shown) can include a cathode ray tube (CRT), a flat-panel device such as a liquid crystal display (LCD), a projection device, and the like. In other embodiments, the printer 102 includes an LCD display panel or other type of display panel, and the user can display multimedia content on the printer, itself.

In the FIG. 2 embodiment, the user views a multimedia file using a multimedia rendering application (MRA) 204 on PC 230 that allows the user to play back, store, index, edit, or manipulate multimedia information. Examples of MRAs 204 include proprietary or customized multimedia players (e.g., RealPlayer™ provided by RealNetworks, Microsoft Windows Media Player provided by Microsoft Corporation, QuickTime™ Player provided by Apple Corporation, Shockwave multimedia player, and others), video players, televisions, PDAs, or the like. In the embodiment of FIG. 2, MRA 204 is coupled to multimedia file storage 264 by bus 244. Stored multimedia content can be accessed by MRA 204 and transferred to MRA 204 to be viewed by the user. More information about multimedia visualization is provided in the following U.S. Patent Applications, each of which is hereby incorporated by reference in its entirety: U.S. patent application Ser. No. 10/081,129, to Graham, entitled "Multimedia Visualization and Integration Environment," filed on Feb. 21, 2001; U.S. patent application Ser. No. 10/701,966, to Graham, entitled "Multimedia Visualization and Integration Environment," filed on Nov. 4, 2003; U.S. patent application Ser. No. 10/465,027, to Graham, et. al., entitled "Interface For Printing Multimedia Information," filed on Jun. 18, 2003; U.S. Patent Application entitled "Techniques For Displaying Information Stored In Multiple Multimedia Documents," to Graham, et. al., filed on Jun. 18, 2003; U.S. patent application Ser. No. 10/174,522, to Graham, entitled "Television-Based Visualization and Navigation Interface, filed on Jun. 17, 2002; and U.S. Patent Application, to Graham, entitled "Multimedia Visualization and Integration Environment," filed Mar. 3, 2004.

In the embodiment of FIG. 2, the system 200 also includes an output device driver module or a printer driver software module 208, which can be located on PC 230 or another location. The printer driver software module 208 is configured at installation time to perform certain functions. The printer driver software 208 adds a "print" function to an existing MRA 204, such as Windows Media Player. An optional application plug-in 206 may be required for adding the "print" function. As an alternative, a user can install a separate MRA 204 designed for this purpose. When the printer 102 is invoked (i.e., the user selections a print button on a MRA 204), the printer driver software module 208 receives a print request from the MRA 204, along with multimedia data and other relevant information through signal line 246. The printer driver software module 208 transfers multimedia data to the printer 102 through bus 248 and instructs the printer to apply specified transformation routines (e.g., face recognition). The printer driver software module 208 can additionally prompt the user as necessary to confirm results and layout decisions that the user has made.

When printer 102 receives a print request, the request and the associated multimedia data are transferred to processor 214. The processor 214 interprets the input and activates the appropriate module. The processor 214 is coupled to and controls the multimedia transformation software module (MTS) (not shown) for transforming multimedia content. If the processor 214 has received a print request, the processor 214 may then activate the MTS (not shown) depending on whether or not the user has requested transformation of the multimedia data. The transformations to the multimedia content can be applied on the printer 102, on a PC 230 (i.e., by software installed with the print driver 208), or at some other location. The MTS (not shown) applies specified transformation functions to a given audio or video file. The MTS (not shown) generates the appropriate document-based representation and interacts with the user through the print driver dialog interface to modify the parameters of the transformation and to preview the results. The results and parameters of the multimedia transformation are represented in the Document Format Specification (DFS) that was described previously.

As described above, printer 102 can include multimedia storage 202, for storing multimedia data, such as video or audio files. The processor 214 is coupled to multimedia storage 202 and can transfer multimedia data, through bus 251, to the multimedia storage 202. This data can be stored while a print job is progressing. Storage 202 may include a number of memory types including a main random access memory (RAM) for storage of instructions and data during program execution and a read only memory (ROM) in which fixed instructions are stored. Storage 202 may also include persistent (non-volatile) storage for program and data files, such as a hard disk drive, a floppy disk drive, a CD-ROM device, a DVD-ROM device, a DVD-RAM device, a DVD-RW device, or other like storage device known in the art. One or more of the drives or devices may be located at remote locations on other connected computers.

The processor 214 also controls a digital media input/output 108. the processor 214 transfers information to and receives information from digital media input/output 108, through bus 250. Multimedia documents created can be converted into some type of digital format, as described previously. The digital media writing hardware can include, for example, a network interface card, a digital video disc (DVD) writer, a secure digital (SD) writer, a compact disc (CD) writer, and the like. The digital output 260 documents can be stored on digital media, including a CD, a DVD, flash media, and the like. Thus, the user can create a digital output 260 version of input audio or video file, and this can be viewed on a specified target device, such as a PC, a cell phone, or a PDA.

The processor 214 also manages generation of a multimedia document 120, such as a video or audio paper document. Multimedia information can also be displayed in a paper document or multimedia document 120, as shown in FIG. 2. The processor 214 communicates with and sends print job information to a conventional printer 103, through bus 252, and the conventional printer 103 generates a paper output. The multimedia document 120 generated includes a paper representation of input audio or video file information, as derived by recognition software. The FIG. 2 embodiment of the multimedia document 120 can also include user-selectable identifiers, such as barcodes, and other links to multimedia data stored by the printer 102 or stored in a specified online database.

The processor 214 also controls external communication hardware, such as through a network interface. The processor 214 can transmit information to and receive information from an application server 212 through bus 254. The printer 102 can also communicate with and obtain information from an application server 212 (e.g., "Web services" or "grid computing" systems).

In one embodiment, the system 200 includes a communication monitoring module or a user interface listener module 210 (UI Listener). In the embodiment of FIG. 2, the UI Listener 210 is located on the PC 230, but the UI Listener can be alternatively located on the printer 102, on an application server 212, or at some other remote location. The UI Listener 210 is coupled to and communicates with MRA 204, and can send and receive data over bus 240. Specifically, the UI Listener 210 receives print requests from the user to the MRA and sends requests to the user from remote components (e.g., the printer 102, an application server 212, etc.). The UI Listener 210 is also coupled to and communicates with printer 102, and can send and receive data over bus 242. Specifically, the UI Listener 210, sends print requests to the printer and receives requests from the printer 102 for further information from the user. Additionally, UI Listener 210 can be coupled to and communicate with an application server 212 over a network, and can send and receive data over network connection (not shown). The UI Listener 210 receives information from application server 212, such as requests for information from the user, and the UI Listener 210 can return a response. The UI Listener 210 and its functionality is discussed in more detail below.

Figure 3:
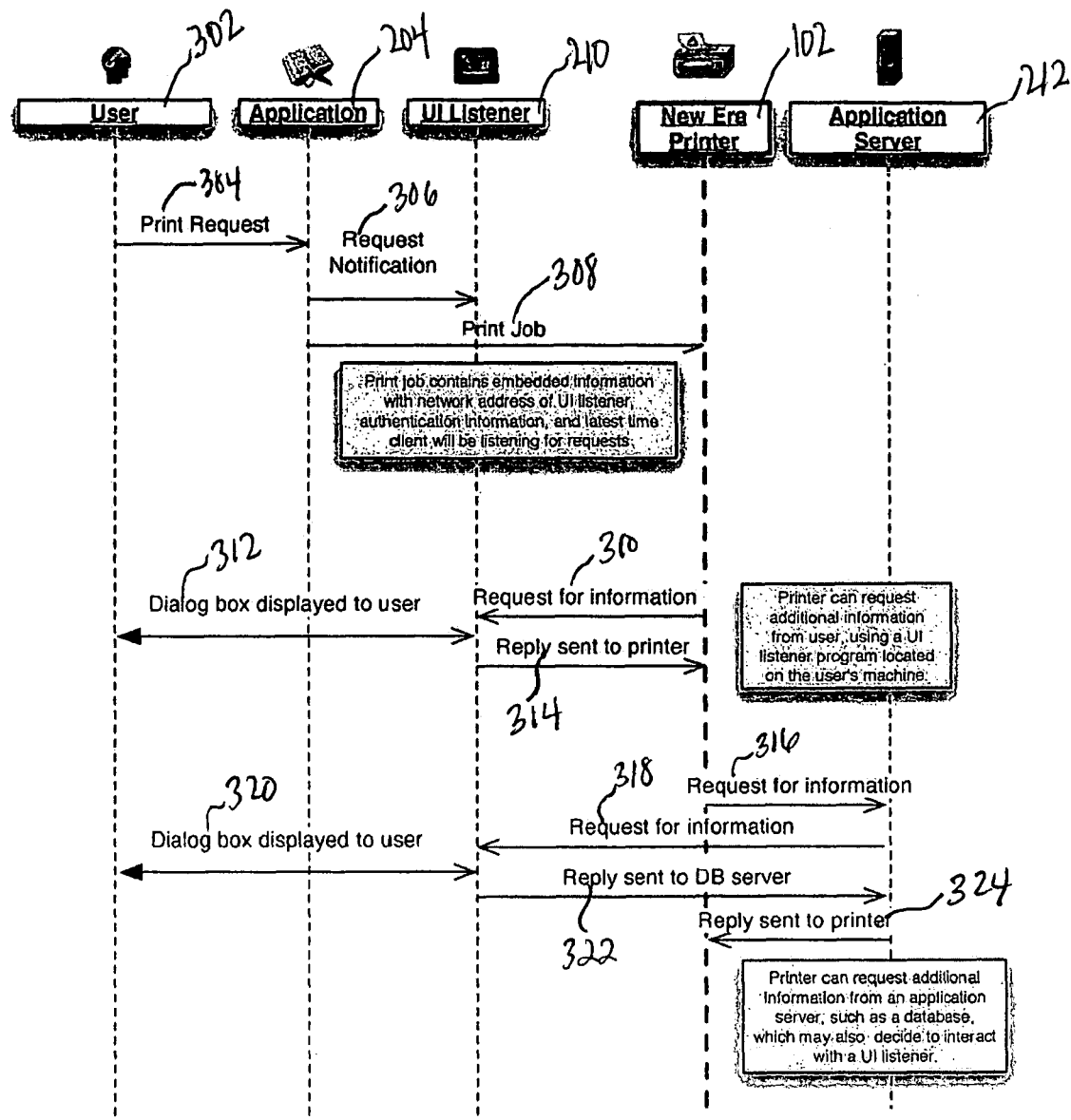
FIG. 3 is an exemplary representation of interactive communication with the printer.

Referring now to FIG. 3, there is shown a graphical representation of interactive communication with the printer 102, within the system 200. Printer drivers typically do not facilitate interactive information gathering. Once initial printer settings are captured, further interactions with the printer 102 are generally not allowed. One approach to this problem is to embed metadata into the print stream itself. However, the printer 102 could need to ask the user 302 for more information, in response to computations made from the data supplied by the user. In addition, the printer 102 might, itself, delegate some tasks to other application servers 212, which might in turn need more information from the user 302.

In order to allow this interaction without modifying printer driver architecture of the underlying operating system, an extra mechanism, such as the one shown in FIG. 3, can be constructed. One solution is to construct a UI Listener 210, a program, which listens to a network socket, accepts requests for information, interacts with a user 302 to obtain such data, and then sends the data back to the requester. Such a program might have a fixed set of possible interactions, or accept a flexible command syntax, which would allow the requester to display many different requests. An example of such a command syntax would be the standard web browser's ability to display HTML forms. These forms are generated by a remote server and displayed by the browser, which then returns results to the server. In this embodiment, the UI listener 210 is different from a browser, though, in that a user 302 does not generate the initial request to see a form. Instead, the remote machine generates this request. Thus, in this embodiment, the UI listener 302 is a server, not a client.

Because network transactions of this type are prone to many complex error conditions, a system of timeouts allows efficient operation. Each message sent across a network generally either expects a reply or is a one-way message. Messages that expect replies can have a timeout, or a limited period of time during which it is acceptable for the reply to arrive. In this invention, embedded metadata would include metadata about a UI listener 210 that will accept requests for further information. Such metadata consists of at least a network address, port number, and a timeout period. It might also include authentication information, designed to prevent malicious attempts to elicit information from the user 302, since the user 302 cannot tell whether the request is coming from a printer 102, a delegated server 212, or a malicious agent. If the printer 102 or a delegated application server 212 wishes more information, it can use the above noted information to request that the UI Listener 210 ask a user 302 for the needed information. The UI Listener 210 program can be located on a user's 302 interaction device (e.g., a PC, a cell phone, or a PDA), on the printer 102 (i.e., for user interaction on a LCD panel located on the printer), or another remote location.

FIG. 3 shows an example of the interactive communication system described above. In the FIG. 3 example, the user 302 selects a "print" option within system 200, which can be involved by clicking on a print button that was added to an MRA 204 or other methods of selecting a "print" option. By selecting "print," the user 302 sends a print request 304 to the MRA 204 or other application. For example, the user 302 could request to print a video paper representation of user-selected video frames from a news segment on CNN. The MRA 204 sends a request notification 306 message to the UI Listener 210, requesting that the UI Listener 210 notify the printer 102 of the print request 304. The print job 308 information, such as the user-defined layout and formatting preferences for the video paper, is then sent from the MRA 204 to the printer 102. The print job 308 can contain embedded information, such as the network address of the UI Listener 210, authentication information, and information about the latest time the client will be listening for requests.

In the example of FIG. 3, the printer 102 sends a request for information 310 to the UI Listener 210 program located on the user's 302 interaction device. For example, the printer 102 could request further information about a particular layout preference selected by the user for a video paper print job or could newly confrm that a default layout should be used. The UI Listener 210 then delivers this request to the user 302, and a dialog box is displayed 312 to the user 302 allowing the user 302 to respond to the request by selecting information within the dialog box. The user's 302 reply 314 is sent to the printer 102, in answer to the printer's 102 request for information 310.

Additionally, in the example of FIG. 3, the printer 102 sends a request for information 316 to the application server 212. For example, the printer 102 could request specific data necessary to the print operation from a database, and the database may need to gather more information from the user. In the FIG. 3 example, the application server 212 sends a request for information 318 to the UI Listener 210, which then forwards the request 318 to the user 302. A dialog box is displayed 320 to the user 302, allowing the user 302 to respond to the request 318. The UI Listener 210 then forwards the user's 302 reply 322 to the application server 212, and the application server 212 can then send a reply 324 to the printer 102, regarding the printer's 102 request 316 for information.

Figure 4:
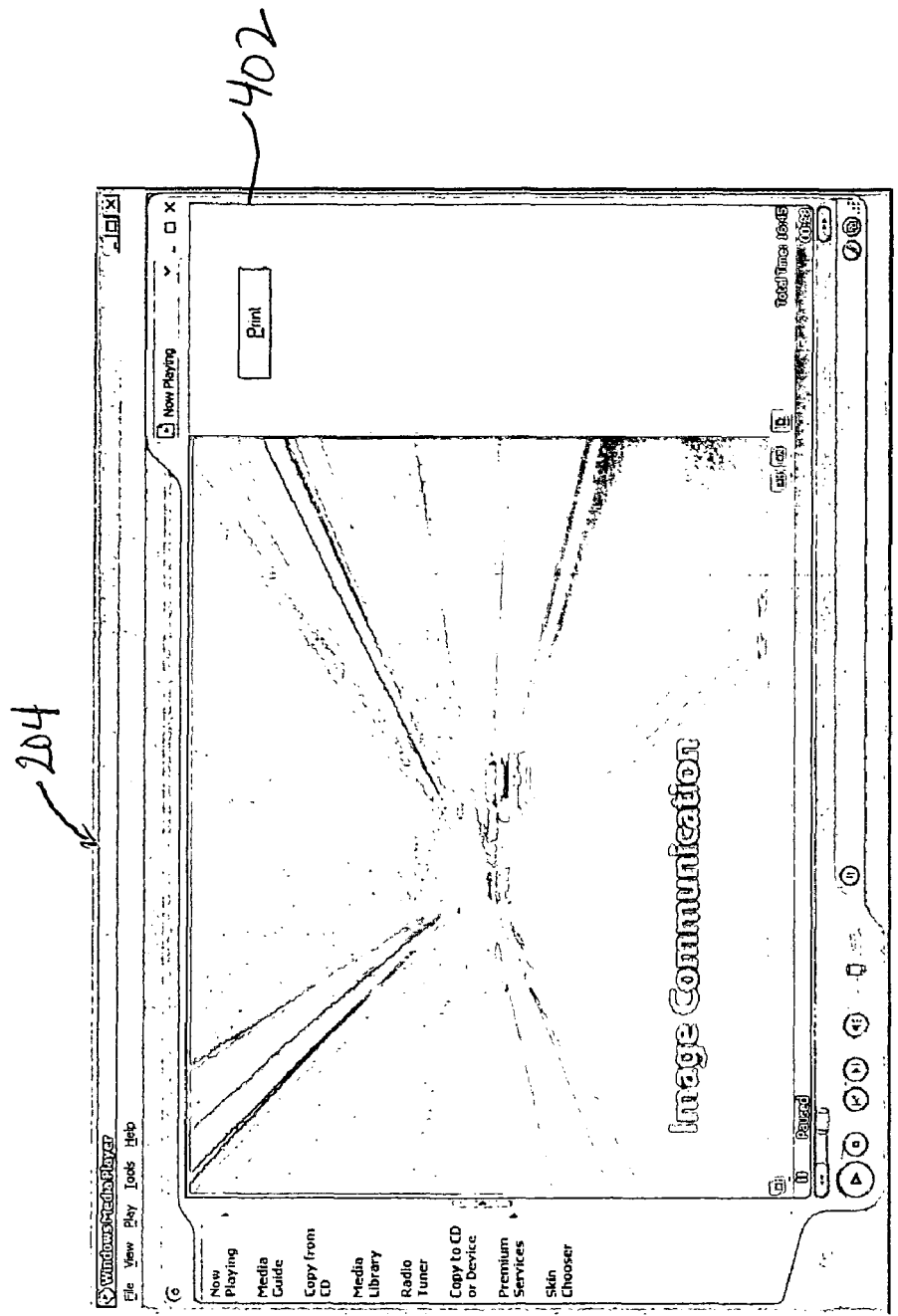
FIG. 4 is a graphical representation of an exemplary multimedia rendering application with a print selection button inserted into the application.

Referring now to FIG. 4, there is shown a graphical representation of an MRA 204 with a "Print" button 402 added into the MRA 204. In this example, the MRA 204 box is a Windows Media Player (WMP) application, but it is possible to use other types of MRAs 204, as discussed previously. A user can select a print option by clicking on the Print button 402, causing the printer to generate a multimedia document. A print option can be added to the WMP, version 9 by utilizing the plug-in feature provided by Microsoft. The plug-in feature allows developers to create an application that supplements the WMP in some way. Several types of plug-ins can be created: "display," "settings," "metadata," "window and background," and the like. Microsoft provides an explanation of what a plug-in is and how to build a plug-in. Using one of the user interface plug-in styles, it is possible to add a button or panel to the WMP screen. More information about adding a print option to an application is provided in the U.S. Patent Application entitled "Printing System with Embedded Audio/Video Content Recognition and Processing," to Hull et. al., filed on Mar. 30, 2004, which is incorporated herein by reference in its entirety.

Figure 5:
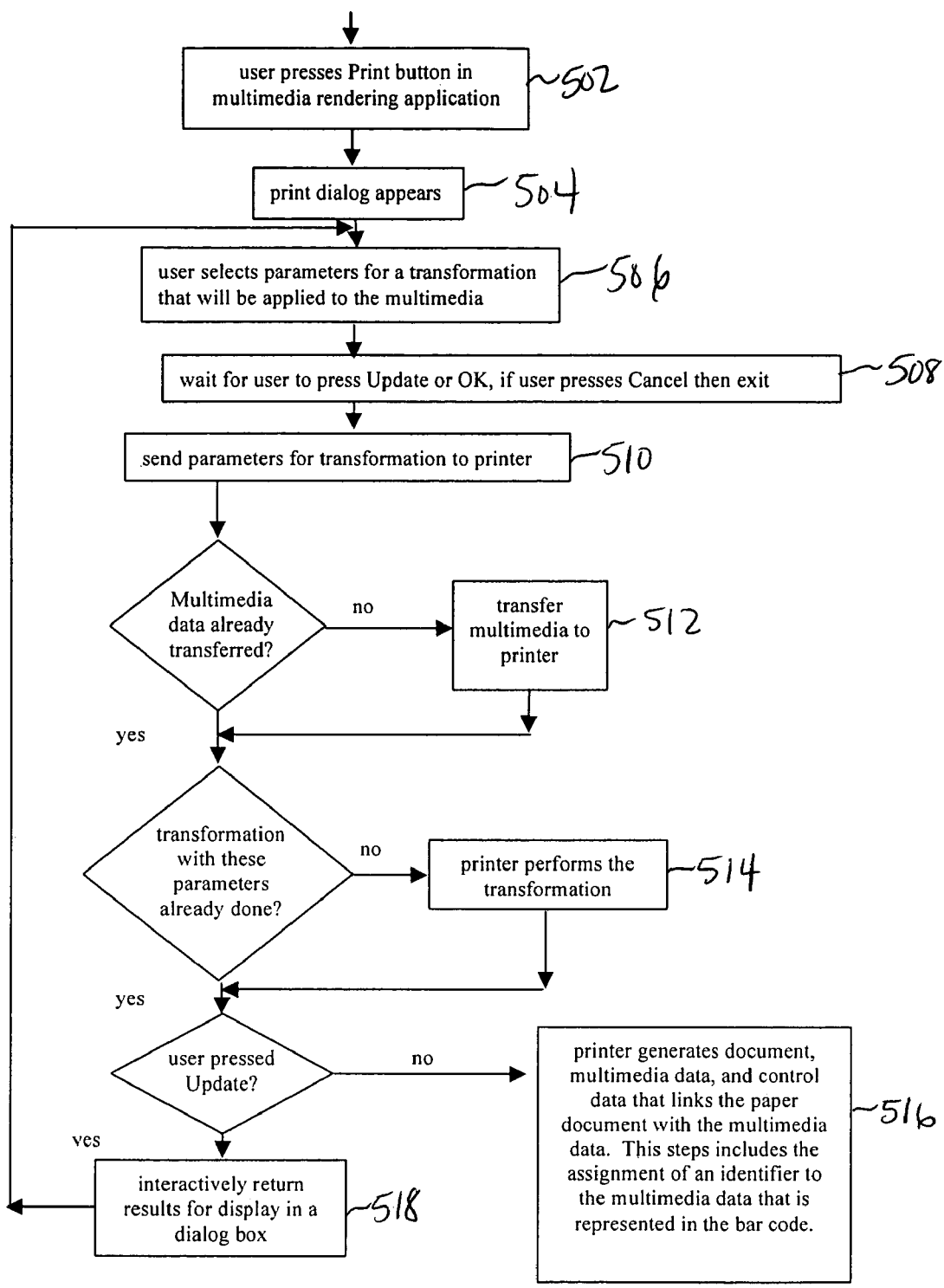
FIG. 5 is a flowchart of a method for system control by the user before any multimedia transformation was performed.
Figure 6:
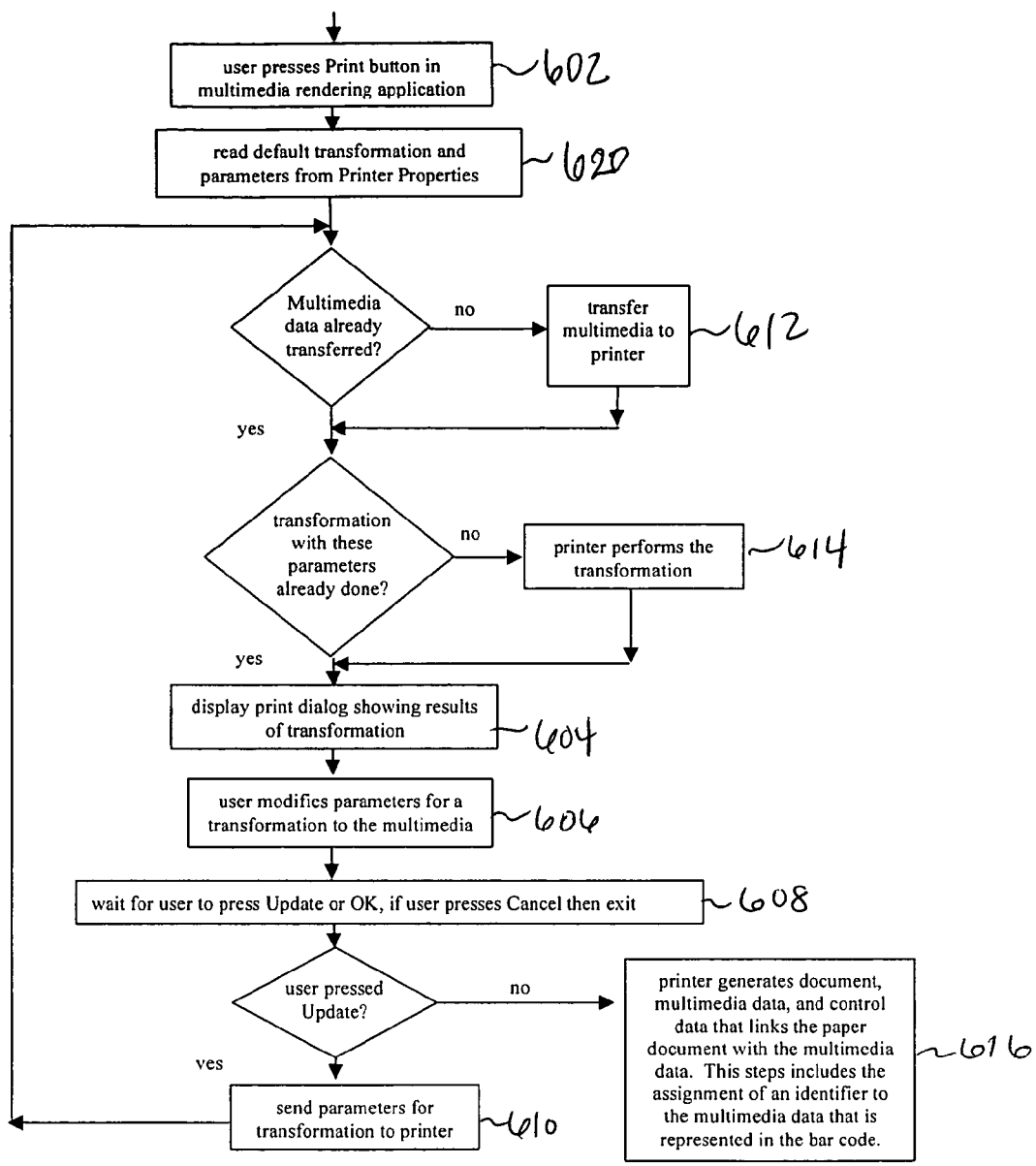
FIG. 6 is a flowchart of a method for system control when the system is configured to transfer the multimedia data, perform the default transformation, and display the results in a graphical user interface.

In operation, the system 200 provides methods for printing multimedia content. The user selects a print option in an MRA, and an initial print driver dialog interface (PDDI) 122 appears to the user. The initial PDDI 122 is populated with information about the abilities of the printer 102 to transform multimedia data. The initial PDDI 122 can display options available to the user for transforming the data, or it can show the result of performing a default transformation with a default set of parameters. The user can choose which of these two options the user prefers, and the user's preference can also be set in the printer's 102 properties. The flow of operations for each of these options is depicted in FIGS. 5 and 6, discussed below. More information about different transformations that can be performed and options available to the user for transformation is provided in the U.S. Patent Application entitled "Printer with Embedded Audio/Video Content Recognition and Processing," to Hull et. al., filed on Mar. 30, 2004, which was incorporated by reference previously.

Referring now to FIG. 5, there is shown a flowchart that describes the flow of operations in the system 200 when the PDDI 122 is displayed to the user before any multimedia transformation is performed. In this embodiment, the user enters a "print" command into the system by pressing 502 a print button (e.g., FIG. 4) in an MRA. The user can use an initial PDDI 122 to define preferences with regard to the multimedia document to be generated before any transformation has been conducted. The user selects 506 parameters for a transformation that will be applied to the multimedia content. For example, the user can opt to have the document show a particular number of video frames, displayed in a user-defined arrangement.

The system 200 then waits 508 for the user to press the Update button or the OK button on the PDDI 122. If the user selects the Cancel button, then the system 200 exits and the PDDI 122 disappears from view. Once the user has selected the Update button or the OK button, the system 200 sends 510 parameters and other user-selection information to the printer 102. The system 200 determines if the multimedia data has already been transferred to the printer 102. As described previously, this multimedia data may be located on a PC, a cell phone, a PDA, or other device that can contain multimedia content. If the multimedia data has not yet been transferred to the printer 102, then the system 200 transfers 512 multimedia data to the printer 102, and then continues with the operation flow. If the multimedia data has already been transferred to the printer 102, then the system 200 determines whether or not the multimedia transformation with the user-defined parameters has already been performed. If not, the printer performs 514 the transformation on the multimedia data. If so, the system 200 then determines whether or not the user pressed the Update button after entering in the parameters, or if the user alternatively pressed the OK button. If the user did not press the Update button, and instead pressed the OK button, the printer 102 generates 516 a document, multimedia data, and control data that links the paper document with the multimedia data. Additionally, the system 200 assigns identifiers (e.g., a barcode) to the multimedia data, providing the user with an interface by which to access the multimedia content. If necessary, before generating the document, the printer 102 may first prompt the user for further information regarding the print job. Metadata about the multimedia data and the commands entered into the PDDI 122 are represented in the DFS 112.

If the user pressed the Update button, rather than the OK button, the user is not yet requesting that the printer 102 create a multimedia document. Instead, the user presses the Update button when the user has modified the user selection parameters in the PDDI 122, and the user wants the preview field of the PDDI 122 to be updated. If the user pressed the Update button, the system 200 will interactively return 518 results for display in an interactive PDDI 122. This allows the user to preview how the multimedia document will appear with the newly added parameter modifications. The flow of operation then returns to the point at which the user has the opportunity to select 506 parameters, and the system 200 can cycle through the flow again, continuing to modify parameters in the interactive PDDI 122 until a final document is generated.

Referring now to FIG. 6, there is shown a flowchart that describes the flow of operations in the system 200 when the system 200 is configured to transfer the multimedia data, perform the default transformation, and display its results in a PDDI 122. In this embodiment, the user presses 602 a print button in a multimedia rendering application. The system 200 reads 620 the default transformation and parameters from the printer properties information stored on the printer 102, on a PC, or other location. The system 200 then determines if the multimedia data has already been transferred to the printer 102. If the multimedia data has not yet been transferred to the printer 102, then the system 200 transfers 612 multimedia data to the printer 102, and then continues with the operation flow. If the multimedia data has already been transferred to the printer 102, then the system 200 determines whether or not the transformation with the defined parameters has already been performed. If not, the printer performs 614 the transformation on the multimedia data. If so, the system 200 then displays 604 a PDDI 122 to the user, showing the results of the transformation. The user modifies 606 parameters for transformation that was applied to the multimedia content. The system 200 then waits 608 for the user to press the Update button or the OK button on the PDDI 122. If the user selects the Cancel button, then the system 200 exits and the PDDI 122 disappears from view. If the user pressed the OK button, the printer 102 generates 616 a document, multimedia data, and control data that links the paper document with the multimedia data, and the system 200 assigns an identifier to the multimedia data. If the user pressed the Update button, the system 200 will send 610 the parameters for transformation to the printer 120, and the flow of operation then cycles again.

FIGS. 7-19, which are discussed below, show examples of a PDDI 122 that would be displayed to a user in the method of FIG. 6 where the default transformation is first applied to the multimedia data before the user sees the PDDI 122. Additionally, the examples of FIGS. 7-19 could also be the interactive PDDI 122 described in the method of FIG. 5, which allows the user to modify the results of a transformation. For examples of an initial PDDI 122 that is initially displayed to the user in the method of FIG. 5, see the U.S. Patent Application entitled "Printer with Embedded Audio/Video Content Recognition and Processing," to Hull et. al., filed on Mar. 30, 2004, which was incorporated by reference previously.

AUDIO

Figure 7:
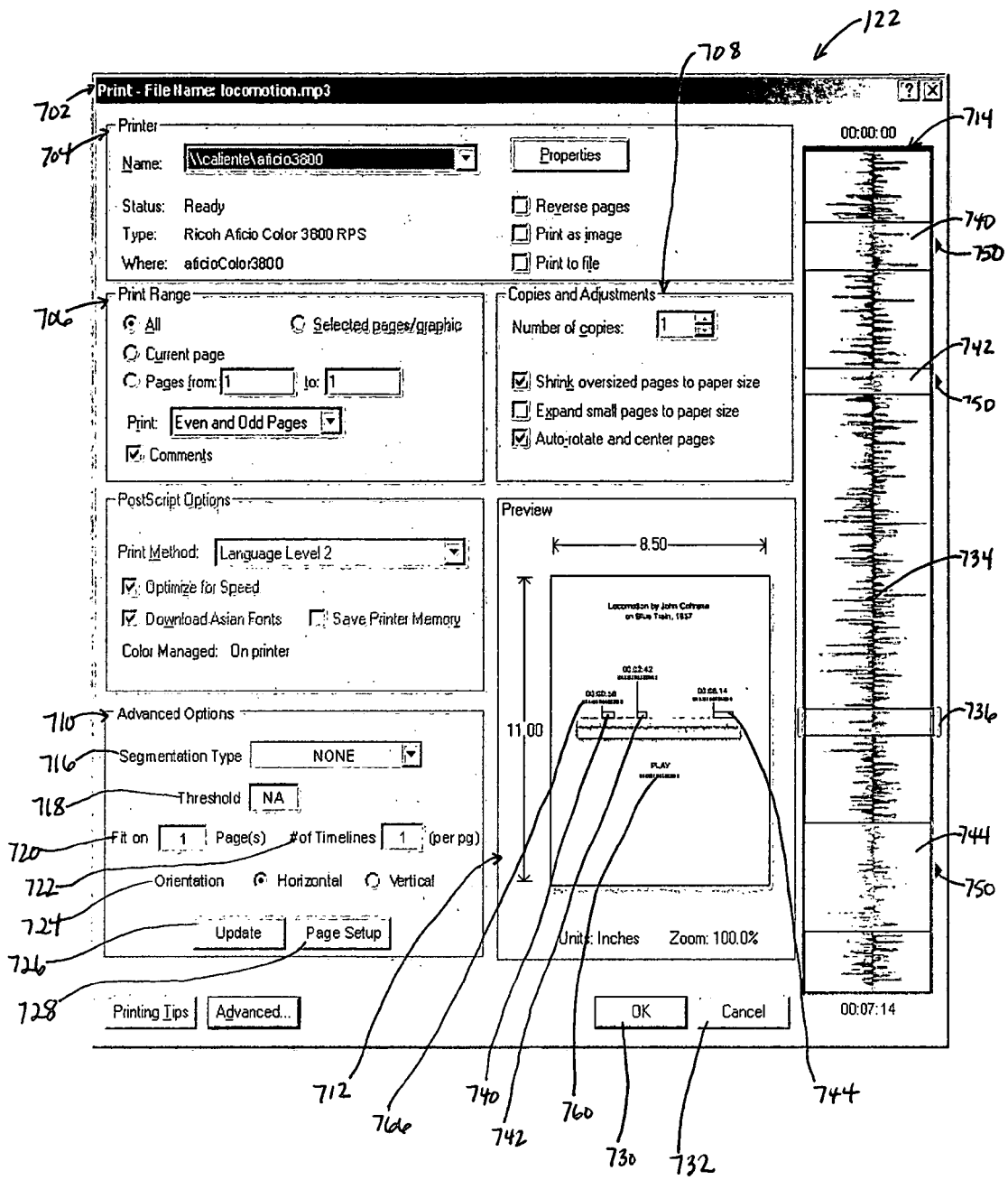
FIG. 7 is a graphical representation of an exemplary graphical user interface showing generation of a representation including user-selected ranges of an audio file.

FIG. 7 shows a graphical representation of a PDDI 122 for printing user-selected ranges in an audio file. The user can input information into the fields in the PDDI 122 to designate the user's preferences regarding layout, segmentation, etc. The PDDI 122 shown in the embodiment of FIG. 7 includes some fields that are found in a standard printer dialog box, such as the Printer field 704, the Print Range field 706, and the Copies and Adjustments field 708. However, the PDDI 122 also displays fields that are not found within standard printer dialog boxes, such as the Advanced Options field 710, the Preview field 712, and the Content Selection field 714.

As is found in standard print dialog boxes, the top of the PDDI 122 includes a file name field 702 that displays the name (e.g., "locomotion.mp3") of the multimedia file being printed. In the Printer field 704, the user can select which printer will carry out the print job, and other options with regard to properties of the print job, printing as a image or file, printing order, and the like. Additionally, the Printer field 704 displays the status of the selected printer, the type of printer, where the printer is located, and the like. The Print Range field 706 allows the user to make selections about what portions of a document will be printed and the like. The Copies and Adjustments field 708 permits a user to designate the number of copies to be generated in a print job, the size of the print job pages relative to the paper, the positioning of the print job pages on the paper, and the like. Although not shown, this dialog box could also include any of the various combinations of other conventional print parameters associated with outputting representations of video, audio, or text documents.

In the embodiment of FIG. 7, the Advanced Options field 710 provides the user with options that are specific to the formatting and layout of multimedia content. In this embodiment, the user selects the segmentation type that the user would like to have applied to the multimedia content. In this embodiment of the invention, the user can click on the arrow in the segmentation type field 716, and a drop-down menu will appear displaying a list of segmentation types from which the user can choose. Examples of segmentation types include, but are not limited to, audio event detection, speaker segmentation, speaker recognition, sound source localization, speech recognition, profile analysis, video event detection, color histogram analysis, face detection, clustering, face recognition, optical character recognition (OCR), motion analysis, distance estimation, foreground/background segmentation, scene segmentation, automobile recognition, and license plate recognition. In the example, the user has not selected any segmentation type in the segmentation type field 716, so the segmentation type is shown as "NONE." Thus, in this example, the user manually selects an audio range within the audio waveform timeline 734 by moving a selector 736 around within the Content Selection field 714.

Each segmentation type can have a confidence level associated with each of the events detected in that segmentation. For example, if the user has applied audio event detection that segments the audio data according to applause events that occur within the audio data, each applause event will have an associated confidence level defining the confidence that an applause event was correctly detected. Within the Advanced Options field 710, the user can define or adjust a threshold on the confidence values associated with a particular segmentation. The user sets the threshold by typing the threshold value into the threshold field 718. For example, the user can set a threshold of 75%, and only events that are above this threshold (i.e., more than 75% chance that the event was correctly detected to be an applause event) will be displayed. In other embodiments, a threshold slider (not shown) is included in the PDDI 122, and the user can move the slider along a threshold bar that runs from 0% to 100% to select a specific threshold within that range.

In one embodiment, the user can also make layout selections with regard to the multimedia representation generated. The user sets, within the "Fit on" field 720, the number of pages on which the audio waveform timeline 734 will be displayed. The user also selects, within the timeline number selection field 722, the number of timelines to be displayed on each page. Additionally, the user selects, within the orientation field 724, the orientation (e.g., vertical or horizontal) of display of the timelines on the multimedia representation. For example, as shown in FIG. 7, the user can choose to have one timeline displayed on one page, horizontally, and this will display the entire audio waveform timeline 734 horizontally on a page. As another example, the user can choose to have the audio waveform timeline 734 broken up into four portions that are displayed vertically over two pages (i.e., two timelines per page).

In the embodiment of FIG. 7, there are also shown various buttons, including an Update button 726, a Page Setup button 728, an OK button 730, and a Cancel button 732. As described regarding FIGS. 5 and 6, the user can select the Update button 726 when the user has modified the print job parameters within the PDDI 122, and the user would like to see an updated image of how the multimedia representation will appear. The image of the multimedia document shown in the Preview field 712 will be updated to display any new changes the user has made within the PDDI 122. Alternatively, the system can be designed to automatically update the Preview field 712 any time changes are made in the PDDI 122. In one embodiment, when the user selects the Page Setup button 728, a different dialog interface box is displayed to the user, giving the user various print formatting options. This is discussed in more detail below. The embodiment of FIG. 7 also includes an OK button 730, and when the user selects this button, the printer then prepares to generate a multimedia document under the current user-defined preferences set in the PDDI 122. If the user selects the Cancel button 732 at any point in the process, the creation of the print job ends and the PDDI 122 disappears.

In the embodiment of FIG. 7, the Content Selection field 714 shows an audio information waveform on a timeline displaying the audio data selected by the user for transformation and printing. In this example, the top of the audio waveform timeline 734 shows the time "00:00:00," or the start time of this audio content. The bottom of the audio waveform timeline 734 shows the time "00:07:14," or the end time of the audio content. Thus, the audio information in this example is seven minutes and fourteen seconds long. The user can slide the selector 736 along the audio waveform timeline 734 to select certain segments of the audio content for which corresponding markers or identifiers will be displayed on the multimedia document generated. For example, the user can use a mouse or other selection device to click on and slide the selector 736 to the segment 740, which is shown as a selected segment in FIG. 7. In one embodiment, once the selector 736 is located at the segment of audio content that the user would like to select, the user can click or double-click on the selector 736 to select segment 740. In this embodiment, the user can select a longer segment of audio content by clicking on and dragging the selector 736 across the distance of the audio segment that the user would like to select. The audio waveform timeline 734 could also be displayed in a number of alternative manners, such as showing a horizontal timeline, showing more than one timeline side-by-side, showing a different waveform appearance, showing a waveform that is colored according to a particular schematic, and the like.

In the embodiment shown in FIG. 7, the user selected three regions of the audio waveform timeline 734 to be marked on the multimedia document. The user selected segment 740, segment 742, and segment 744. Each of these selected segments has a separate corresponding marker or identifier 166 (e.g., a barcode) displayed on the print preview of the multimedia document. For example, in the Preview field 712 of FIG. 7 there is shown an image of a multimedia document. The document shows one page including one horizontal timeline displayed with the beginning of the audio timeline to the left and the end to the right. In this example, the full audio waveform timeline 736 is displayed on the multimedia document page. Additionally, the timeline displayed in the Preview field 712 includes three markers or identifiers 166, one for segment 740, one for segment 742, and one for segment 744. Each marker 166 includes a barcode and a time stamp giving the location of the segment within the audio content. In addition, the FIG. 7 example shown in the Preview field 712 includes a header, which can include information about the audio content (e.g., the title of the audio content, the musician who created the audio content, and the date of the audio content. The multimedia document further includes a play marker 760 or play identifier, which can be located anywhere in the document (i.e., bottom, center).

The user can play the audio content in a number of ways. For example, the user can click on the play selectors or play arrows 750 on the audio waveform timeline 750 to cause the segment to begin to play. Additionally, the system can be configured so that selecting a play arrow 750 will cause the full audio content on the audio waveform timeline 734 to begin to play. The user can also right click on any one of the selected segments to delete the corresponding marker on the multimedia document. A paper multimedia representation also can provide an interface for playing the audio content. A user can select any of the markers (i.e., scan the barcodes) for any of the selected segments on the paper documents, and this will cause the selected audio segment to play. For example, the user can scan a barcode with a cell phone or PDA device with a barcode scanner. The user can listen to the selected clips on the cell phone or PDA, or the user can hear the content via the sound card on his/her PC. Additionally, the user can select the play marker 760 that acts as a pause button, so that if the user has selected any of the markers on the page and the corresponding audio content is playing, the user can pause this by selecting the play marker 760. The user can resume the playing of the audio content by selecting the play marker 760 again, or the user can select another marker on the page to play the corresponding audio content.

Figure 8:
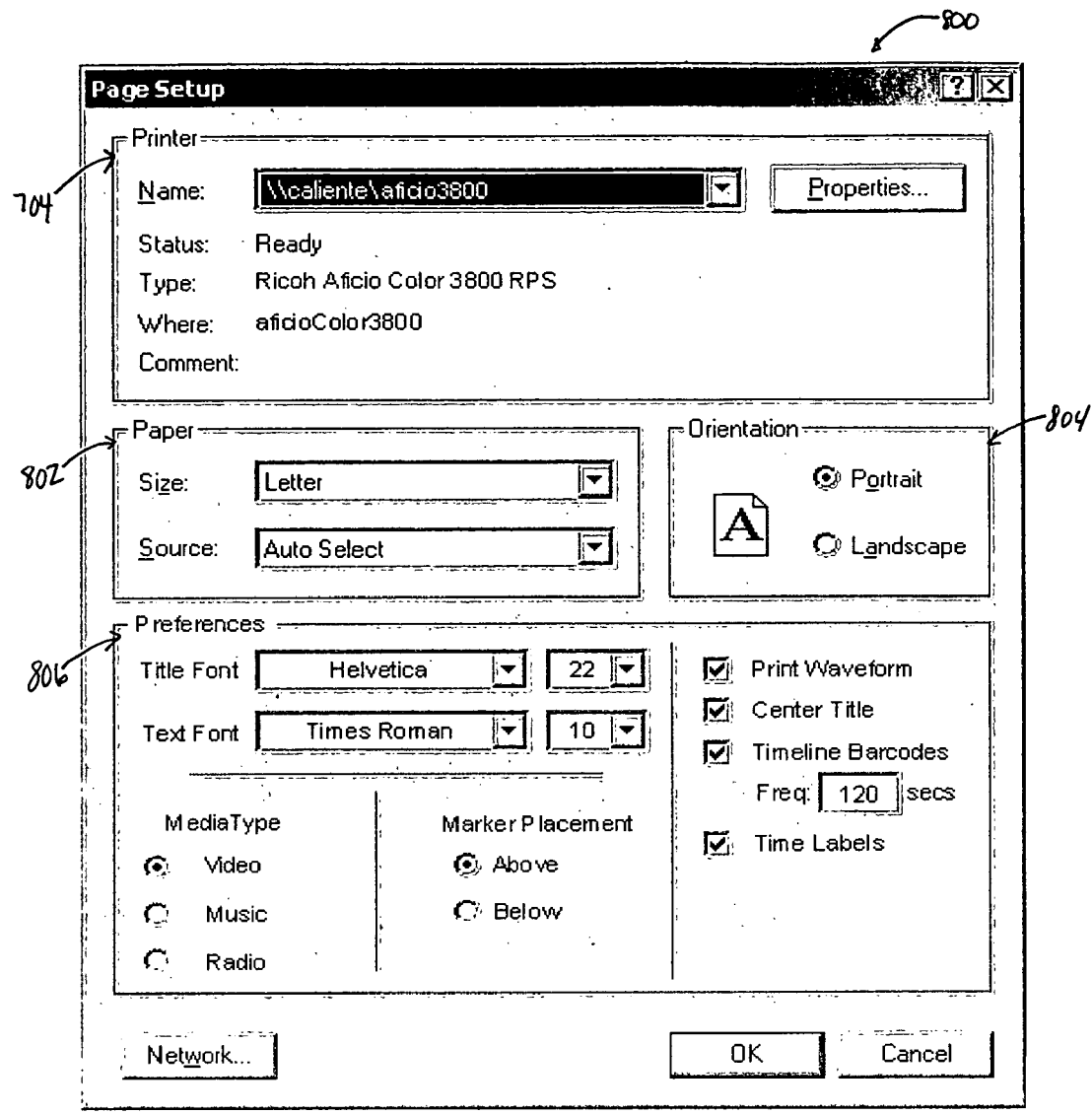
FIG. 8 is a graphical representation of an exemplary graphical user interface providing options for formatting a multimedia representation.

Referring now to FIG. 8, there is shown of a graphical representation of a PDDI 122 for multimedia document page setup, or a page setup dialog interface 800. When a user selects the Page Setup button 728, discussed previously, the page setup dialog interface 800 appears and the user can select formatting options. In the Paper field 802, the user can select the paper size (e.g., letter) and paper source (e.g., auto select) for the multimedia print job. In the Orientation field

804, the user can designate whether the document will be oriented in portrait or landscape format. In the Preferences field 806, the user can set the title and text font types and sizes (e.g., Helvetica, size 22 inches), the media type (e.g., video), the location of markers on the page (e.g., above waveform), and the user can decide whether or not to print a waveform, a center title, timeline barcodes and their frequency, and time labels. Each of the page setup options shown in the page setup dialog interface 800 can alternatively be incorporated into the main PDDI 122, such as the PDDI shown in FIG. 7. The page setup options are not limited to those shown in FIG. 8, and in other embodiments, various different page setup options are provided to the user.

Figure 9:
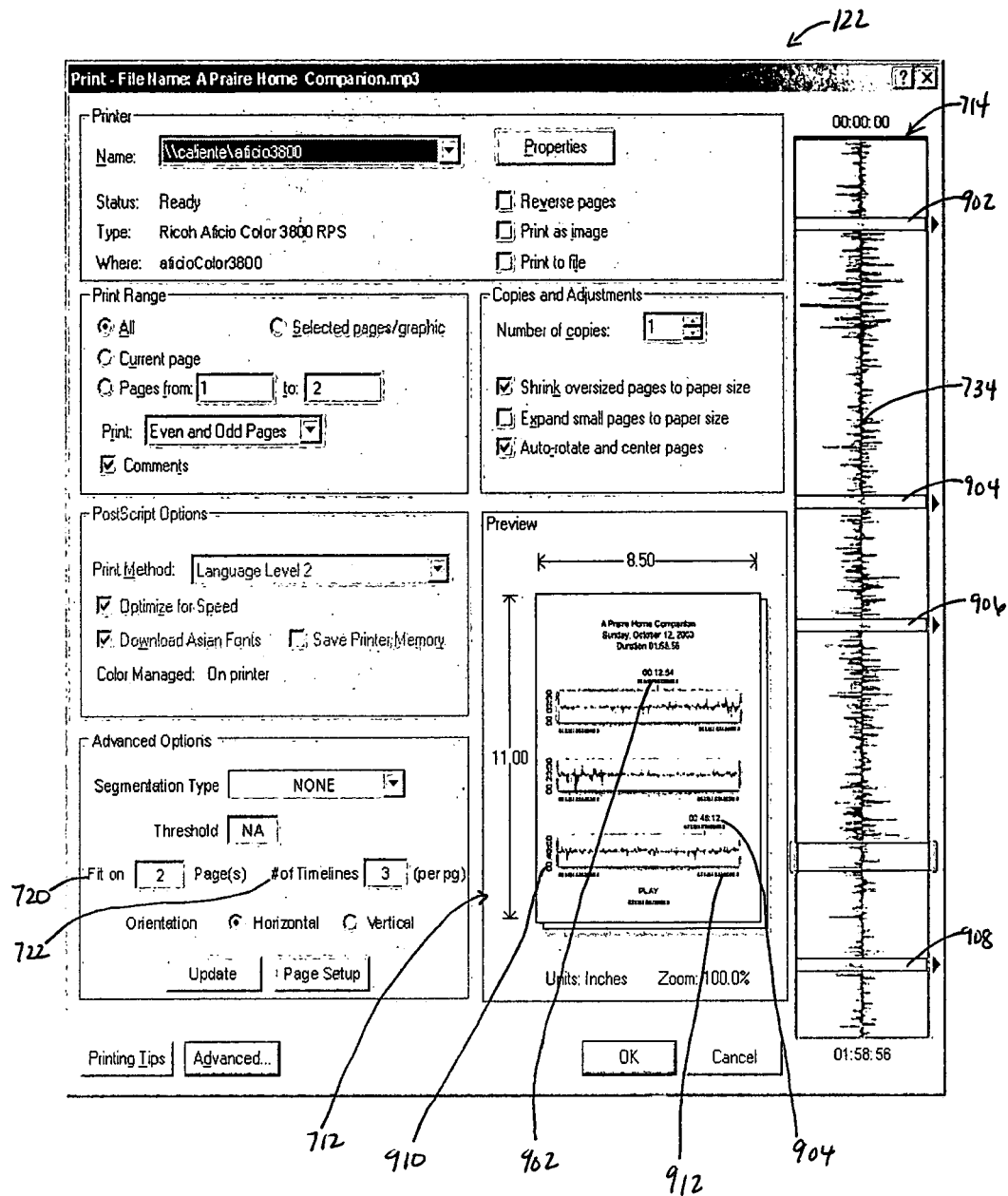
FIG. 9 is a graphical representation of an exemplary graphical user interface showing generation of a two-page summary of an audio file.

Referring now to FIG. 9, there is shown a graphical representation of a PDDI 122 that generates a two-page summary of an audio file. The PDDI 122 is similar to that shown in FIG. 7, however the user has selected, in the timeline number selection field 722, to include three timelines printed per page of the multimedia document. Additionally, the user has selected, in the page fit field 720 to print the multimedia document over two pages. The user has selected, in the Content Selection field 714, four segments of audio content for which markers will be displayed. The selected segments include segment 902, segment 904, segment 906, and segment 908.

The multimedia document shown in the Preview field 712 of FIG. 9 displays three timelines on a page, and shows that two pages have been generated. The time stamps 910 at the beginning of each horizontal timeline display the start time of that timeline. The timelines shown on the top page in the Preview field 712 correspond to half of the audio waveform timeline 734 shown in the Content Selection field 714. More specifically, the multimedia document displays the upper half of the audio waveform timeline 734, split into three separate timelines. The markers corresponding to selected segments 902 and 904 are displayed on the page shown in the Preview field 712. The markers corresponding to selected segments 906 and 908 are displayed on the second page, the content of which is not visible in the Preview field 712.

The document in the Preview field 712 of FIG. 9 additionally includes timeline markers 912 near the beginning and the end of each of the three timelines displayed on the page. These provide the user with additional intermediate interface points in the printed document through which the user can access the multimedia content. The timeline markers 912 denote locations in the audio content that correspond to the beginning or end of each printed timeline, and the user can access these locations by selecting the marker (i.e., scanning the barcode, as discussed previously) to cause the audio content to begin to play at that location in the audio file. The timeline markers 912 in FIG. 9 are displayed below the timelines, but these timeline markers 912 could also be displayed above or near the timelines. These timeline markers 912 will also appear in the printed document, providing another interface by which user can access multimedia content at defined locations.

Figure 10:
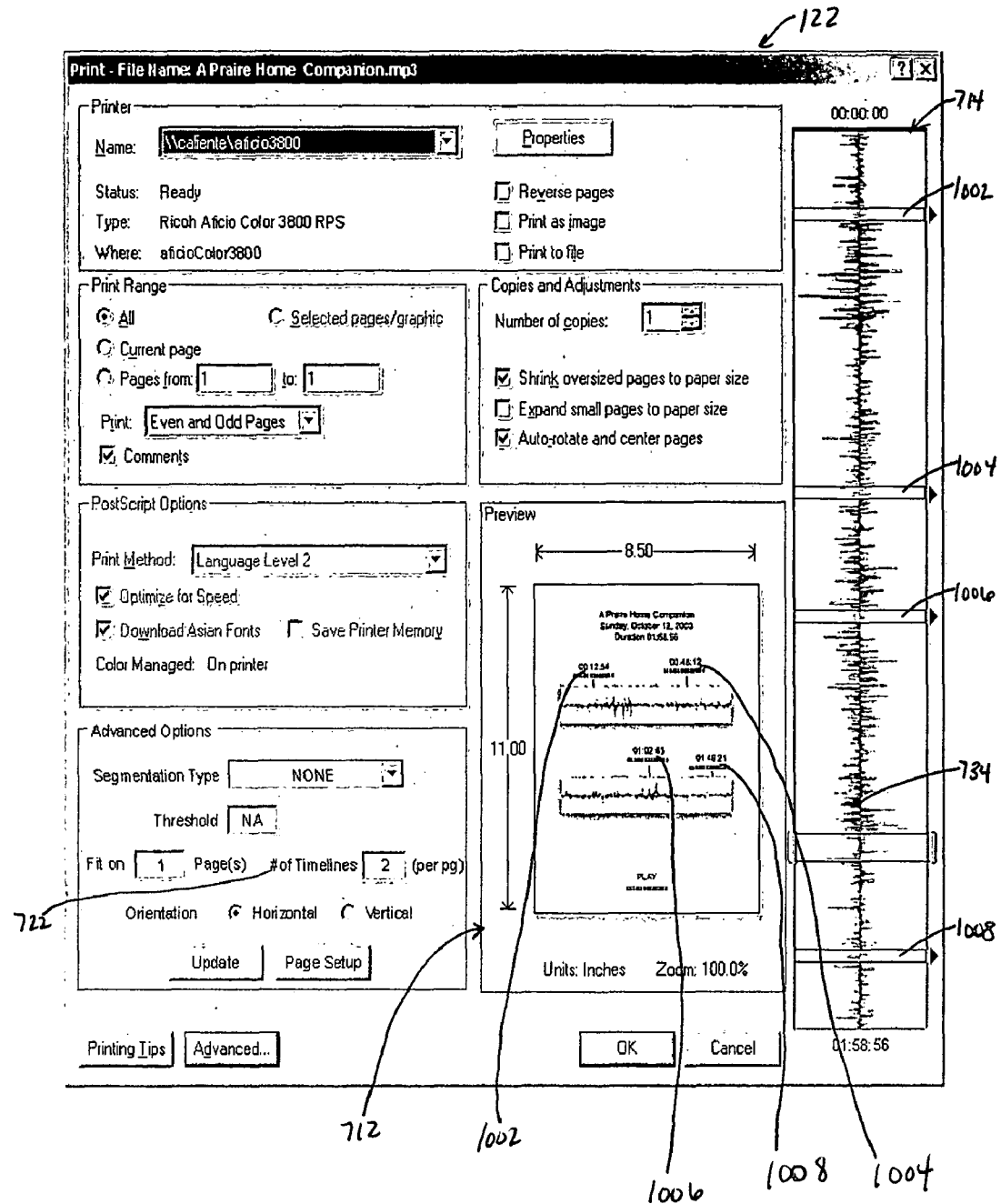
FIG. 10 is a graphical representation of an exemplary graphical user interface showing division of an audio file timeline into two parts.

FIG. 10 shows a graphical representation of a PDDI 122 in which the timeline is divided into two parts. This PDDI 122 is similar to that shown in FIG. 7, but user selected in the "Fit on" field 720 that the output should be constrained to a single page. The timeline number selection field 722 specifies two timelines per page. Thus, the audio waveform timeline 734 shown in the Content Selection field 714 is divided into two and the halves are displayed on the multimedia document as two horizontal timelines. The user has again selected segments within the audio waveform timeline 734, and the markers corresponding to these segments are displayed in the multimedia document. Specifically, the user has selected segments 1002, 1004, 1006, and 1008.

Figure 11:
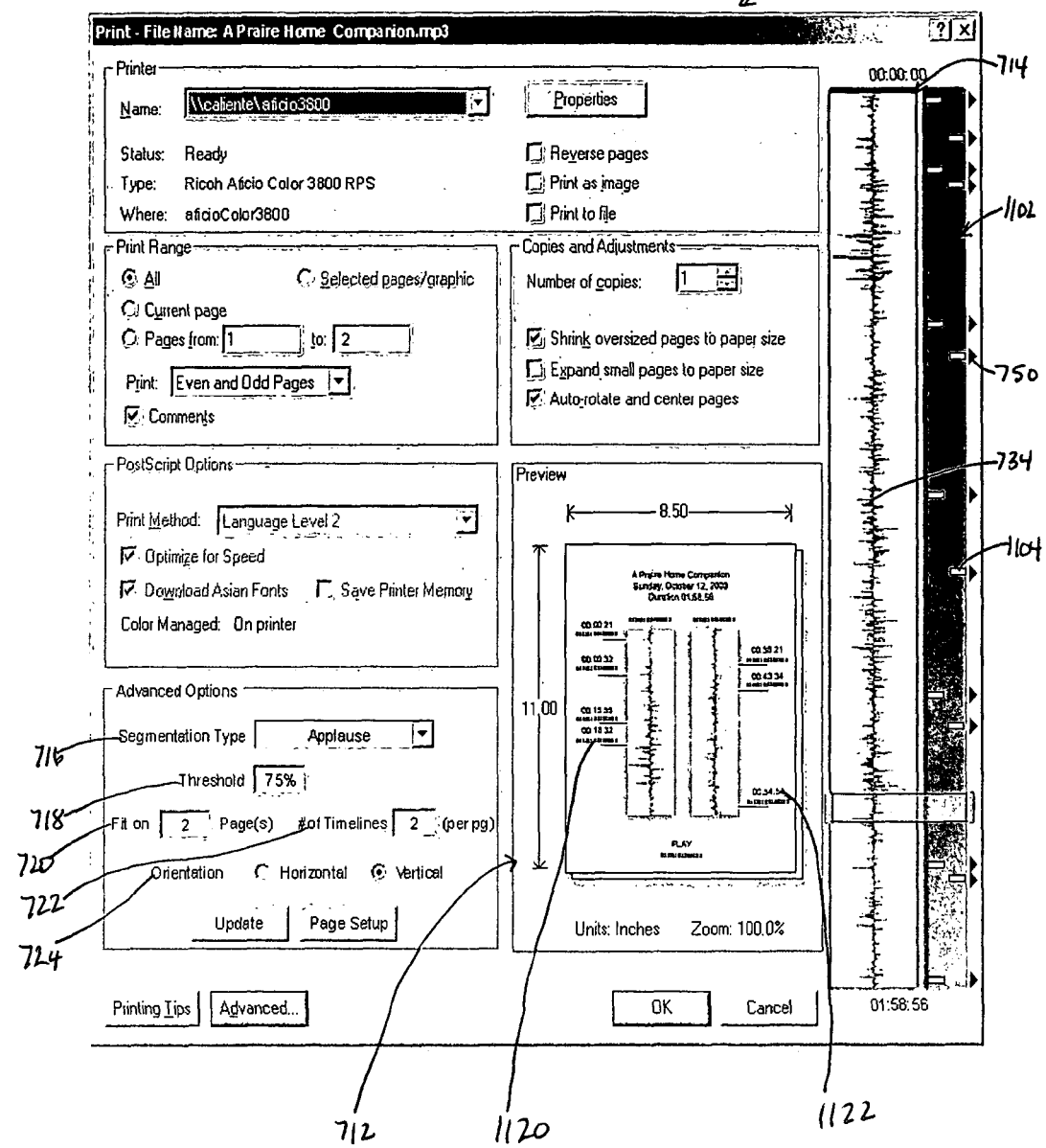
FIG. 11 is a graphical representation of an exemplary graphical user interface showing division of an audio file timeline into two vertical parts.

Referring now to FIG. 11, there is shown a graphical representation of a PDDI 122 in which the timeline is divided into two vertical parts, and a segmentation type and threshold level have been applied. In this example, the user has selected, in the timeline number selection field 722, to include two timelines printed per page of the multimedia document. Additionally, the user has selected, in the "Fit on" field 720 to print the multimedia document over two pages. The user has also selected, in the orientation field 724 to display the timelines vertically in the multimedia document. Thus, the audio waveform timeline 734 shown in the Content Selection field 714 is divided in half, and the upper half is displayed on the page shown in the Preview field 712. The lower half is included on the second page, the content of which is not displayed in the Preview field 712.

In the example of FIG. 11, instead of manually selecting segments of the audio waveform timeline 734 with the selector 736, the user has applied a segmentation type to the audio data. The user has selected, in the segmentation type field 716, to conduct audio detection for applause events on the audio data. The system 200 will search for all applause events within the audio data. However, the user has also selected, within the threshold selection field 718, to apply a threshold of 75%. Thus, only audio events that are more than 75% likely to be applause events will be displayed in the PDDI 122. The applause events are displayed in the Segmentation Display field 1102. Each event segment 1104 shown within the Segmentation Display field 1102 corresponds to an event that is more than 75% likely to be an applause event.

The event segments 1104 are shown as staggered boxes in FIG. 11. However, these might also be lines stretching across the Segmentation Display field 1102 or other visual indicators. The user can right click on any one of the event segments 1104 to delete the event segment 1104. Markers (i.e., a barcode, an RFID tag, a URL, or some other indication for the location where the multimedia data can be retrieved from) 1120 corresponding to each applause event segment 1104 are shown in the multimedia document displayed in the Preview field 712. In this example, timestamps 1122 are also included with each marker 1120. The user can click on the arrows 750 located near each event segment 1104 to play the audio content that likely contains applause. Thus, the user can check the event segments 1104 shown, before printing the document, to ensure that the event segments 1104 really do correspond to applause events. Additionally, the user can select the markers in the printed document that correspond to applause events to play the applause content. Besides the audio detection event example described in FIG. 11, there are a number of other segmentation types that can be applied to audio content or other kinds of multimedia content. Each of these segmentation types can be displayed in a menu in the segmentation type field 716, and the user can select from the menu which segmentation type should be applied. The following is a summary of examples of various different segmentation types that can be applied. Speaker segmentation is one example, in which each segment corresponding to different speaker is shown in a different color or by a different icon. The segments that were produced by the same speaker are shown in the same color or by the same icon. Speaker recognition is another example, in which the name of each speaker is accompanied by a confidence that it was detected correctly. The PDDI 122 includes a series of check boxes that let the user choose which speakers to display. The user can alternatively apply sound source localization, in which the direction from which sound was detected is displayed as a sector of a circle. Each sector is accompanied by a confidence that it was detected correctly. The user interface includes a series of check boxes arranged around the circumference of a prototype circle that let the user choose which directions to display. Speech recognition is another example of a segmentation type, in which the timeline displays text and optionally confidence values for each word or sentence spoken during the audio content.

VIDEO

Figure 12:
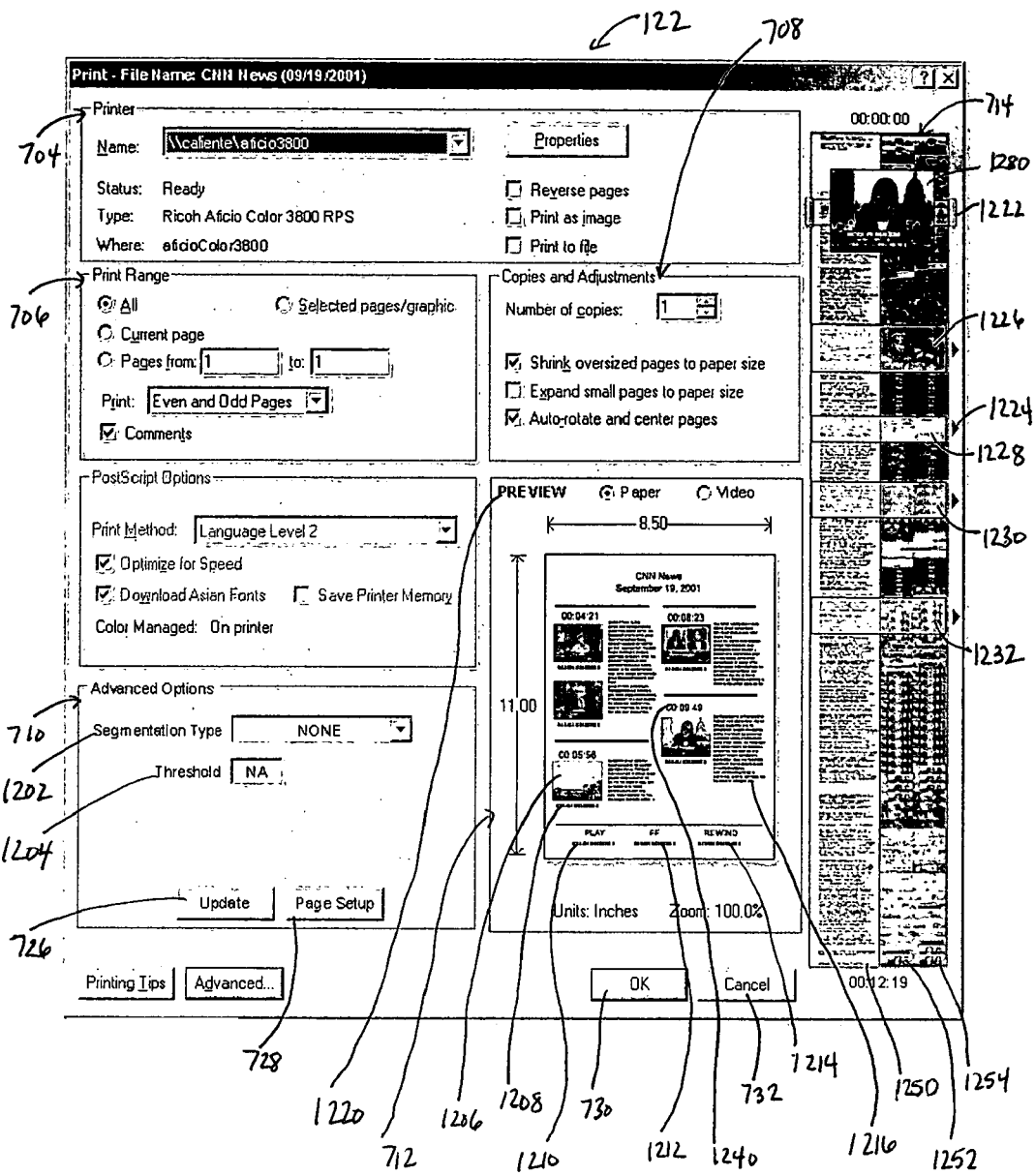
FIG. 12 is a graphical representation of an exemplary graphical user interface showing generation of a representation including user-selected ranges of an video file.

FIG. 12 illustrates a graphical representation of a PDDI 122 for generating a video paper document. As with the PDDI 122 for generating an audio document, the user can input information into the fields in the PDDI 122 for generating a video document. The PDDI 122 shown in the embodiment of FIG. 12 includes some fields that are found in a standard printer dialog box, such as the Printer field 704, the Print Range field 706, and the Copies and Adjustments field 708. However, the PDDI 122 also displays fields that are not found within standard printer dialog boxes, such as the Advanced Options field 710, the Preview field 712, and the Content Selection field 714.

In the embodiment of FIG. 12, the Advanced Options field 710 provides the user with options that are specific to the formatting and layout of multimedia content. In this embodiment, the user selects the segmentation type in the segmentation type field 1202 that the user would like to have applied to the video content. The menu of segmentation types for generating a video document will include at least the segmentation types already discussed previously in reference to creating an audio document in FIG. 7. In the example, the user has not selected any segmentation type in the segmentation type field 1202, so the segmentation type 1202 is shown as "NONE." Thus, in this example, the user manually selects start and end times for segments of a given video file by moving the selector 1222 within the Content Selection field 714 and clicking on the portions of the video timeline display that the user would like to select.

Within the Advanced Options field 710, the user can define or adjust a threshold on the confidence values associated with a particular segmentation, as discussed previously. The user sets the threshold by typing the threshold value into the threshold field 1204. For example, the user can set a threshold of 75%, and only frames that are above this threshold (i.e., more than 75% chance that the frame includes a face in a face detection analysis) will be displayed. In other embodiments, a threshold slider is included in the PDDI 122, and the user can move the slider along a threshold bar that runs from 0% to 100% to select a specific threshold within that range. In addition, the buttons shown in the embodiment of FIG. 12, including an Update button 726, a Page Setup button 728, an OK button 730, and a Cancel button 732, function in a manner similar to the corresponding buttons discussed regarding FIG. 7.

In the embodiment of FIG. 12, the Content Selection field 714 shows video frames and text on a timeline, which were extracted at regular intervals throughout some defined video content. For example, the system can save video frames of a CNN News segment every second, and the video timeline will display all or at least some of the saved frames on the video timeline. The extracted frames will be displayed with the frames starting at time "00:00:00," in the CNN News segment, at the top of the timeline and continuing to be displayed along the timeline until the end, at time "00:12:19." In this example, the top of the video timeline shows the time "00:00:00," or the start time of this video content displayed in the timeline. The bottom of the video timeline shows the time "00:12:19," or the end time of the video content. In some embodiments, the video frames can be displayed in reverse order along the timeline.

Additionally, there are three columns 1250, 1252, and 1254 displayed in Content Selection field 714. One column 1250 displays text information, and the other two columns 1252 and 1254 display video frames. The video frames displayed in FIG. 12 in the two columns 1252 and 1254 are displayed side-by-side. For example, the first frame selected is displayed at the top left of the timeline, and the second frame selected is displayed next to the first frame. The third frame selected is displayed below the first frame, and the fourth frame selected is displayed below the second frame. The video frame display continues along the timeline in this pattern. In other embodiments, the video frames could be displayed in different patterns, or could be displayed in one column, or in more than two columns along the timeline. The transcript of text is also displayed along the timeline in FIG. 12, from top to bottom, generally near the corresponding video frame. In other embodiments, the text is displayed in two or more columns, or on the other side of the video frames, or is not displayed at all on the timeline.

The user can slide the selector 1222 along the video timeline to select certain segments of the video content, which will be displayed on the multimedia document generated. In one embodiment, once the selector 1222 is located at the segment of video content that the user would like to select, the user can click on the selector 1222 to select segment 1226. The video timeline could also be displayed in a number of alternative manners, such as showing a horizontal timeline, showing more than one timeline side-by-side, showing a different video frame appearance, and the like. As discussed above, while the video timeline in the embodiment of FIG. 12 displays both video frames and associated text, the video timeline can also display only video frames without the associated text, in some embodiments. In these embodiments where the timeline displays only video frames, the multimedia representation generated can still include both text and video frames, or it can be limited to video frames alone.

In the example shown in FIG. 12, the user selected four regions of the video timeline to be marked on the multimedia document. The user selected segment 1226, segment 1228, segment 1230, and segment 1232. Each of these selected segments will be displayed as one or more video frames and associated text on the multimedia document. In the Preview field 712 of FIG. 12 there is shown an image of a multimedia document. The document of the FIG. 12 example shows one page including five video frames 1206 and associated text 1216. The displayed video frames 1206 and associated text 1216 each correspond to the segments that were selected in the Content Selection field 714. For example, the first two video frames 1206 starting at the top left of the multimedia document correspond with the selected segment 1226. In the FIG. 12 example, the video frame 1206 shown in the bottom left hand corner of the multimedia document corresponds to selected segment 1228 on the video timeline. The video frame 1206 in the top right corner of the document corresponds to selected segment 1230, and the video frame 1206 in the bottom right corner corresponds to selected segment 1232.

Additionally, the location of each displayed video frame within the video timeline is displayed above each video frame as a time marker 1240. In FIG. 12, each time marker 1240 corresponds to a segment within the time frame of "00:00:00" to "00:12:19," the total length of the video content displayed on the video timeline. For example, the video frame 1206 at the top left hand corner of the multimedia document for a CNN News segment includes a time marker 1240 of "00:04:

21." Thus, the video content associated with this video frame 1206 begins at four minutes and twenty-one seconds into the CNN News segment. Additionally, the text 1216 associated with this video frame 1206 displays a transcript of the video frame 1206, and the transcript begins at four minutes and twenty-one seconds into the CNN News segment.

The user can also play the video content in a number of ways. For example, the user can click on the play arrows 1224 next to each selected segment on the video timeline to cause the segment to begin to play. In the embodiment of FIG. 12, the video frames 1206 displayed on the multimedia document each have a corresponding marker or identifier 1208 (e.g., a barcode) located below the video frame 1206. These identifiers 1208 also can provide an interface for playing the video content. A user can select any of the identifiers 1208 (i.e., scan the barcodes) for any of the selected segments on the document, and this will cause the selected video segment to play, as discussed previously in reference to audio segments.

When a user selects an identifier 1208, the associated video content will begin to play starting at the time displayed on the corresponding time marker 1240. In the FIG. 12 embodiment, the dialog associated with the video frame 1206 will begin at the start of the associated transcript of text 1216. For example, if the user scans the barcode shown below the video frame on the top left-hand corner of the multimedia document shown in the Preview field 712 of FIG. 12, a video clip of the CNN News segment will play, beginning four minutes and twenty-one seconds into the news show.

The multimedia document shown in the embodiment of FIG. 12 further shows control markers or identifiers for controlling video content display. In FIG. 12, there is shown a play marker 1210, a fast forward (FF) marker 1212, and a rewind marker 1214. The user can select the play marker 1210 in a printed document (i.e., by scanning the barcode with a cell phone or other device), which acts as a pause button. If the user has selected any of the identifiers 1208 on the printed page and the corresponding video content is playing on some type of display device (not shown), such as a cell phone, the user can pause this by selecting the play marker 1210. The user can resume the playing of the video content by selecting the play marker 1210 on the printed document again, or the user can select another identifier 1208 on the page to play the corresponding video content. Additionally, if the user has selected any of the identifiers 1208 on the printed page and the corresponding video content is playing, the user can fast forward or rewind through the video clip by selecting the fast forward marker 1212 or the rewind marker 1214, respectively.

In the FIG. 12 example, the multimedia document shown in the Preview field 712 also includes a header, which can include information about the video content (e.g., the title of the video content and the date of the video content). For example, the header in FIG. 12 identifies the video content as "CNN News," and the news segment was played on "Sep. 19, 2001."

The Preview field 712 shown in the FIG. 12 embodiment further includes a preview content field 1220. This preview content field 1220 marks whether a user is previewing a paper version of the multimedia document or previewing the video content associated with a video frame 1206 displayed on the multimedia document. The user can preview the selected video content associated with a video frame 1206 through a video player embedded in the PDDI 122 by selecting the "Video" radio button.

In the FIG. 12 embodiment, the multimedia document is displayed in the Preview field 712 according to one particular layout. However, the document can be arranged in a number of different formats. For example, the document could include no header, the time markers 1240 could be displayed below the video frames 1206, the identifiers 1208 could be shown above the video frames, and the like.

FIG. 12 also shows a preview window 1280 displayed on the video timeline in the Content Selection field 714. In some embodiments, a preview window 1280 will appear as the user moves selector 1222 along the video timeline. The preview window 1302 will display an image of the video frame over which the selector 1222 is positioned. The preview window 1280 can appear directly over the selected segment, or it could alternatively appear under, above, or next to the segment.

Figure 13:
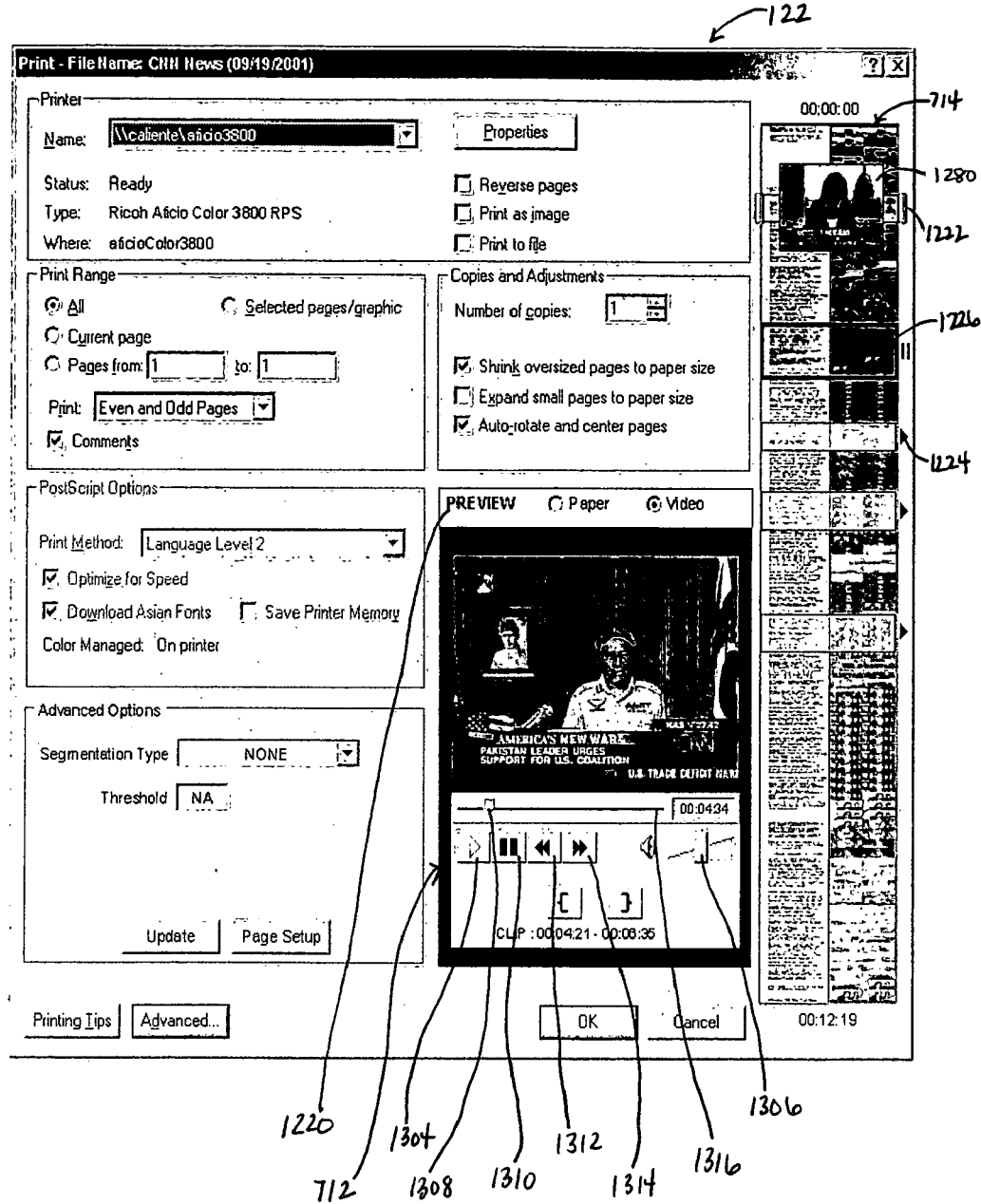
FIG. 13 is a graphical representation of an exemplary graphical user interface showing a preview field for previewing multimedia content.

Referring now to FIG. 13 there is shown a graphical representation of the PDDI 122 of FIG. 12, in which the user is previewing a video clip. A user can select a play arrow 1224 located near each selected segment along the video timeline in the Content Selection field 714 to cause the clip to begin to play. Alternatively, the system can be configured so that the full video content represented by the video timeline will begin to play when the play arrow 1224 is selected. When the video is playing in the Preview field 712, the associated segment along the timeline (e.g., segment 1226) will be highlighted, and the play arrow 1224 next to the segment will change form (e.g., double lines) to denote that the segment is being played. Alternatively, the system can be designed so that the user can select a video frame and cause it to begin to play just by clicking or double-clicking on the particular video frame in the multimedia document in the Preview field 712 or by clicking on the frame in the video timeline. Additionally, in some embodiments, if a user right-clicks on a segment (e.g., 1224) in the video timeline, a dialog box will appear giving the user an option to play the video (staring at the beginning of the segment). The user can select the play option in the dialog box, and the video frame will begin to play in the Preview field 712.

When the user selects a particular video segment for preview, a media player that is embedded in the PDDI 122 starts to play the video segment in the Preview field 712 from the start of the video segment. For example, in FIG. 13, the video segment can begin to play at time four minutes and twenty-one seconds into the news segment, and this corresponds to the beginning of the selected clip that runs from "00:04:20-00:06:35." As discussed previously, the video content could alternatively start playing from "00:00:00" on the video timeline, rather than at the specific clip. Alternatively, the system may be designed such that the media player does not begin playing the video clip until the user selects the play button 1304. Thus, upon selecting a video segment to be previewed, the media player appears with the slider 1308 at the beginning of the segment, the user must actually click the play button 1304 to cause the content to begin to play.

The media player in the Preview field 712 also includes the features of many standard multimedia players (e.g., Microsoft Windows Media Player), such as a pause button 1310 for stopping/pausing the display of the video clip, a rewind button 1312 for rewinding within the video content, a fast forward button 1314 for fast forwarding within the video content, and a volume adjuster 1306 for setting the volume for display. A slider 1308 is also included, which can allow the user to move around within the video content. The slider bar 1316, along which the slider moves 1308, can correspond to the length of the full video content displayed along the time line or it can correspond only to the length of the clip. The user can click on and drag the slider 1308 along the slider bar 1316 to move around within the video content. The fast forward button 1314 and the rewind button 1312 can be configured to allow the user to only move within the selected segment, or can alternatively allow the user to move within the full video content associated with the video timeline. The media player can be missing any one of the control buttons shown in FIG. 13, or it can include other buttons for controlling display of a video.

FIG. 13 also shows a preview window 1280 displayed on the video timeline in the Content Selection field 714, similar to that shown in FIG. 12. This allows the user to preview the video content in the Content Selection field 714.

Figure 14:
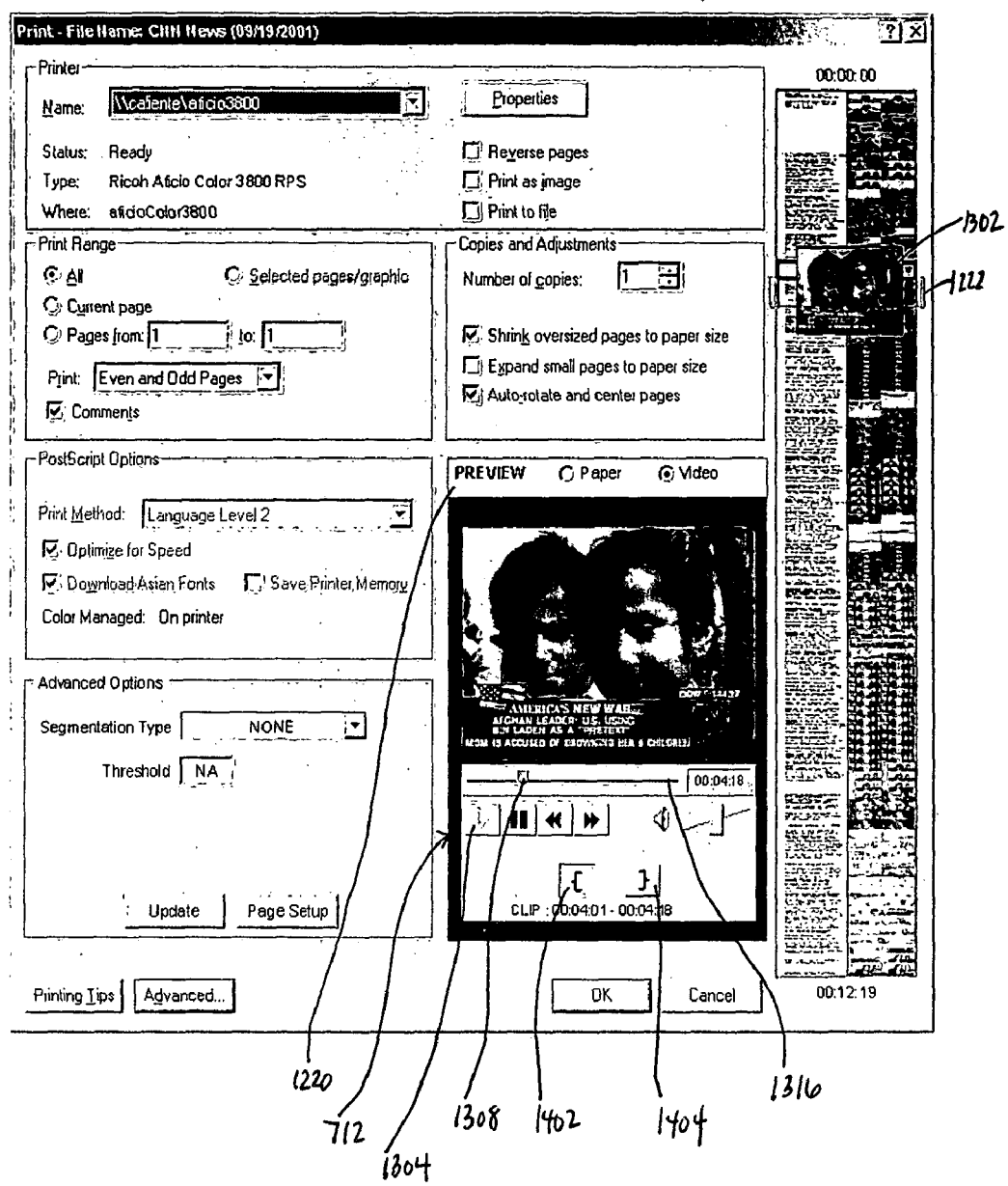
FIG. 14 is a graphical representation of an exemplary graphical user interface showing use of segment marker buttons in a preview field.

Referring now to FIG. 14, there is shown a graphical representation of a PDDI 122 in which a video clip is being displayed in the Preview field 712. FIG. 14 shows the creation of a segment through use of the beginning marker button 1402 and the end marker button 1404 included in the media player in this embodiment. The media player can be designed so that the beginning of the slider bar 1316 corresponds with the beginning of the video content associated with the video timeline (e.g., at "00:00:00") or with the beginning of the selected clip. When the video content is playing, the user can use beginning marker button 1402 and end marker button 1404 to mark segments of interest. For example, if a user is interested in video content within a news segment that discusses a particular actor, the user can play the video content in the media player. When the user reaches a segment discussing the actor, the user can click beginning marker button 1402 to mark the location. When the segment ends, the user can click end marker button 1404. The user can continue to do this throughout the news segment, marking segments of interest to be printed or for any other purpose.

Figure 15:
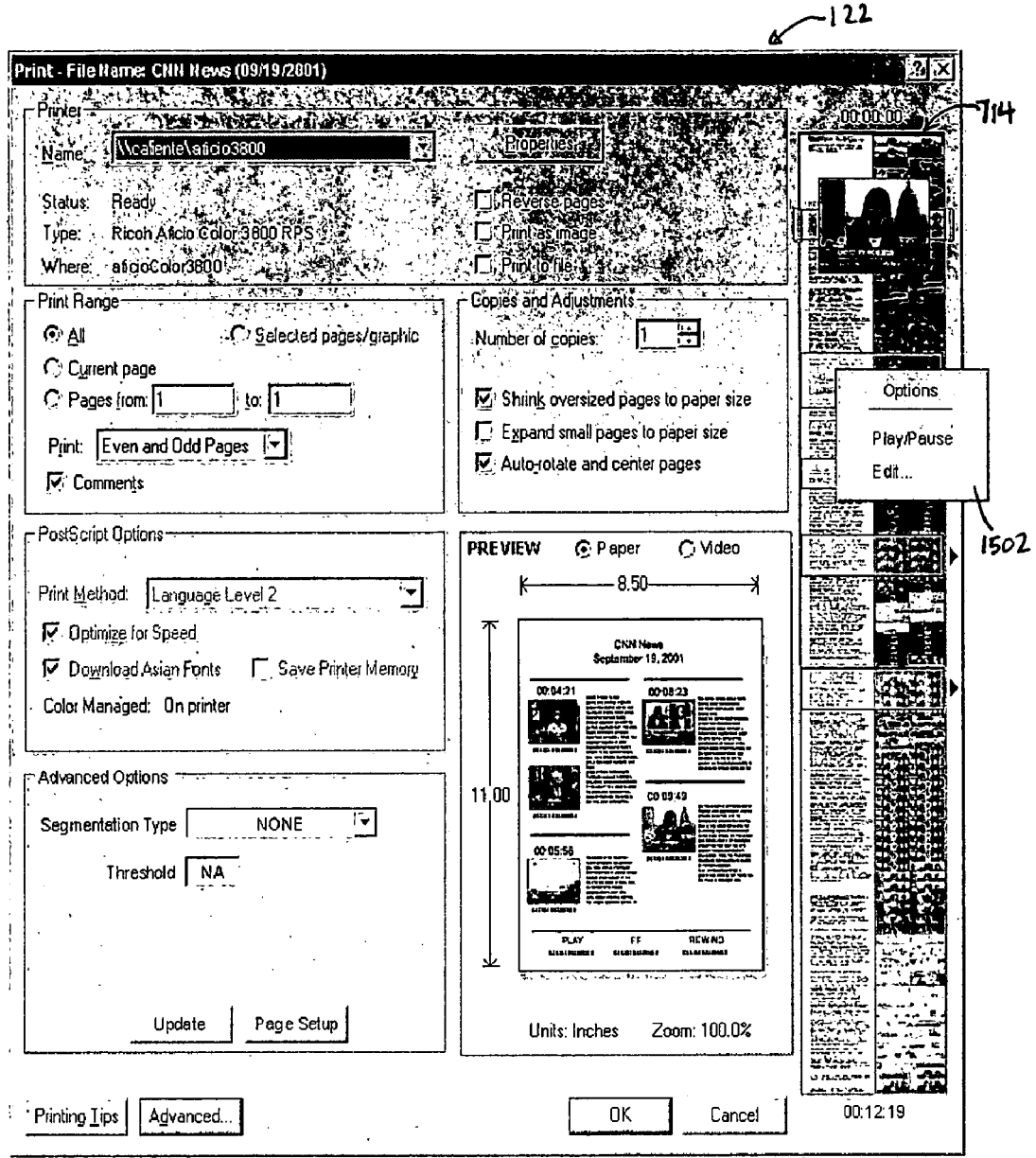
FIG. 15 is a graphical representation of an exemplary graphical user interface showing a dialog box providing options to the user.

FIG. 15 illustrates a graphical representation of the PDDI 122 shown in FIG. 12, in which the user has used a mouse or other pointer device to right-click on the video timeline shown in the Content Selection field 714. When the user right-clicks on a video segment in the video timeline, a dialog box 1502 appears, providing the user with options regarding the video frame. The user can select, within the dialog box 1502, to play the video associated with the segment, or pause the play of the video if it is currently playing. Alternatively, the user can choose to edit the segment. The editing option is discussed in more detail below. The dialog box 1502 can appear over the selected segment in the video timeline or anywhere near the video timeline. The dialog box 1502 can additionally include other control options besides those shown in FIG. 15, such as a rewind option or a fast forward option.

Figure 16:
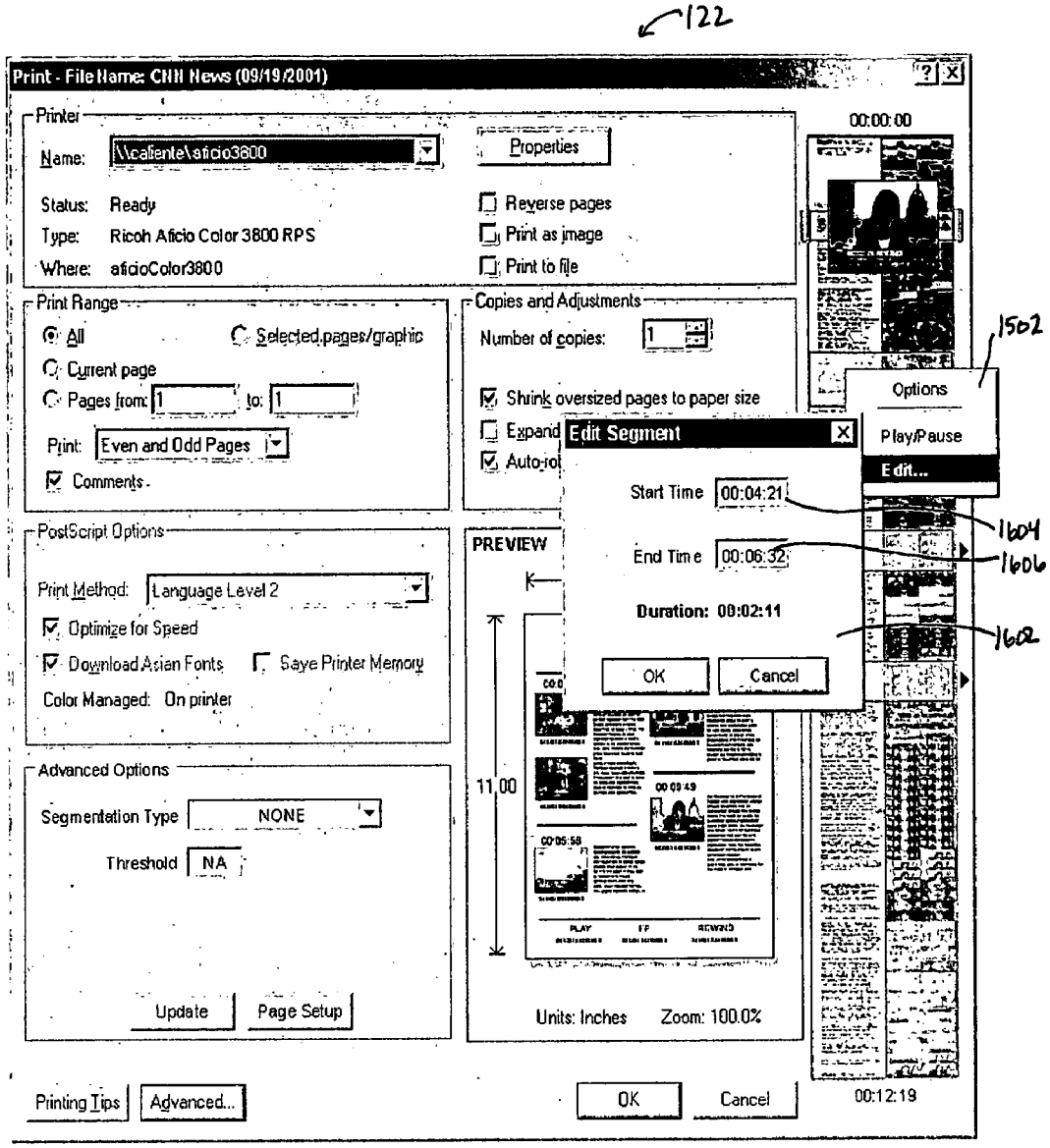
FIG. 16 is a graphical representation of an exemplary graphical user interface showing a dialog box for editing a video segment.

Referring now to FIG. 16 there is shown a graphical representation of the PDDI 122 of FIG. 15 in which the user has selected the edit option in the dialog box 1502. Upon selecting the edit option in the dialog box 1502, an edit dialog box 1602 appears allowing the user to select further options. In the edit dialog box 1602, the user can modify the start time or the end time for a segment by modifying the start time field 1604 and the end time field 1606. Thus, the user can choose to have the segment include some of the time that comes before or after the segment. For example, the user may be interested in seeing the video content that occurred in a CNN News segment 45 seconds before the defined start time for the segment because there may be an introduction or some lead-in in which the user has an interest. Additionally, the user may be interested in seeing the video content that comes a few seconds after the defined end time for a segment. The user can alternatively modify the start and end time of a segment to shorten the segment and remove extraneous content in which the user does not have an interest. After modifying either the start time, the end time, or both, the user can select the OK button to apply the modifications, or the user can select the Cancel button to end the task and make the edit dialog box 1602 disappear.

Figure 17:
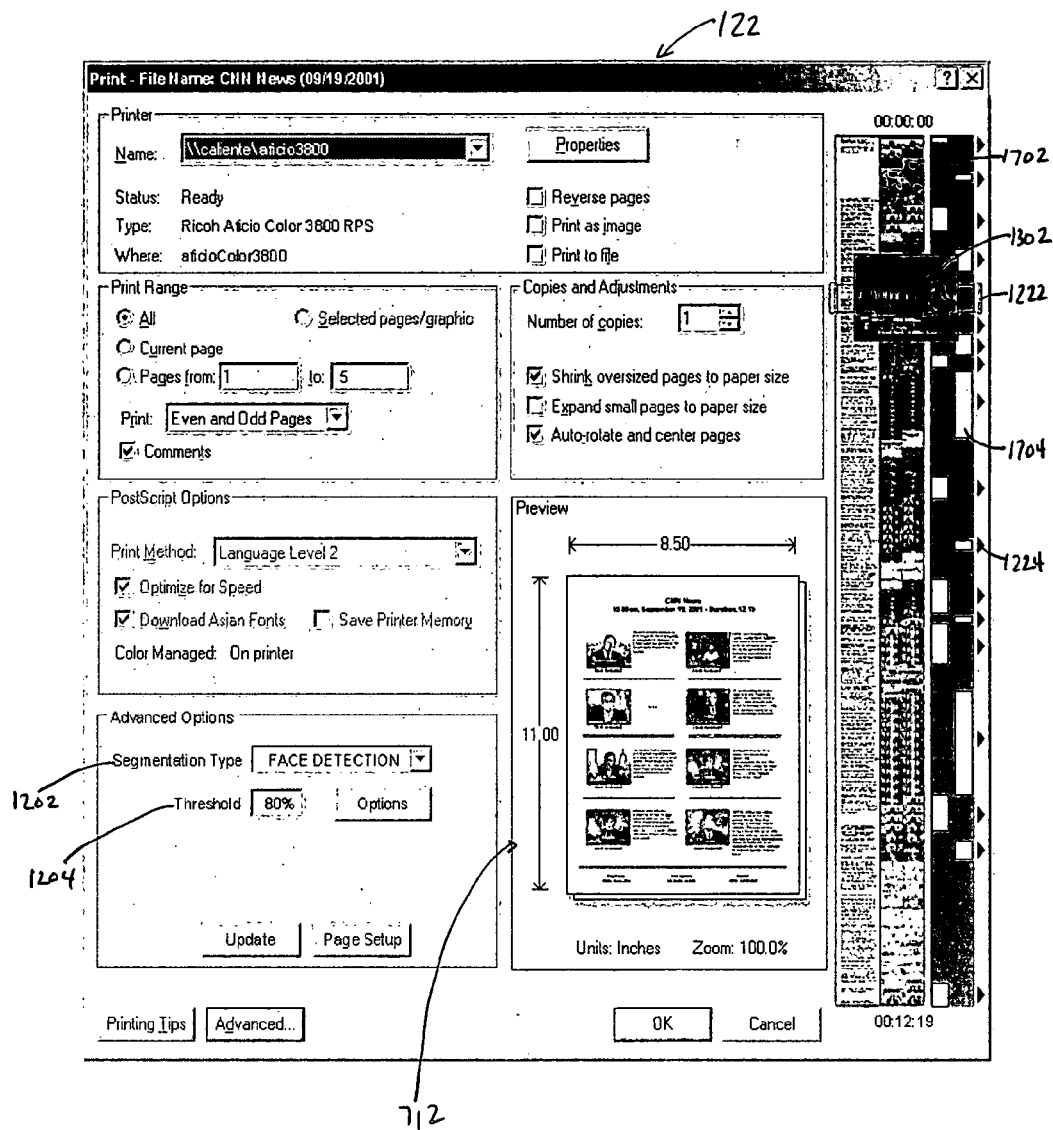
FIG. 17 is a graphical representation of an exemplary graphical user interface showing generation of a video representation in which face detection techniques have been applied.

In the example of FIG. 17, instead of manually selecting segments of the video timeline with the selector 1222, the user has applied a segmentation type to the video data. The user has selected, in the segmentation type field 1202, to conduct face detection, in which the system will search for images of faces within the video content. When face detection is selected, the PDDI 122 shows segments along a timeline that contain face images. Each segment can be accompanied by an integer that expresses the number of faces detected in a clip as well as a confidence value. The user has also selected, within the threshold selection field 1204, to apply a threshold value of 80%. Thus, only video frames that are more than 80% likely to include face images will be displayed in the PDDI 122. The face detection results are displayed in the Segmentation Display field 1702. Each event segment 1704 shown within the Segmentation Display field 1702 corresponds to a video frame or set of video frames that are more than 80% likely to include a face image.

The event segments 1704 are shown as staggered boxes in FIG. 17. However, these might also be lines stretching across the Segmentation Display field 1702 or other visual indicators. The user can right click on any one of the event segments 1704 to delete the event segment 1704. Markers (e.g., barcodes) corresponding to the event segments 1704 can be shown in the multimedia document displayed in the Preview field 712. The user can click on the play arrows 1224 located near each event segment 1704 to play the video content that likely contains a face image. Additionally, a preview window 1302 appears as the user moves the selector 1222 along the video timeline, providing the user with an opportunity to view the video frames in the event segments 1704 to ensure that a face image is present. Additionally, the system might be configured to merge video content showing an image of the same face into one video frame, rather than displaying a separate video frame for each instance of a particular face image.

Besides the face detection example of FIG. 17, there are numerous other segmentation types that can be applied to video content or other kinds of multimedia content. Each of these segmentation types can be displayed in a menu in the segmentation type field 1202, and the user can select from the menu which segmentation type should be applied. The following is a summary of examples of various different segmentation types that can be applied. Video event detection is a segmentation type that a user can apply, in which the PDDI 122 shows the results of applying a video event detection algorithm along a timeline. Examples of video events include the cases when people stood up during a meeting or when people entered a room. Color histogram analysis is another segmentation type that a user can apply, in which the PDDI 122 shows the results of applying a color histogram analysis algorithm along a timeline. For example, the PDDI 122 could show a hue diagram at every 30-second interval, allowing an experienced user to quickly locate the portions of a video that contain sunsets. In addition, clustering can be applied to cluster the face images so that multiple instances of the same face are merged into one representation face image.

Face recognition is another segmentation type, in which the PDDI 122 shows names along a timeline that were derived by application of face recognition to video frames at corresponding points along the time line. Also, a series of checkboxes are provided that let the user select clips by choosing names. Optical character recognition (OCR) is a segmentation type, in which OCR is performed on each frame in the video content, and each frame is subsampled (i.e., once every 30 frames). The results are displayed along a timeline. A text entry dialog box is also provided that lets the user enter words that are searched within the OCR results. Clips that contain the entered text are indicated along the timeline. In addition, clustering can be applied so that the similar results in performing OCR to each frame are merged. Clusters that contain the entered text are indicated along the timeline.

In addition to the above segmentation types, there are other examples of that could be applied. Motion analysis is another segmentation type, in which the PDDI 122 shows the results of applying a motion analysis algorithm along a timeline. The results can be shown as a waveform, for example, with a magnitude that indicates the amount of detected motion. This would allow an experienced user to quickly locate the portions of a video that contain a person running across the camera's view, for example. Distance estimation is another segmentation type, in which the PDDI 122 shows the results of applying a distance estimation algorithm along a timeline. For example, in a surveillance camera application using two cameras a known distance apart, the distance of each point from the camera can be estimated. The user can set the threshold value to select portions of a given video file to print, based on their distance from the camera. For example, the user may wish to see only objects that are more than 50 yards away from the camera. Foreground and background segmentation can also applied, in which the PDDI 122 shows the results of applying a foreground/background segmentation algorithm along a timeline. At each point, the foreground objects are displayed. A clustering and merging algorithm can be applied across groups of adjacent frames to reduce the number of individual objects that are displayed. A user can set the threshold value to select portions of a given video file to print based the confidence value of the foreground/background segmentation, as well as the merging algorithm. Scene segmentation is another type that the user can apply, in which the PDDI 122 shows the results of applying a shot segmentation algorithm along a timeline. Each segment can be accompanied by a confidence value that the segmentation is correct.

Segmentation types for recognizing automobiles or license plates can also be applied. Automobile recognition might be useful, for example, to a user who operates a surveillance camera that creates many hours of very boring video. Such a user often needs to find and print only those sections that contain a specific object, such as a red Cadillac. For this purpose, each frame in the video is input to an automobile recognition technique and the results are displayed along a timeline. License plate recognition might also be useful to a user operating a surveillance camera and may need to search the surveillance video for sections containing a specific license plate number. For this purpose, each frame in the video is input to a license plate recognition technique and the results (plate number, state, plate color, name and address of plate holder, outstanding arrest warrants, criminal history of the plate holder, etc.) are displayed along a timeline. With either automobile or license plate recognition, the user can set a threshold value to select portions of a given video file to print based on the confidence values that accompany the automobile or license plate recognition results. A text entry dialog box is also provided that allows the user to enter identifiers for the make, model, color, and year for an automobile, or plate number, state, and year, etc. for a license plate. These text entries are searched for within the recognition results. Clips that contain the entered information are indicated along the timeline.

Figure 18:
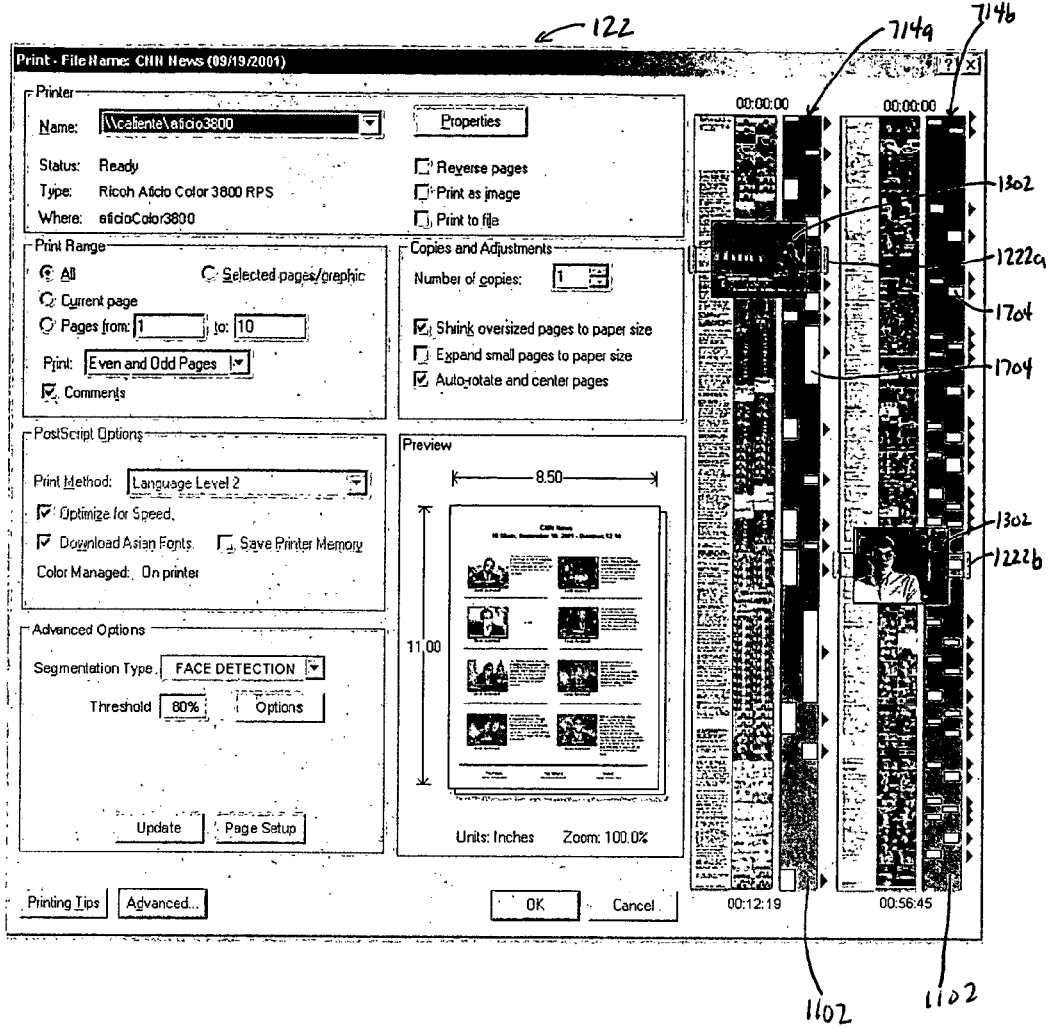
FIG. 18 is a graphical representation of an exemplary graphical user interface showing generation of a video representation from multiple sources.

Referring now to FIG. 18 there is shown a graphical representation of a PDDI 122 that includes video content from multiple sources displayed on more than one timeline. For example, the video content could originate from two different CNN News segments, or it could originate from both a CNN News segment and a CSPAN news segment. The system can be configured to print video frames from one news segment on one page of the multimedia document and video frames from another news segment on another page. FIG. 18 displays two separate Content Selection fields, 714*a* and 714*b*, each with a separate video timeline displaying extracted video frames and associated text. Each video timeline includes a selector, 1222*a* and 1222*b* for making selections within the video timelines and event segments 1704 that denote frames in which a face image was detected with a more than 80% chance. Each video timeline also includes a separate Segmentation Display field 1102 associated with it that shows the even segments 1704 that resulted from the application of face detection to that video source. Thus, the user can independently move selector 1222*a* and 1222*b* around each timeline until the user has viewed the preview windows 1302 and determined which video frames to select for display in a multimedia document. While FIG. 18 shows two video timelines, it is also possible for the user to compare multiple sources, and thus generate multiple timelines in the PDDI 122.

Figure 19:
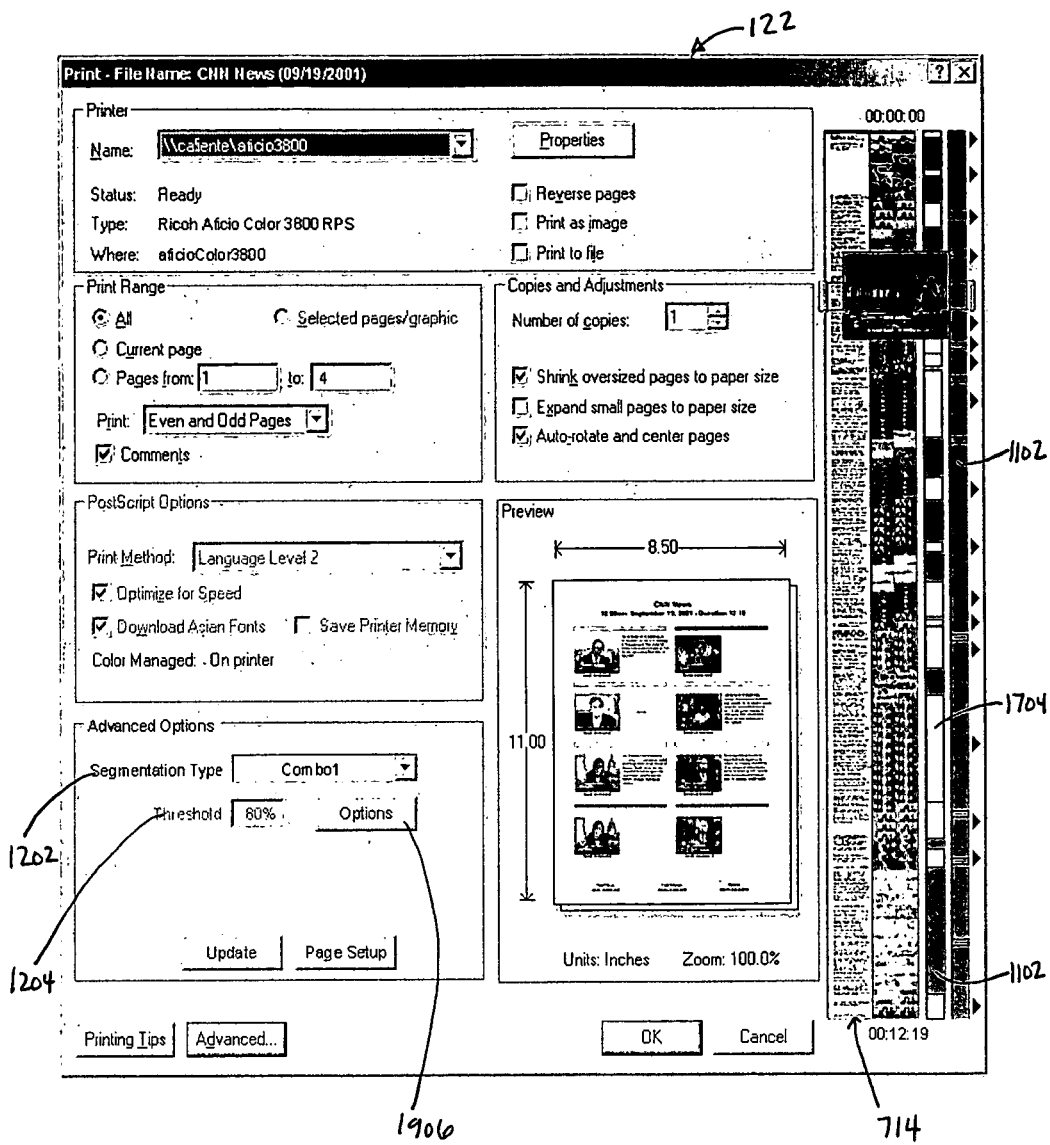
FIG. 19 is a graphical representation of an exemplary graphical user interface showing generation of a video representation in which a user-defined combination of analysis techniques have been applied.

The user can apply a number of different segmentation types to video content using the PDDI. The user may choose to apply both audio detection and speaker recognition to one twelve-minute-long CNN News show, for example. FIG. 19 shows the PDDI 122 of FIG. 17, in which face detection was applied. However, FIG. 19 shows the results of the application of both the face detection video OCR. The system is configured, in some embodiments, to include a drop-down menu in the segmentation type field. The menu can list each segmentation type, one-by-one, within the menu. Thus, in this embodiment, the user can click on more than one segmentation type in the menu (i.e., by holding down the CTRL key while making selections) and apply all of the selected segmentation types.

In other embodiments, the menu might also include a number of different combination options, allowing the user to select one item in the menu that includes more than one segmentation type. For example, audio detection plus speaker recognition may be one combination item on the menu. By selecting this option in the menu, the user causes audio detection and speaker recognition to be performed on the multimedia content. This combination menu items may be preset in the printer 102 properties as a default list of segmentation types and segmentation combination types. In addition, the user can define his or her own combination types. When the user creates a user-defined segmentation type, the user can give the segmentation type a name, and this option will appear in the drop-down menu of segmentation types. The segmentation type in FIG. 19 is entitled "Combo1," and it is a user-defined combination of single segmentation types. Additionally, the threshold field 1204 is disabled because a combination of more than one segmentation technique could produce a huge number of parameters that could be tuned. Thus, each combination of techniques can have a default set of parameter values that are proven to function well. However, the user can modify them in the dialog box (not shown) that appears when the Options button 1906 is clicked.

As shown in FIG. 19, the Content Selection field 714 includes two Segmentation Display fields 1102, one for each segmentation type that was applied to the video content. In this example, there is one Segmentation Display field 1102 for each of the two segmentation types that make up "Combo1." The Segmentation Display field 1102 to the left shows the results of applying the face detection that was shown in FIG. 17. However, the event segments 1704 are not staggered as they were in FIG. 17, and are instead lined up one over the other. The Segmentation Display field 1102 to the right shows the results of applying video OCR to the video content. The event segments 1704 shown in this Segmentation Display field 1102 appear different from those shown in the Segmentation Display field 1102 to the left. However, in some embodiments, the event segments 1704 shown in different Segmentation Display fields 1102 could appear the same. In some embodiments, the event segments 1704 are arranged in a different format in the two Segmentation Display fields 1102, or the PDDI 1704 can contain only one Segmentation Display field 1102 that shows event segments 1704 for all segmentation types applied.

Besides the example of FIG. 19 in which a combination of segmentation types is applied (e.g., Combo1), there are numerous other combinations of segmentation types that can be made. Each of these combinations of segmentation types can be displayed in a menu in the segmentation type field 1202, and the user can select from the menu which segmentation type should be applied. The following is a summary of examples of various different combinations of segmentation types, though numerous other combinations that are not discussed below can also be made. The user can apply motion analysis in combination with distance estimation, in which the PDDI 122 shows the results of applying a motion analysis algorithm and a distance estimation algorithm along one timeline or two separate timelines. The motion analysis timeline could include a waveform whose magnitude indicates the amount of detected motion. The user can set a threshold value allowing the user to select portions of a given video file to print, based on the amount of motion that was detected and the distance of that motion from the camera. Scene segmentation and face detection is another combination that a user could apply, in which the PDDI 122 shows the results of applying a shot segmentation algorithm along a timeline. Color or a special icon, for example, can indicate segments on the timeline that contain face images. Each segment can be accompanied by a confidence value that the scene segmentation is correct and can be accompanied by an integer that expresses the number of faces detected as well as a confidence value. Scene segmentation and OCR is another combination that could be applied, in which the PDDI 122 shows the results of applying a shot segmentation algorithm along a timeline. OCR is also performed on each frame in the video content, and the content is subsampled. The results are displayed along a same or different timeline. The user can also conduct text searches in the OCR results and segments containing the search words can be displayed along the timeline.

When applying combinations of segmentation types to multimedia content, the user is not limited to applying just two types in a combination. The user can apply three or more segmentation types, and such combinations can be shown in the segmentation type menu by default or they can be created by the user. Scene segmentation, OCR, and face recognition can be applied in combination, in which the PDDI 122 shows the results of applying a shot segmentation algorithm along a timeline. Each frame in the video has OCR performed on it and is subsampled, and the results are displayed along the same or different timeline. Names that were derived by application of face recognition to video frames are also shown on the same or different timeline. Also, a series of checkboxes are provided that let the user select clips by choosing names. The user can set threshold values for the results, allowing the user to select portions of a given video file to print based on the confidence values that accompany the shot segmentation, OCR, and face recognition results. Alternatively, the user could apply face detection with OCR and scene segmentation. The PDDI 122 would display the OCR and scene segmentation results as described above. The same or different timeline could also include segments that contain face images. Each segment can be accompanied by an integer that expresses the number of faces detected in the clip as well as a confidence value.

Automobile recognition plus motion analysis could be another alternative segmentation type combination, in which each frame in the video is input to an automobile recognition technique and the results are displayed along a timeline. Also, a motion analysis technique is applied to the video to estimate the automobile's speed from one frame to the next. A text entry dialog box is also provided that allows the user to enter identifiers for the make, model, color, and year for an automobile, and the automobile speed. These items are searched within the automobile recognition and motion analysis results, and clips that contain the entered information are indicated along the timeline.

While FIG. 19 shows an example of more than one segmentation types (e.g., Combo1) being applied to video content, it is possible to apply more than one segmentation type to audio content or any other type of multimedia content. The following is a summary of different combinations of segmentation types that can be applied, although numerous other combinations can be made that are not discussed below. Audio event detection plus classification is one example of a combination. The PDDI 122 shows the results of applying audio event detection, such as clapping, yelling, or laughing, along a timeline. Each detected event is accompanied by a confidence that it was detected correctly. The PDDI 122 includes a series of check boxes that let the user choose which events to display. Speaker segmentation and speaker recognition is another example of a combination. Each segment is shown in a different color or by different icon along a timeline, and segments that were produced by the same speaker are shown in the same color or by the same icon. The speaker recognition results include text and optionally confidence values for each speaker name. Multiple speaker names could be associated with each segment. Sound source localization and audio event detection could alternatively be applied by a user. The direction from which sound was detected is displayed as a sector of a circle. Each sector is accompanied by a confidence that it was detected correctly. The user interface includes a series of check boxes arranged around the circumference of a prototype circle that let the user choose which directions to display. Each detected audio event is accompanied by a confidence that it was detected correctly, and the PDDI 122 includes a series of check boxes that let the user choose which events to display. A user could alternatively apply speech recognition and profile analysis, in combination. A timeline in the PDDI 122 shows text and optionally confidence values for each word or sentence spoken. The speech recognition results are matched against a pre-existing text-based profile that represents the user's interests. The user can adjust a threshold on the confidence values, and the user can also adjust a threshold on the degree of match between the profile and the speech recognition results. Speech recognition and audio event detection is another example of a combination that could be applied. The timeline(s) include text and optionally confidence values for each word or sentence spoken, along with the results of applying audio event detection.

When applying combinations of segmentation types to multimedia content, the user is not limited to applying just two types in a combination. The user can apply three or more segmentation types, and such combinations can be shown in the segmentation type menu by default or they can be created by the user. Speech recognition, audio event detection, and speaker recognition can be applied in combination. The speech recognition results include text and optionally confidence values for each word or sentence. Audio events detected are shown on the same or different timeline. The PDDI 122 also displays the name of each speaker detected, accompanied by a confidence that it was detected correctly. The user interface includes a series of check boxes that let the user choose which speakers to display. Speech recognition, audio event detection, and speaker segmentation could alternatively be applied. The application is the same as above, except speaker segmentation events are shown instead of speaker recognition events. Each speaker segment is shown in a different color or with a different icon, and segments that were produced by the same speaker are shown in the same color or with the same icon. As another example, speech recognition, audio event detection, and sound localization could be applied in combination. The timeline(s) will show text and optionally confidence values for each word or sentence, along with audio events detected. The timeline(s) also display the direction from which sound was detected as a sector of a circle. Each sector is accompanied by a confidence that it was detected correctly. The user interface includes a series of check boxes arranged around the circumference of a prototype circle that let the user choose which directions to display.

Figure 20:
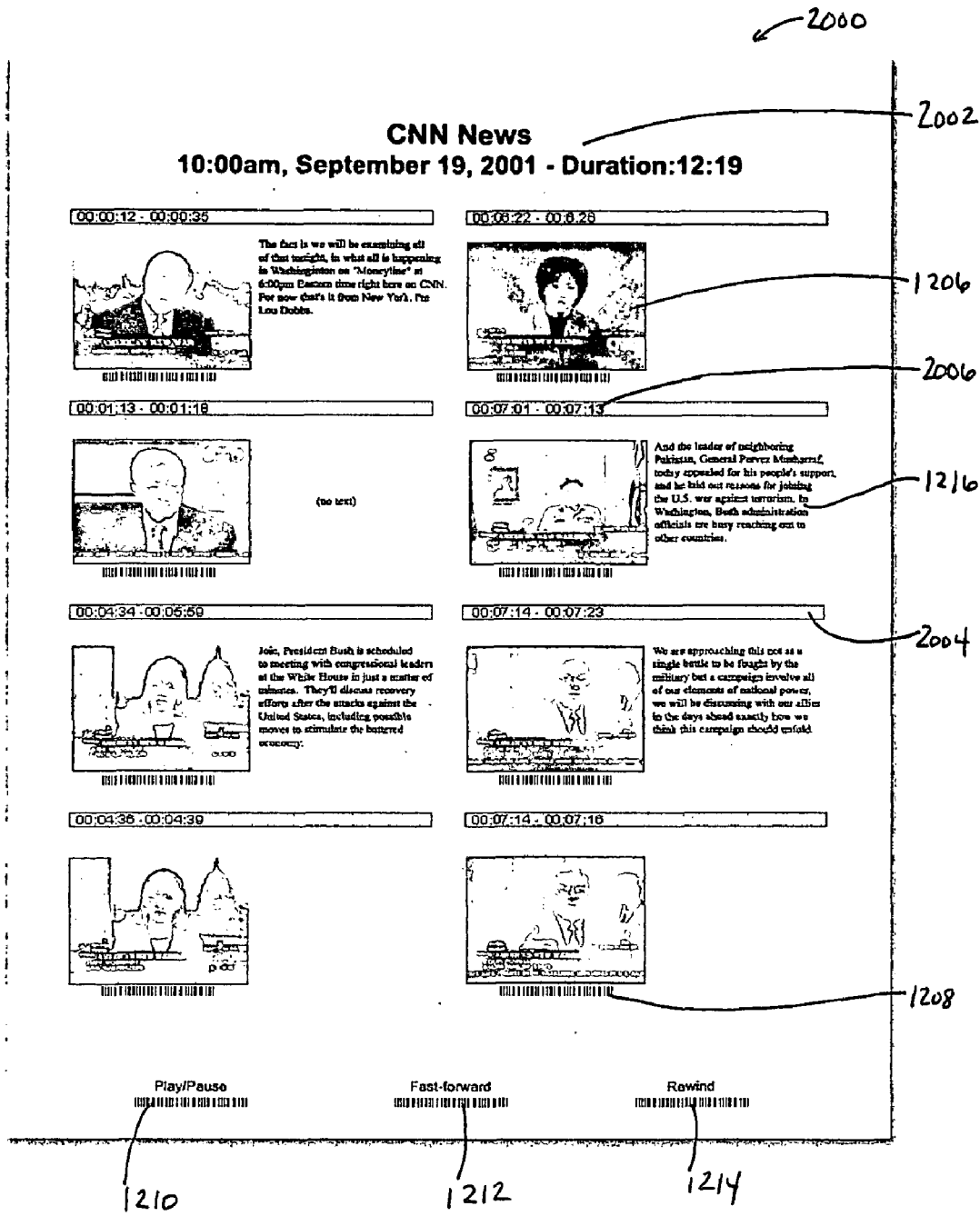
FIG. 20 is a graphical representation of an exemplary multimedia representation including video frames and text.

Referring now to FIG. 20 there is shown a multimedia representation (e.g., a video paper document) that displays a representation of another embodiment of a multimedia document that can be produced by the system. This document 2000 shows eight video frames 1206, and some of the video frames are accompanied by text 1216, which could be a transcript of the dialog, a summary of the video content, and the like, that could have been produced by the PDDI in FIG. 19. Dividers 2004 separate each video frame 1206 in this embodiment, and time stamps 2006 showing the start time to end time of each segment of video content are included in each divider 2004. In addition, a header 2002 is shown displaying information about the video content. In this example, the header 2002 shows the title, CNN News, the time of the news show (e.g., 10:00 am), the date of the show (e.g., Sep. 19, 2001), and the duration of the show (e.g., twelve minutes and nineteen seconds long).

Identifiers 1208 are shown under each video frame 1206, and the user can select any one of these identifiers 1208 to cause the video content associated with the video frame 1206 to begin to play. The video frame 1206 can begin to play at a point at which the speaker is starting to recite the associated text 1216 transcript. The video frames 1206 for which no text is shown or for which the phrase "no text" is displayed could include video content in which the person in the clip is not speaking, or may represent examples in which the user selected not to show text.

The multimedia document shown in the embodiment of FIG. 20 further shows control markers or identifiers for controlling video content display. In FIG. 20, there is shown a play marker 1210, a fast forward (FF) marker 1212, and a rewind marker 1214. The markers provide an interface to the multimedia data, as described previously.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A system having a display for printing comprising:
    a user interface for receiving instructions from a user for controlling segmentation of audio or video time-based media content for printing based on one or more features within the audio or video time-based media content, the features including any of speech recognition, optical character recognition, facial recognition, speaker detection, facial detection and event detection, and for generation of a printable representation of the media content, the user interface comprising a content selection field displaying a graphical representation of the audio or video time-based media content and the instructions from the user comprising selection of a segment of the graphical representation of the audio or video time-based media content;
    a media analysis module communicatively coupled to the user interface, the media analysis module analyzing the features of the audio or video time-based media content to extract the segment of the audio or video time-based media content selected from the graphical representation based at least in part on the instructions received from the user in the user interface;
    a media representation generation module for generating the printable representation of the audio or video time-based media content based at least in part on the extracted segment of the audio or video time-based media content and the instructions received from the user in the user interface; and
    an output device for printing the printable representation of the audio or video time-based media content to a tangible medium.

2. The system of claim 1, wherein the media analysis module further comprises content recognition software for recognizing the analyzed features in the audio or video time-based media content.

3. The system of claim 1, further comprising processing logic for controlling display of the user interface.

4. The system of claim 1, further comprising hardware for writing a digital representation of the audio or video time-based media content in digital format.

5. The system of claim 4, further comprising a storage medium for storing the digital representation of the audio or video time-based media content written in the digital format.

6. The system of claim 1, wherein the output device is configured to print to a paper format.

7. The system of claim 6, wherein the output device is further configured to print at least one user-selectable identifier associated with the audio or video time-based media content.

8. The system of claim 7, wherein the at least one user-selectable identifier comprises at least one barcode identifying the audio or video time-based media content in the printable representation.

9. The system of claim 7, wherein the at least one user-selectable identifier further comprises at least one play identifier that can be selected to play an associated audio or video time-based media content.

10. The system of claim 1, further comprising a data structure for representing transformation of the audio or video time-based media content.

11. The system of claim 1, further comprising a communication monitoring module for monitoring communication between the components of the system, wherein the communication monitoring module forwards requests for information and replies to requests among system components.

12. The system of claim 1, wherein the user interface further comprises a field for setting a threshold on confidence values associated with results of analyzing the features of the audio or video time-based media content.

13. The system of claim 1, wherein the user interface further comprises at least one field for managing and modifying display of media information in the printable representation of the audio or video time-based media content.

14. The system of claim 1, wherein the user interface further comprises a preview field for previewing active media frames within selected audio or video time-based media content.

15. The system of claim 1, wherein the user interface further comprises a preview field for previewing the printable representation generated by the media representation generation module.

16. The system of claim 1, wherein the content selection field further comprises a selector that a user can slide along the content selection field in order to select the segment.

17. The system of claim 1, wherein the graphical representation of the audio or video time-based media content enables a user to view the audio or video time-based media content and select segments of the audio or video time-based media content.

18. The system of claim 1, wherein the graphical representation of the audio or video time-based media content further comprises an audio waveform timeline displaying audio content.

19. The system of claim 1, wherein the graphical representation of the audio or video time-based media content further comprises a video timeline displaying video frames extracted from video content.

20. The system of claim 1, wherein the graphical representation of the audio or video time-based media content further comprises a video timeline displaying text extracted from video content.

21. The system of claim 1, wherein the content selection field further comprises a field for displaying the results of analyzing the audio or video time-based media content, the results being displayed as defined segments along a timeline.

22. The system of claim 21 wherein the content selection field comprises an edit segment option to edit a length of the defined segments.

23. The system of claim 1, further comprising an output device driver module for driving the audio or video time-based media content analysis and the media representation generation, the output device driver module being communicatively coupled to the user interface to receive user instructions.

24. The system of claim 23, further comprising an augmented output device for generating a media representation, the augmented output device being communicatively coupled to the media analysis software module to receive transformed media data, the augmented output device being communicatively coupled to the output device driver module to receive instructions for media representation generation.

25. The system of claim 1, wherein the printable representation of the audio or video time-based media content further comprises one or more timelines and the user interface comprises an option to specify a number of timelines displayed per page.

26. The system of claim 1, wherein the printable representation of the audio or video time-based media content further comprises one or more timelines and the user interface comprises an option to specify a number of pages to fit the one or more timelines.

27. A method for printing, the method comprising:

displaying a print dialog driver box to a user wherein the print dialog driver box comprises a user interface for receiving instructions from the user for controlling segmentation of audio or video time-based media content for printing based on one or more features within the audio or video time-based media content, the features including any of speech recognition, optical character recognition, facial recognition, speaker detection, facial detection and event detection, and for generation of a printable representation of the audio or video time-based media content, the user interface comprising a content selection field displaying a graphical representation of the audio or video time-based media content and the instructions from the user comprising selection of a segment of the graphical representation of the audio or video time-based media content;

receiving the instructions from the user in the print dialog driver box;

analyzing the features of the audio or video time-based media content to extract the segment of the audio or video time-based media content selected from the graphical representation based at least in part on the instructions received from the user in the print dialog driver box;

generating the printable representation of the audio or video time-based media content based at least in part on the extracted segment of the audio or video time-based media content selected from the graphical representation and the instructions received from the user in the print dialog driver box; and printing the printable representation of the audio or video time-based media content to a tangible medium.

28. The method of claim 27, wherein analyzing features of the audio or video time-based media content comprises performing speech recognition on the audio or video time-based media content.

29. The method of claim 27, wherein analyzing features of the audio or video time-based media content comprises performing optical character recognition on the audio or video time-based media content.

30. The method of claim 27, wherein analyzing features of the audio or video time-based media content comprises performing face recognition on the audio or video time-based media content.

31. The method of claim 27, wherein analyzing features of the audio or video time-based media content comprises performing speaker detection on the audio or video time-based media content.

32. The method of claim 27, wherein analyzing features of the audio or video time-based media content further comprises performing face detection on the audio or video time-based media content.

33. The method of claim 27, wherein analyzing features of the audio or video time-based media content comprises performing event detection on the media content.

34. The method of claim 27, wherein displaying the print dialog box is responsive to receiving from the user a selection of a print function in a media rendering application.

35. The method of claim 27, further comprising storing the audio or video time-based media content on a storage medium that is accessible to an augmented output device.

36. The method of claim 27, wherein the print dialog box further displays audio or video time-based media content formatting options to the user.

37. The method of claim 27, further comprising receiving a selection of a threshold value to be applied to confidence levels associated with defined features that are recognized in media content.

38. The method of claim 27, further comprising outputting a preview of the printable representation of the audio or video time-based media content in a preview field that displays the printable representation prior to printing the printable representation.

39. The method of claim 38, further comprising receiving a selection of an update field after modifying the audio or video time-based content in the print dialog box to update the preview field.

40. The method of claim 27, further comprising receiving a selection of user-selected segments of the audio or video time-based media content in a field of the print dialog box by sliding a selector along a timeline displaying a representation of the audio or video time-based media content.

41. The method of claim 27, further comprising receiving selection of a play option on the print dialog box, and playing the audio or video time-based media content responsive to receiving the selection.

42. The method of claim 27, further comprising receiving a selection of a print option on a media rendering application, wherein the user selects parameters for transformation of the audio or video time-based media content.

43. The method of claim 27, further comprising:
 receiving a selection of a print option on media rendering application;
 performing a default audio or video time-based media content transformation on the audio or video time-based media content; and
 showing the media representation is shown in a preview field of the print dialog box.

44. The method of claim 27, wherein printing the printable representation comprises printing the printable representation in a paper-based format.

45. The method of claim 44, further printing a user-selectable identifier on the paper-based format, the user-selectable identifier when selected instructs a media player to play the associated audio or video time-based media content.

* * * * *